(12) United States Patent
Hirai et al.

(10) Patent No.: US 8,240,922 B2
(45) Date of Patent: Aug. 14, 2012

(54) BEARING DEVICE FOR WHEEL

(75) Inventors: Isao Hirai, Iwata (JP); Kohei Yoshino, Iwata (JP); Takayasu Takubo, Iwata (JP); Akira Fujimura, Iwata (JP); Takuya Obata, Iwata (JP)

(73) Assignee: NTN Corporation, Osaka (JP)

( * ) Notice: Subject to any disclaimer, the term of this patent is extended or adjusted under 35 U.S.C. 154(b) by 578 days.

(21) Appl. No.: 11/989,102

(22) PCT Filed: Jul. 10, 2006

(86) PCT No.: PCT/JP2006/313659
§ 371 (c)(1),
(2), (4) Date: Jan. 22, 2008

(87) PCT Pub. No.: WO2007/010772
PCT Pub. Date: Jan. 25, 2007

(65) Prior Publication Data
US 2009/0189436 A1    Jul. 30, 2009

(30) Foreign Application Priority Data

| | | |
|---|---|---|
| Jul. 20, 2005 | (JP) | 2005-210621 |
| Aug. 2, 2005 | (JP) | 2005-224342 |
| Aug. 2, 2005 | (JP) | 2005-224343 |
| Aug. 2, 2005 | (JP) | 2005-224344 |
| Aug. 4, 2005 | (JP) | 2005-226339 |
| Aug. 18, 2005 | (JP) | 2005-237422 |
| Aug. 19, 2005 | (JP) | 2005-238993 |
| Aug. 19, 2005 | (JP) | 2005-238994 |
| Aug. 19, 2005 | (JP) | 2005-239009 |
| Aug. 19, 2005 | (JP) | 2005-239010 |

(51) Int. Cl.
*F16C 13/00* (2006.01)
(52) U.S. Cl. ........ 384/544; 384/625; 384/912; 148/112; 29/898.06

(58) Field of Classification Search .................. 384/544, 384/569, 589, 625, 903, 912–912; 148/328, 148/334, 525, 529, 567, 624, 659, 112; 29/898.06
See application file for complete search history.

(56) References Cited

U.S. PATENT DOCUMENTS
3,595,707 A * 7/1971 Faunce .......................... 148/624
(Continued)

FOREIGN PATENT DOCUMENTS
CN         1573149 A     2/2005
(Continued)

OTHER PUBLICATIONS

International Preliminary Report on Patentability issued in corresponding International Patent Application No. PCT/JP2006/313659, mailed on Jan. 31, 2008.

(Continued)

*Primary Examiner* — Marcus Charles

(57) ABSTRACT

A wheel support bearing assembly, which enables an increase in the strength and the fatigue strength of its wheel mounting flange or vehicle body fitting flange against high stress and repeated stress and the suppression of the increase of the number of processes, includes an inner member and an outer member rotatable relative to each other through rolling elements. The flange is formed on the inner member or the outer member. A component part having the flange is a hot-forged product of steel in which a matrix portion is formed as a standard structure and the non-standard structural portion is formed on the surface of the flange. The non-standard structure is formed of either of a fine ferrite/pearlite structure, an upper bainite structure, a lower bainite structure, and a tempered martensite structure, or mixture of two or more of these structures.

13 Claims, 55 Drawing Sheets

U.S. PATENT DOCUMENTS

| | | | |
|---|---|---|---|
| 5,861,067 A * | 1/1999 | Hetzner | 148/326 |
| 6,250,814 B1 | 6/2001 | Tajima et al. | |
| 6,280,096 B1 | 8/2001 | Miyazaki et al. | |
| 6,357,925 B2 | 3/2002 | Tajima et al. | |
| 6,422,758 B1 | 7/2002 | Miyazaki et al. | |
| 6,524,011 B2 | 2/2003 | Miyazaki et al. | |
| 6,569,267 B1 * | 5/2003 | Nakamura et al. | 148/328 |
| 6,672,770 B2 | 1/2004 | Miyazaki et al. | |
| 6,761,486 B2 | 7/2004 | Miyazaki et al. | |
| 7,004,637 B1 * | 2/2006 | Uyama et al. | 384/544 |
| 7,806,992 B2 | 10/2010 | Hase et al. | |
| 2001/0019640 A1 | 9/2001 | Tajima et al. | |
| 2001/0046339 A1 | 11/2001 | Miyazaki et al. | |
| 2002/0146185 A1 | 10/2002 | Miyazaki et al. | |
| 2003/0103705 A1 | 6/2003 | Miyazaki et al. | |
| 2003/0127161 A1 | 7/2003 | Burrier | |
| 2003/0210842 A1 | 11/2003 | Tajima et al. | |
| 2004/0252927 A1 | 12/2004 | Hirai et al. | |
| 2005/0039829 A1 * | 2/2005 | Christofis et al. | 148/567 |
| 2005/0078901 A1 * | 4/2005 | Toda et al. | 384/544 |
| 2005/0141799 A1 * | 6/2005 | Uyama et al. | 384/544 |
| 2008/0264530 A1 | 10/2008 | Hase et al. | |

FOREIGN PATENT DOCUMENTS

| | | | |
|---|---|---|---|
| EP | 1486353 A2 | | 12/2004 |
| GB | 1590114 A | * | 5/1981 |
| JP | 58037167 A | * | 3/1983 |
| JP | 63227741 A | * | 9/1988 |
| JP | 11-78408 | | 3/1999 |
| JP | 11-129703 | | 5/1999 |
| JP | 2000-219006 | | 8/2000 |
| JP | 2001065576 A | * | 3/2001 |
| JP | 2003-300401 | | 10/2003 |
| JP | 2004-60003 | | 2/2004 |
| JP | 2004-182127 | | 7/2004 |
| JP | 2004-217003 | | 8/2004 |
| JP | 2005-3061 | | 1/2005 |
| JP | 2005060729 A | * | 3/2005 |
| JP | 2005-145313 | | 6/2005 |
| JP | 2005-232581 A | | 9/2005 |
| JP | 2007-039704 A | | 2/2007 |
| WO | WO 9902744 A1 | * | 1/1999 |

OTHER PUBLICATIONS

Japanese Notification for Reason(s) for Rejection issued Sep. 13, 2011 in corresponding Japanese Patent Application 2005-210621.
Japanese Decision of Rejection mailed Mar. 27, 2012 issued in corresponding Japanese Patent Application No. 2005-224344.
Japanese Decision of Rejection mailed Mar. 27, 2012 issued in corresponding Japanese Patent Application No. 2005-224342.
Japanese Notification of Reason(s) for Rejection issued Nov. 29, 2011 in corresponding Japanese Patent Application No. 2005-224342.
Japanese Notification of Reason(s) for Rejection issued Nov. 29, 2011 in corresponding Japanese Patent Application No. 2005-224343.
Japanese Notification of Reason(s) for Rejection issued Nov. 29, 2011 in corresponding Japanese Patent Application No. 2005-224344.
Japanese Notification of Reason(s) for Rejection issued Nov. 29, 2011 in corresponding Japanese Patent Application No. 2005-226339.
Japanese Notification of Reason(s) for Rejection issued Nov. 29, 2011 in corresponding Japanese Patent Application No. 2005-237422.
Japanese Notification of Reason(s) for Rejection issued Nov. 29, 2011 in corresponding Japanese Patent Application No. 2005-238993.
Japanese Notification of Reason(s) for Rejection issued Nov. 29, 2011 in corresponding Japanese Patent Application No. 2005-238994.
Japanese Notification of Reason(s) for Rejection issued Nov. 29, 2011 in corresponding Japanese Patent Application No. 2005-239010.
Japanese Notification of Reason(s) for Rejection issued Dec. 6, 2011 in corresponding Japanese Patent Application No. 2005-239009.
European Search Report dated Feb. 22, 2012 issued in corresponding European Patent Application No. 06768021.5.
Japanese Office Action mailed Apr. 24, 2012 issued in corresponding Japanese Patent Application No. 2005-210621.
International Search Report (PCT/ISA/210) mailed Nov. 7, 2006 in connection with the International Application PCT/JP2006/313659.

* cited by examiner

BEARING DEVICE FOR WHEEL

CROSS REFERENCE TO RELATED APPLICATIONS

This application claims the benefit under 35 U.S.C. Section 371, of PCT International Application Number PCT/JP2006/313659, filed Jul. 10, 2006, and also the following Japanese Application Nos.
2005-210621, filed Jul. 20, 2005 in Japan;
2005-224342, filed Aug. 2, 2005 in Japan;
2005-224343, filed Aug. 2, 2005 in Japan;
2005-224344, filed Aug. 2, 2005 in Japan;
2005-226339, filed Aug. 4, 2005 in Japan;
2005-237422, filed Aug. 18, 2005 in Japan;
2005-238993, filed Aug. 19, 2005 in Japan;
2005-238994, filed Aug. 19, 2005 in Japan;
2005-239009, filed Aug. 19, 2005 in Japan;
2005-239010, filed Aug. 19, 2005 in Japan, the contents of which are incorporated herein by reference.

BACKGROUND OF THE INVENTION

1. Field of the Invention

The present invention relates to a wheel support bearing assembly for, for example, a passenger car or freight vehicle, which is designed to have an increased strength.

2. Description of the Prior Art

In a wheel support bearing assembly of a kind to which the present invention pertains, it is well known that the wheel hub has a wheel mounting flange formed integrally therewith so as to extend radially outwardly therefrom so that a vehicle wheel can be removably secured thereto by means of a plurality of bolts. This wheel mounting flange has a root portion integral with the wheel hub, which generally tends to be subjected to considerable stresses particularly when an automotive vehicle makes an abrupt turn. Accordingly, in order to increase the fatigue strength for the purpose of avoiding fracture of the root portion of the wheel mounting flange relative to the wheel hub, such root portion is generally treated with an induction heat treatment such as disclosed in, for example, the Japanese Laid-open Patent Publication No. 2004-182127, published Jul. 2, 2004, or a shot peening such as disclosed in, for example, the Japanese Laid-open Patent Publication No. 2005-145313, published Jun. 9, 2005. Also, in order to increase the fatigue strength, a method has been suggested, in which a component part is in its entirety quenched and tempered such as disclosed in, for example, the Japanese Laid-open Patent Publication No. 2005-003061, published Jan. 6, 2005.

FIG. 82 illustrates a generally employed method of making a wheel hub used in a conventional wheel support bearing assembly of a third generation type. This generally employed method includes cutting a bar W0 to a predetermined size as shown by Process (A) in FIG. 82 to thereby provide a billet W1, as shown by Process (B) in FIG. 82, which eventually serves a raw material for one wheel hub. The billet W1 is then passed through a plurality of passes forming respective steps of a hot forging process, which passes include, for example, a first forging pass, a second forging pass and a third forging pass, to allow it to eventually assume a shape similar to the shape of the wheel hub, followed by a final forging process by which a finally forged product W4 of a shape approximately similar to the shape of the wheel hub can be obtained. See Process (C) to Process (E) in FIG. 82.

The finally forged product W4 is treated with a shot blasting for the purpose of removal of surface scales and is subsequently normalized or quenched and tempered if so required, as shown by Process (F) in FIG. 82. Then, the finally forged product W4 is subjected to turning as shown by Process (G) in FIG. 82, followed by induction heat treatment, as shown by Process (H) in FIG. 82, applied to raceways. Also, if required, a secondary machining is carried out subject to flange surfaces as shown by Process (I) in FIG. 82. Thereafter, grinding is effected to finish the wheel hub 14, which is subsequently assembled to complete a wheel support bearing assembly.

SUMMARY OF THE INVENTION

It may often experienced that the induction heat treatment hitherto employed to increase the fatigue strength cannot be employed satisfactorily depending on the shape of a component part where the induction heat treatment is applied. For example, such cases are observed that in view of the fact that the root portion of the wheel mounting flange referred to above has its side surface, from which a pilot portion for guiding a brake and/or a vehicle wheel protrudes, the radius of curvature of a corner between the flange and the pilot portion tends to be small and/or the pilot portion represents a plurality of prongs that are dispersed in a direction circumferentially thereof through corresponding cutouts. In the case of such shape, a problem may occur that a portion of a component part, when locally heated to an elevated temperature as a result of the induction heat treatment, may melt down and, accordingly, no induction heat treatment cannot be employed.

Also, in the practice of the induction heat treatment and the shot peening, it may occur that the number of process steps tends to increase and/or the fluctuation precision of the flange may be lowered.

In the case of a method, in which the component part in its entirety is quenched and tempered to increase the hardness, not only does the number of process steps increase, but increase of the hardness result in reduction of the processability (for example, the capability of being machined, and the cold workability such as, for example, a crimping process) of the entirety, and, accordingly, reduction of a slip torque that may be brought about as a result of decrease of the fitting characteristics of hub bolts, for example, may occur.

While the foregoing problems are associated mainly with the increase of the strength of the wheel mounting flange, problems similar to those described above equally applied to a wheel mounting flange of a design through which the wheel support bearing assembly can be fitted to a vehicle suspension system such as, for example, a knuckle rigid with a vehicle body.

A portion of the wheel support bearing assembly that is fitted to the vehicle body is desired to have an increased hardness for countermeasure against frictional wear resulting from, for example, fretting between members. Even in such case, induction heat treatment or quenching-and-tempering of component part in its entirety involves an increase of process steps and a problem associated with the entire workability resulting from increase of the hardness.

With the conventional method shown and described with reference to FIG. 82, while the normalizing or quenching-and-tempering is carried out in order to increase the fatigue strength of the wheel hub 14 in its entirety, not only is the production complicated and time-consuming because of the increase in number of process steps including normalization or quenching-and-tempering, but the amount of energies consumed increases because of the necessity that the wheel hub 14 after forged and then cooled must be heated again. Although there is a case, in which the normalization or the quenching-and-tempering referred to above may be dispensed with, the wheel hub may have a structure containing relatively large crystalline particles, have a reduced strength and a reduced toughness and has a low fatigue strength if the normalization or quenching-and-tempering is dispensed with.

Also, in the case of the wheel support bearing assembly having a rotation detecting function, i.e., in the case of, for example, the wheel support bearing assembly of an outer race rotating type, a portion of a raw material of an outer race is utilized as a mounting portion where a pulsar ring for the detection of rotation, but it may occur that the outer race may deform to an elliptical shape when loaded during, for example, the cornering of an automotive vehicle, resulting in a slight creepage of the pulsar ring relative to the outer race. If this is repeated, the mounting portion undergoes a frictional wear with the interference lowered consequently. Once this occurs, it may occur that the pulsar ring may be displaced in an axial direction, a fault detection may result in as a result of a change of an air gap used for the magnetic detection and/or contact with a sensor may occur.

Also, in recent years, in order to increase the mileage and reduction of the environmental loading, downsizing and reduction in weight are strongly desired for even in the wheel support bearing assembly and, accordingly, it is necessary to achieve such downsizing and reduction in weight while securing a high fatigue strength and a life time.

An object of the present invention is to provide a wheel support bearing assembly, in which in order to resolve the foregoing problems inherent in the conventional art, the strength and the fatigue strength of component parts forming an inner member and an outer member, respectively can be increased against a high stress and a repeated stress and a reduction in productivity, which will result in as a result of increase of the number of process steps, can be suppressed.

The wheel support bearing assembly of the present invention comprises an inner member and an outer member rotatable through a plurality of rows of rolling elements, in which either or both of the inner member and the outer member include a component part that is a hot forged product of steel material and has a matrix portion represented by a standard structure and also has an entire or partial surface thereof represented by a non-standard structure. The non-standard structure being chosen to be one of a fine ferrite-pearlite structure, an upper bainite structure, a lower bainite structure, a tempered martensite structure and a mixed structure comprised of two or more of those structures.

The non-standard structure is a structure obtained by, for example, effecting a cooling during or immediately after a hot forging step, subsequently accompanied by a self-heat-recuperation or a heat-recuperation tempering.

More specifically, the fine ferrite-pearlite structure is obtained by showering a coolant to locally cool the component part at the end of the hot forging step. Alternatively, where the hot forging step includes a plurality of forging substeps, the component part is cooled prior to the forging substep at the final stage, and, thereafter, the forging substep at the final stage is carried out to obtain the fine ferrite-pearlite structure. The tempered martensite structure is obtained by locally cooling the component part down to the martensite start point or lower at the end of the hot forging step and subsequently heat-recuperating and tempering it. The upper bainite structure and the lower bainaite structure are obtained by cooling the component part down to a room temperature at a cooling speed set to a predetermined rate at the end of the hot forging step. In particular, the lower bainite structure is obtained at a cooling speed lower than that set for the upper bainite structure.

According to the wheel support bearing assembly of the foregoing construction, the following effects can be obtained. Since a portion of the non-standard structure, which is chosen to be one of the fine ferrite-pearlite structure, the upper bainite structure, the lower bainite structure, the tempered martensite structure and the mixed structure comprised of two or more of those structures, has a finer structure than a matrix portion representing the standard structure and, also, has a hardness about equal to or higher than that of the matrix portion. As a result of minuteness of the structure and the increased hardness, the fatigue strength of that portion of the non-standard structure can increase and, as compared with the conventional wheel support bearing assembly having the standard structure, that portion can withstand stresses of a high amplitude, that is, be strengthened, enough to increase the life time. For this reason, as compared with the conventional wheel support bearing assembly having the standard structure, reduction in both size and weight can be accomplished. Accordingly, the input weight of product manufacturing of the wheel support bearing assembly can advantageously be reduced to thereby reduce the cost, making it possible to provide the wheel support bearing assembly at an inexpensive price.

Since that portion of the non-standard structure can be obtained by effecting a cooling during or at the end of the hot forging step, addition of a simple process is sufficient and an undesirable reduction in productivity which would otherwise be brought about as a result of increase of the process steps can be suppressed. Also, since heat evolved in the hot forging is utilized, the amount of energies used in a process of refinement of the structure can be reduced.

Since that portion, which is rendered to be the non-standard structure, may be an entire surface of a component part that is rendered to be a hot forged product, but if only a required portion such as, for example, a portion of the component part or the entirety is chosen therefor, any possible reduction in processability such as, for example, capability of being machined can be minimized.

In the wheel support bearing assembly of the present invention, the component part having the standard structure and the non-standard structure may include a wheel mounting flange or the vehicle body fitting flange and the wheel mounting flange or a vehicle body fitting flange may have a surface having the non-standard structure.

During, for example, the cornering of the automotive vehicle, high stress occurs repeatedly in the wheel mounting flange or the vehicle body fitting flange. In consideration of the repeated high stresses occurring in the manner described above, the strength and the fatigue strength in the non-standard structural portion can increase as a result of minuteness of the structure and increase of the hardness as discussed above to withstand stresses of a high amplitude and increase the life time. Because of the foregoing, as compared with the wheel conventional support bearing assembly containing the standard structure, reduction in both size and weight can be accomplished and, accordingly, the input weight of product manufacturing of the wheel support bearing assembly can advantageously be reduced to thereby reduce the cost.

In the wheel support bearing assembly of the present invention, the outer member is adapted to be fitted to an automotive vehicle body and the component part comprising the standard structure and the non-standard structure includes the outer member, which has an outer diametric surface made up of the non-standard structure.

In this construction, since the outer diametric surface of the component part used to be fitted to the automotive vehicle body is formed with the non-standard structure, the fretting wear, which will take place in respective mating surfaces of the outer diametric surface and the knuckle in a vehicle suspension system, can be suppressed as a result of minuteness of the structure and increase of the hardness in the non-standard structure.

In the wheel support bearing assembly of the present invention, the inner member may include a wheel hub having a wheel mounting flange, and an inner race segment mounted on an outer periphery of a hub axle of the wheel hub, and wherein the component part comprising the standard structure and the non-standard structure may be the wheel hub and an outer peripheral surface of the hub axle of the wheel hub may have a portion rendered to be the non-standard structure.

Although, during the cornering of the automotive vehicle, high stresses occur repeatedly at the seal contact surface in the vicinity of the root portion of the wheel mounting flange, where the seal contact surface is of the non-standard structure, an undesirable occurrence of cracking in the vicinity of the root portion of the wheel mounting flange can be suppressed to increase the life time. Also, considering that the hardness of the seal contact surface is increased as a result of that seal contact surface having been rendered to be of the non-standard structure, frictional wear resulting from sliding contact with the sealing member can be reduced.

In the wheel support bearing assembly of the present invention, the inner member may include a wheel hub having a wheel mounting flange, and an inner race segment mounted on an outer periphery of a hub axle of the wheel hub; wherein the wheel hub may have an outboard end face formed with a pilot portion protruding outwardly from a root portion of the wheel mounting flange for guiding a wheel and an automotive brake component; in which a portion of an outboard end face of the wheel hub lying radially inwardly from the pilot portion may be axially depressed to define a recess; and wherein the component part comprising the standard structure and the non-standard structure may be the wheel hub and an surface of the end face within the recess may have a portion of the non-standard structure.

According to the wheel support bearing assembly of the foregoing construction, the following effects can be obtained. Even though the weight of the wheel hub can be reduced by forming the recess at the end face of the wheel hub, it is difficult to make the recess deeper without the strength of the wheel hub being reduced since the recess at the end face of the wheel hub is defined in an inner periphery portion of the wheel mounting flange and thus the root portion of the wheel mounting flange of the hub axle lies in a periphery of the recess. However, if the surface area inside the recess at the end face of the wheel hub is rendered to be that portion of the non-standard structure, the strength and the fatigue strength against the repeated high stresses occurring during the cornering of the automotive vehicle can increase and, accordingly, an undesirable occurrence of cracking in the recess can be suppressed to increase the life time. Because of the foregoing, while an attempt is made to reduce the weight with the recess increased in size as large as possible, it is possible to increase the strength and the fatigue strength of the recess outer peripheral portion of the hub axle, which are enough to withstand against the high stress and repeated stress.

In the wheel support bearing assembly of the present invention, the wheel mounting flange may include bolt holes for passage of respective hub bolts and a seating face of each of the bolt holes in a side face of the wheel mounting flange and a vicinity of the seating face may have a portion of the non-standard structure.

According to the wheel support bearing assembly of the above described construction, the following effects can be obtained. Where the bolt hole has the counterbore formed in a periphery thereof, or the seating face in the form of the turned face and a peripheral area thereof cooperatively define a corner portion, such as a stepped portion, during, for example, the cornering of the automotive vehicle, repeated high stresses occur at a corner portion of the counterbore and a portion in the vicinity of the seating faces in the form of the turned face. However, since the seating faces of the bolt holes and their peripheral portions, which are rendered to be that portion of the non-standard structure, can have an increased strength and an increased fatigue strength, an undesirable occurrence of cracking in the seating faces of the respective bolt holes their peripheries can be suppressed to allow the life time to be increased. Also, since the seating faces has a hardness increased as a result of the use of the non-standard structure, frictional wear can be reduced and lowering of an axial force of each hub bolt resulting from the frictional wear of the corresponding seating face can be suppressed. Moreover, since only portions in the vicinity of the surface area during a casting process have the non-standard structural portions, the hardness increases merely in the vicinity of the surface area, with no fitting characteristics of the serrations of the hub bolt and no bolt slipping torque being affected.

In the wheel support bearing assembly of the present invention, a support component may be employed, which is to be mounted around a peripheral surface of the outer member and which is provided with a to-be-detected member or a detector for detection of rotations, in which the component part comprising the standard structure and the non-standard structure may be the outer member for engaging the support component and a surface of the outer member, on which the support component is engaged, may have a portion of the non-standard structure.

According to the wheel support bearing assembly of the foregoing construction, the fatigue strength of that portion of the non-standard structure can increase and, even where a high stress during, for example, the cornering of the automotive vehicle occurs repeatedly enough to deform, it is possible to suppress frictional wear of a member, engaged with the pulsar ring or the sensor cap, as a result of creepage. In other words, such a sequential occurrence as generation of frictional wear→decrease of the interference→further generation of creepage→displacement of the pulsar ring→an abnormality detection of the detector unit can be suppressed.

In the wheel support bearing assembly of the present invention, the inner member may include a wheel hub, having a wheel mounting flange, and an inner race segment mounted on an outer periphery of a hub axle of the wheel hub; in which a central portion of the wheel hub may be formed with a throughhole defined therein for insertion thereinto of a stem portion of a coupling member or the like of a constant velocity joint; wherein an open end edge of the throughhole at an outboard end face of the wheel hub may have a seating surface, with which a washer or a nut threadedly mounted on a male threaded portion at a tip of the stem portion; and wherein the component part comprising the standard structure and the non-standard structure may be the wheel hub and the seating surface of the wheel hub may have a portion of the non-standard structure.

According to the wheel support bearing assembly of the foregoing construction, the following effects can be obtained. Since the periphery of the seating surface which is held in contact with the coupling nut at the end face of the wheel hub for connecting the constant velocity joint lies in a periphery of the root portion of the wheel mounting flange, a high stress repeatedly occur during, for example, the cornering of the automotive vehicle. Particularly where the seating surface is a bottom surface of the counterbore, such high stress repeatedly occurs in a corner between the bottom and peripheral surface of the counterbore. However, when the seating surface and that portion encompassing the periphery of the corner of the counterbore are rendered to be that portion of the non-standard structure, generation of cracking from a peripheral edge of the seating surface can be suppressed to allow the life time to be increased.

Also, since the hardness of the seating surface is increased in the presence of the non-standard structure, the fretting wear which would occur as a result of contact between it and the nut can be suppressed and, hence, an undesirable axial fastening force of the nut, which would result from such frictional wear, can be suppressed.

In the wheel support bearing assembly of the present invention, the inner member may include a wheel hub, having a wheel mounting flange, and an inner race segment mounted on an outer periphery of a hub axle of the wheel hub; in which an end face of the inner race segment on an outboard side may abut an inner race segment abutment face which extends from an end portion of a hub axle outer peripheral surface of the wheel hub adjacent the wheel mounting flange in a direction diametrically outwardly; and in which the component part comprising the standard structure and the non-standard structure may be the wheel hub and a region of the outer peripheral surface of the hub axle ranging from at least a neighborhood of the inner race segment abutment face to such inner race segment abutment face may have a portion of the non-standard structure.

According to the wheel support bearing assembly of the foregoing construction, the following effects can be obtained. Against the repeated high stresses during, for example, the cornering of the automotive vehicle, where the corner portion between the inner race abutment face of the wheel hub and the outer peripheral surface thereof is formed as the non-standard structure, the strength and the fatigue strength can be increased as a result of the minuteness of the structure and the increase of the hardness and, accordingly, generation of cracking can be suppressed to allow the life time to be increased.

In the wheel support bearing assembly of the present invention, the inner member may include a wheel hub, having a wheel mounting flange, and an inner race segment mounted on an outer periphery of a hub axle of the wheel hub; in which a central portion of the wheel hub may be formed with a throughhole defined therein for insertion thereinto of a stem portion of a coupling member of a constant velocity joint; in which an inner diametric surface defining this throughhole may have serrations or splines engageable with serrations or splines provided in the stem portion; and wherein the component part comprising the standard structure and the non-standard structure may be the wheel hub and a portion of the inner diametric surface of the wheel hub defining the throughhole in the wheel hub, where the serrations or splines are formed, may have a portion of the non-standard structure.

According to the wheel support bearing assembly of the foregoing construction, the following effects can be obtained. Since that portion of the inner diametric surface of the wheel hub, where the serrations are formed, represents a serrated shape, it may occur that dale portions are susceptible to a high stress during, for example, the cornering of the automotive vehicle, by the effect of a moment load acting on the wheel hub and, also, by the effect of repeated minute deformation and displacement, some of the serrations between the wheel hub and the constant velocity joint undergo friction, accompanied by frictional wear.

However, against the repeated high stresses occurring in the manner described above, if the inner diametric surface of the wheel hub, where the serrations are formed, is rendered to be that portion of the non-standard structure, the structure and the fatigue strength can increase as a result of the minuteness of the structure and the increase of the hardness thereby suppressing generation of cracking from tooth dale of the serration. In other words, such a function as occurrence of a cracking→increase of a displacement of the site where the stress is generated→elongation of cracks→damage to the wheel hub can be suppressed to allow the life time to be increased.

Also, because of the increase of the hardness due to the non-standard structure, frictional wear of the serrations or the splines can be avoided. For this reason, it is possible to suppress frictional wear of the teeth which would otherwise result in incapability of the driving force being transmitted.

In the wheel support bearing assembly of the present invention, either one of the flanges may be formed with a bolt press-fitting hole defined therein and in which the component part comprising the standard structure and the non-standard structure may be a component including a flange having the bolt press-fitting holes defined therein and wherein an inner surface defining the bolt press-fitting hole in this component may have a portion of the non-standard structure.

According to the wheel support bearing assembly of the above described construction, the following effects can be obtained. If the inner surface of each of the bolt press-fitting holes is formed as that portion of the non-standard structure, the fitting characteristics of the serrations formed in a neck portion of each hub bolt can be increased. For this reason, the possibility can be suppressed, in which the hub bolt press-fitted into the respective bolt press-fitting holes may rotate together with the nut when the latter is turned.

In the wheel support bearing assembly of the present invention, either one of the flanges may be formed with a screw hole defined therein, the screw hole having an inner surface formed with female threads, and in which the component part comprising the standard structure and the non-standard structure may be a component including a flange having the bolt press-fitting hole defined therein and in which an inner surface defining the bolt press-fitting holes in this component may have a portion of the non-standard structure.

According to the wheel support bearing assembly of the above described construction, the following effects can be obtained. Because of the minuteness of the structure and the increase of the hardness in the non-standard structural portion, the strength and the fatigue strength of the screw holes can increase and, when a high stress occurs repeatedly during, for example, cornering of the automotive vehicle, occurrence of cracking in the screw holes formed in the wheel mounting flange and the vehicle body fitting flange, respectively, can be suppressed. In other words, cracking→increase of a displacement of that portion where the stresses occur→increase of an amplitude of the automotive vehicle→reduction in durability of component parts of the wheel support bearing assembly, where the screw holes are formed→separation of the bolts can be suppressed. Also, as a result of the increased hardness brought about by the use of the non-standard structure, damages to the screw holes when heavily loaded, can be suppressed to allow it to withstand a further high load. In addition, frictional wear of the female threads in the screw holes can be reduced to avoid reduction and slackening of the axial force of the wheel bolts and the vehicle body fitting bolts.

Thus, it can be highly strengthened and can have an increased life time. As compared with the conventional wheel support bearing assembly having the standard structure, downsizing and reduction in weight can be accomplished. Accordingly, the input weight of product manufacturing of the wheel support bearing assembly can advantageously be reduced to thereby reduce the cost, making it possible to provide the wheel support bearing assembly at an inexpensive price.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
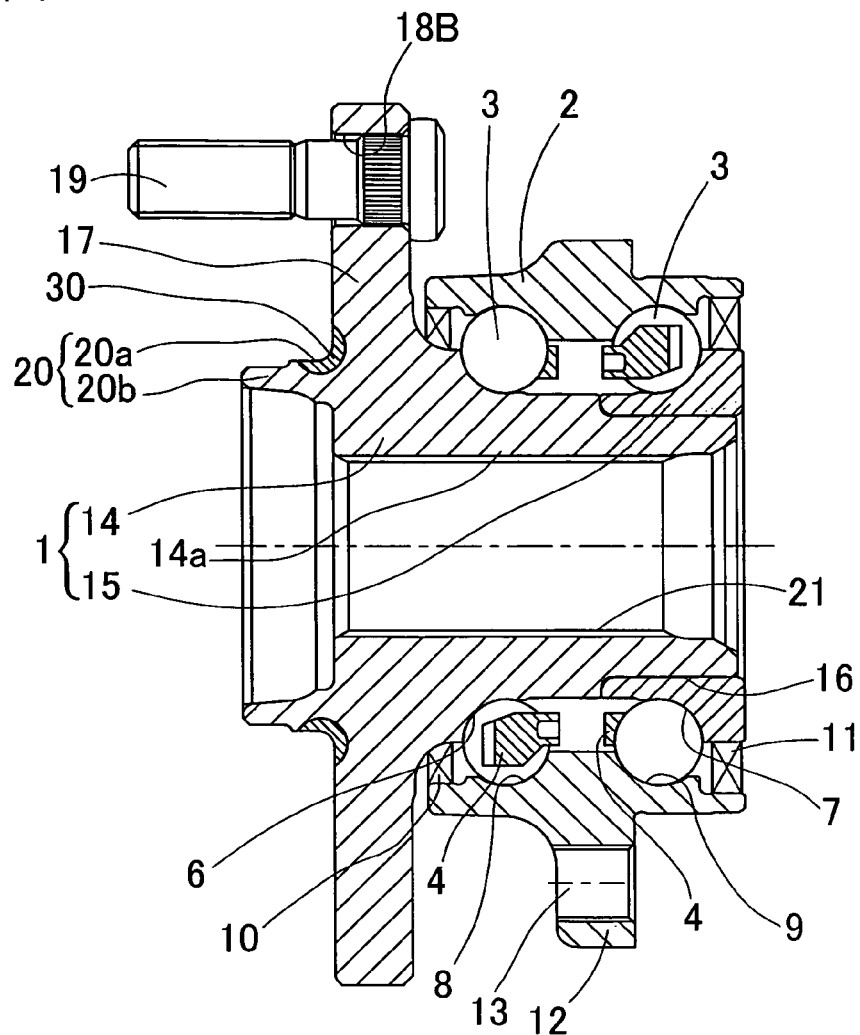
FIG. 1 is a longitudinal sectional view showing a wheel support bearing assembly according to a first preferred embodiment of the present invention.
Figure 2:
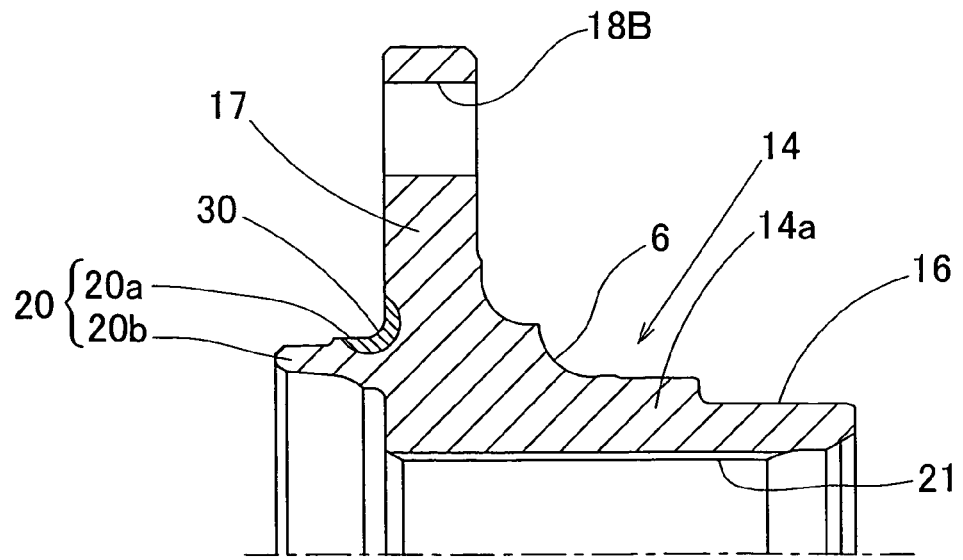
FIG. 2 is a fragmentary longitudinal sectional view showing a wheel hub employed in the wheel support bearing assembly.

The first preferred embodiment of the present invention will be described with particular reference to FIGS. 1 to 5. FIG. 1 illustrates an example of a wheel support bearing assembly and this example is to be applied to that of a third generation type for the support of a vehicle drive wheel. This wheel support bearing assembly includes an inner member 1 and an outer member 2, which are rotatable relative to each other through plural rows of rolling elements 3, and the rolling elements 3 of each row are retained by a respective retainer 4. The plural rows referred to above may mean two or more rows, but in the instance shown therein, the double rows are employed. Each of the inner and outer members 1 and 2 has respective raceways 6, 7 and respective raceways 8, 9 defined therein. This wheel support bearing assembly is rendered to be a double row angular contact ball bearing type, in which the rolling elements 3 of each row are in the form of balls and the raceways 6 and 7 are so formed as to permit the contact angle to be oriented outwards. Opposite annular ends of a bearing space delimited between the inner member 1 and the outer member 2 are sealed by respective sealing members 10 and 11.

The outer member 2 is a member of one-piece construction and is provided with a vehicle body fitting flange 12 at an arbitrarily chosen axial location. An outer diametric surface portion of the outer member 2 on an inboard (rightward) side of the vehicle body fitting flange 12 defines a surface on which a knuckle (not shown) forming a part of a vehicle suspension system is mounted. It is to be noted that in the specification as herein set forth, one side of the vehicle body away from the longitudinal center thereof in a condition, in which the vehicle wheel is mounted is referred to as "outboard side" whereas the other side of the vehicle body close to the longitudinal center thereof in the same condition is referred to as "inboard side". The vehicle body fitting flange 12 has a plurality of vehicle fitting holes 13 at respective locations circumferentially thereof, which holes 13 may be either a bolt insertion hole or an internally threaded hole.

The inner member 1 is of a two-piece construction including a wheel hub 14 and an inner race segment 15 mounted on an outer periphery of an inboard end of an hub axle 14a of the wheel hub 14. The wheel hub 14 and the inner race segment 15 are formed with the raceways 6 and 7 of the inner member 1, respectively. An inboard end of an outer periphery of the hub axle 14a of the wheel hub 14 is formed with an inner race segment mounting surface 16 that is radially inwardly stepped to have a smaller diameter, with the inner race segment 15 mounted on this inner race segment mounting surface 16. The wheel hub 14 has a center portion formed with a throughhole 21, through which a stem portion (not shown) of a constant velocity joint is inserted.

The wheel hub 14 has a wheel mounting flange 17 formed on an outer periphery of an outboard end of the hub axle 14a so as to extend radially outwardly therefrom and hub bolts 19 are fitted in a press-fitted fashion into respective bolt press-fitting holes 18 defined in the wheel mounting flange 17 at a plurality of locations circumferentially thereof.

A generally or substantially annular pilot portion 20 coaxial with the wheel hub 14 protrudes axially outwardly from a root portion of the wheel mounting flange 17 in the wheel hub 14. This pilot portion 20 is made up of a brake pilot 20a for guiding a brake disc, which is fitted to an outboard side face of the wheel mounting flange 17 in overlapped relation therewith, and a wheel pilot 20b protruding in an outward direction beyond the brake pilot 20a. It is to be noted that pilot portion 20 may be in the form in which a plurality of cutouts are formed at a plurality of locations circumferentially thereof so as to be divided.

Figure 7A:
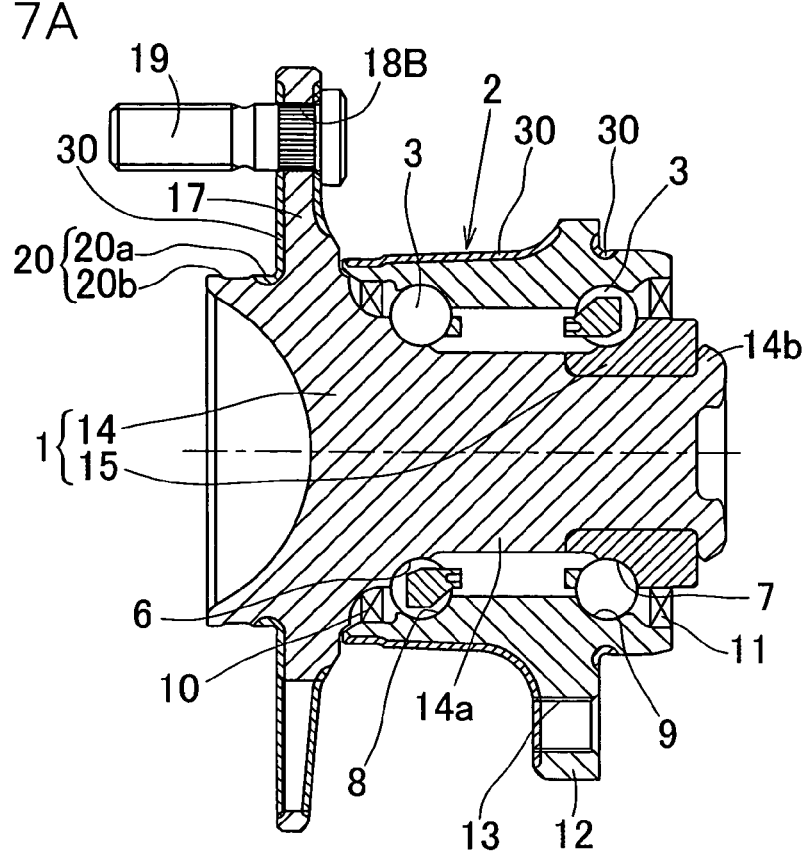
FIG. 7A is a longitudinal sectional view of the wheel support bearing assembly according to a third preferred embodiment of the present invention.

It is also to be noted that in the case of the wheel support bearing assembly for the support of a vehicle driven wheel, the wheel hub 14 is not formed with such a throughhole 21 as employed in the example of FIG. 1, as shown in FIG. 7A. Also, in the case of the wheel support bearing assembly for the support of the vehicle driven wheel such as shown in FIG. 7A, the inner race segment 15 is axially fixed in position to the wheel hub 14 by means of a crimped portion 14b formed by crimping an inboard end of the hub axle 14a of the wheel hub 14 in a direction radially outwardly.

Referring to FIGS. 1, 2, 7A and 7B, the wheel hub 14 and the inner race segment 15, both forming respective parts of the inner member 1, and the outer member 2 are all prepared from a hot forged product of steel material and, of them, a surface area of the wheel hub 14 lying at a root portion of the wheel mounting flange 17 is rendered to be a non-standard structural portion 30. A matrix part of the wheel hub 14 has a standard structure. The non-standard structure of the non-standard structural portion 30 is a structure that is obtained by showering a coolant over the wheel hub 14 to locally cool the latter during a hot forging step or at the end of the hot forging step and may be any one of, for example, a fine ferrite-pearlite structure, an upper bainite structure, a lower bainite structure and a tempered martensite structure, or a mixed structure comprised of two or more of those structures.

Figure 3:
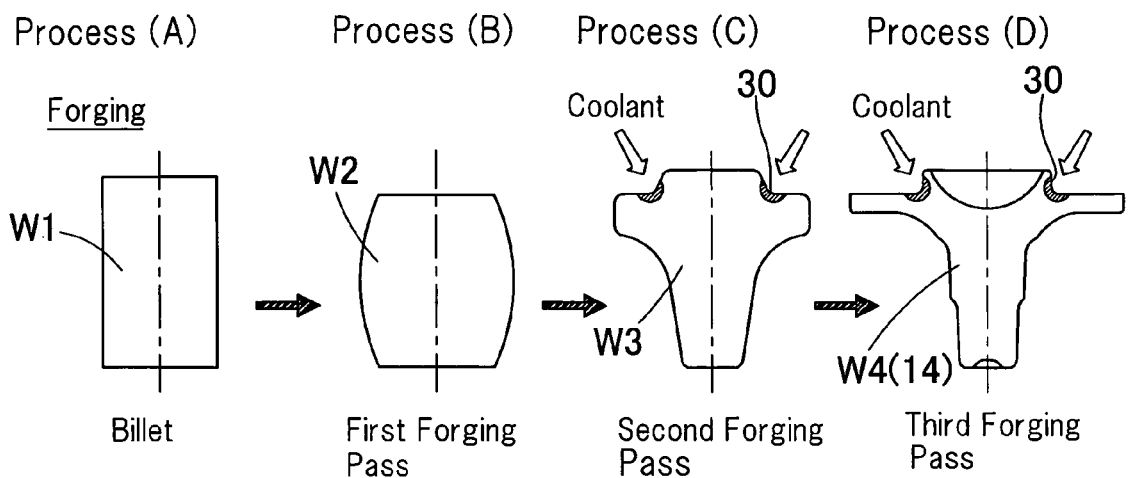
FIG. 3 is a flowchart showing a forging process for forging the wheel hub employed in the wheel support bearing assembly.
Figure 4:
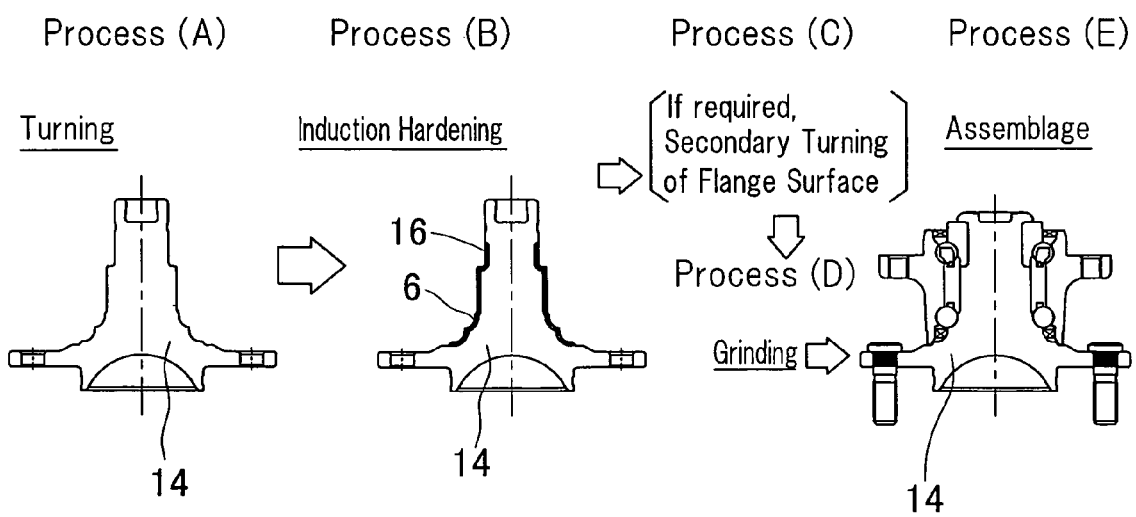
FIG. 4 is a flowchart showing process steps for processing the wheel hub subsequent to the forging process.

FIG. 3 illustrates a hot forging step of the process of making the wheel hub 14 and FIG. 4 illustrates a process step subsequent to the hot forging step of the wheel hub 14. It is to be noted that although FIGS. 3 and 4 exemplify the manufacture of the wheel support bearing assembly for the support of the vehicle driven wheel as shown in FIG. 7, the process shown in and described with reference to FIGS. 3 and 4 can be equally applied to that of the wheel support bearing assembly for the support of the vehicle drive wheel as shown in FIG. 1.

As shown by Process (A) in FIG. 3, a bar (not shown) is cut to a predetermined length to provide a billet W1, which eventually serves as a raw material for one wheel hub 14. This billet W1 is then passed sequentially through a plurality of steps of the hot forging process, for example, a first forging pass, a second forging pass and a third forging pass, to allow it to eventually assume a shape generally similar to the shape of the hub axle and, at the final forging step (the third forging pass), a finally forged product W4 of a shape approximately similar to the shape of the wheel hub 14 can be obtained (Process (B) to Process (D) in FIG. 3).

The finally forged product W4 is subjected to turning as shown by Process (A) in FIG. 4 and the raceway 6 and the inner race segment mounting surface 16 are treated with an induction hardening (as shown by Process (B) in FIG. 4). Thereafter, the raceway and others are ground (as shown by Process (D) in FIG. 4). If required, a secondary machining of surfaces of the wheel mounting flange 17 and other is carried out prior to the grinding (as shown by Process (C) in FIG. 4). The wheel hub 14, of which raceways have been completely ground, is subsequently incorporated in a wheel support bearing assembly (as shown by Process (E) in FIG. 4) to complete the latter.

The non-standard structural portion 30 of the wheel hub 14 is modified when a coolant is locally sprayed over a modification subject area at the end of the forging step as shown by Process (D) in FIG. 3 or when a coolant is locally sprayed over a modification subject area subsequent to the termination of the forging step (the second forging pass) preceding the final forging step (the third forging pass) as shown by Process (C) in FIG. 3.

The coolant referred to hereinabove and hereinafter may be employed in the form of liquid, a mist of liquid or gas and, particularly for example, oil or a low temperature air or the like can be employed for the coolant. Also, depending on the use, the coolant may be mixed with, for example, a lubricant, a media and/or a rust inhibitor to facilitate lubrication and mold releasing of the raw material, cooling and prevention of wear of a mold assembly, elimination of removal of scales by means of a shot blasting to be effected subsequent to the forging, and/or an anti-rusting effect.

Spraying of the cooling may be carried out to the raw material W3 or W4, which eventually forms the wheel hub 14, while the latter is rotated about its own longitudinal axis so that the cooling can be achieved uniformly over the entire periphery. Alternatively, without the raw material W3 or W4 being rotated, a coolant spraying device (not shown) may be turned around the raw material W3 or W4.

For the spraying of the coolant, a cooling jacket (not shown) of a ring shape having multiple spraying holes defined therein may be employed. Where the raw material W3 or W4 which eventually forms the wheel hub 14 is rotated, any type capable of spraying through a nozzle at a single location may be employed.

Where the raw material W3 or W4, which eventually forms the wheel hub 14, is rotated during the cooling, it may be either one of the vertical axis or the horizontal axis. Also, the direction in which the coolant is sprayed may be either upwards or downwards when the rotation takes place about the vertical axis and may be oriented in any direction in addition to the horizontal orientation when the rotation takes place about the horizontal axis. It is to be noted that where an inner diametric portion of the pilot portion 20 of the wheel hub 14, which does not extend completely through the wheel hub 14 as shown in FIG. 7A, is cooled, the spraying has to be made in an upward direction so that the coolant will not be pooled.

As for the method of supporting the raw material W3 or W4, which eventually forms the wheel hub 14, any method may be used, provided that a portion to be cooled can be uniformly cooled. Therefore, any of the hub axle 14a, an outer diametric portion of the wheel mounting flange 17, and an outer diametric portion of the pilot portion 20 may be supported. Where the wheel hub 14 has the throughhole 31 defined in a center portion thereof such as observed in that used for the support of the vehicle drive wheel, a centering support may be effected with this throughhole 21 utilized as a guide.

Which one of the fine ferrite-pearlite structure, the upper bainite structure, the lower bainite structure, the tempered martensite structure or the mixed structure comprised of two or more of those structures is to be formed as the structure of the non-standard structural portion 30 as a result of the cooling can be determined by suitably choosing a cooling method which will now be described with particular reference to FIG. 5.

Figure 5:
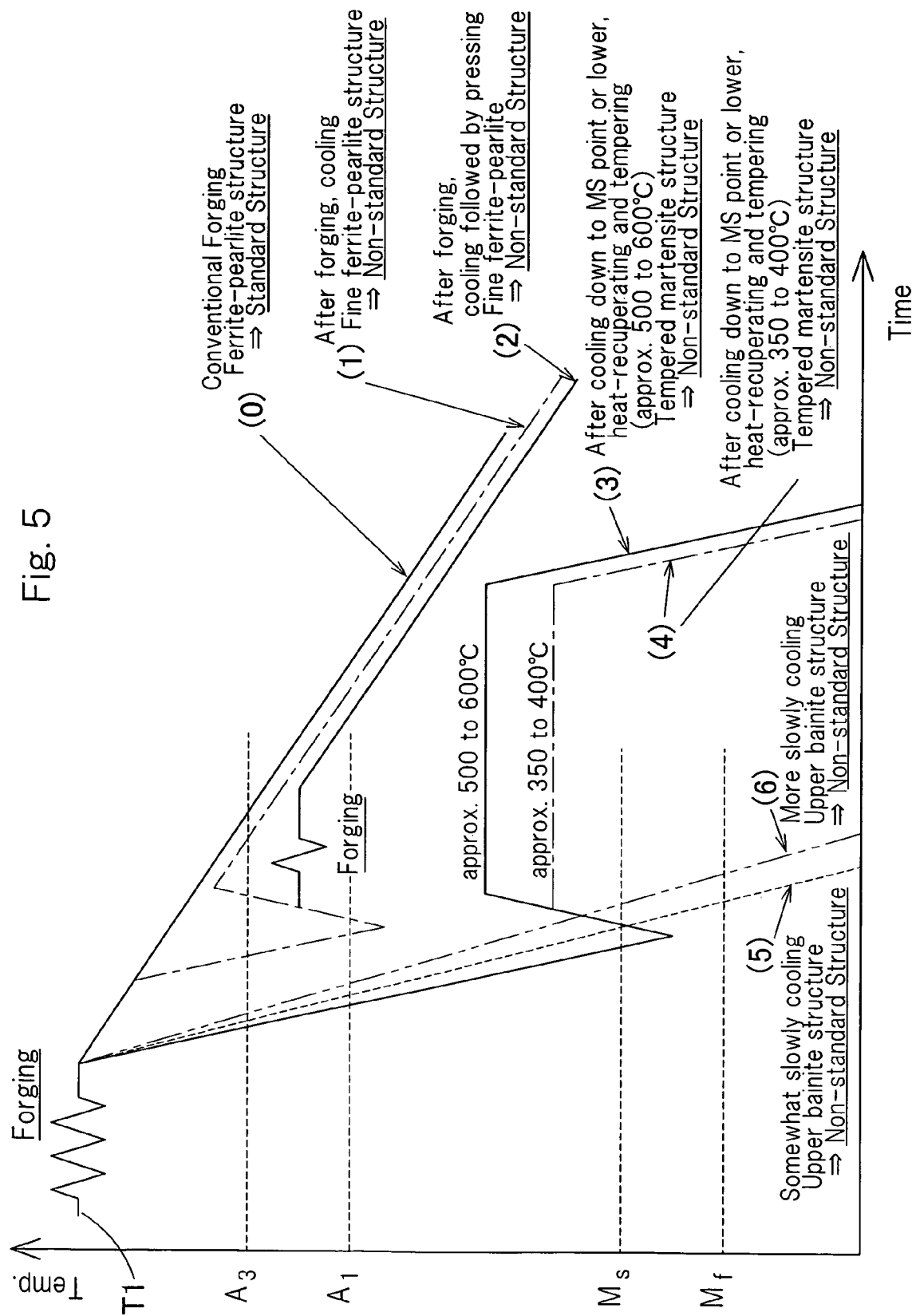
FIG. 5 is an explanatory chart showing cooling curves necessary to obtain various non-standard structures in a hot forged component part.

In FIG. 5, the axis of abscissas represents the time passed and the axis of ordinates represents the temperature. Symbols $A_3$ and $A_1$ shown in FIG. 5 represents the $A_3$ transformation point and the $A_1$ transformation point, respectively. Symbols $M_s$ and $M_f$ shown in FIG. 5 represents a martensite start point (hereinafter referred to as Ms point) and a martensite finish point (hereinafter referred to as Mf point), respectively.

Steel material forming the raw material is a carbon steel containing carbon in a quantity within the range of 0.4 to 0.8% such as, for example, S53C or the like.

Referring to FIG. 5, as shown by a curve (0), when a component part is merely air cooled from a forging temperature Ti (which is higher than the $A_3$ transformation point), the standard structure, which is a structure formed by the conventional forging, that is, a ferrite-pearlite structure will develop.

A curve (1) represents a cooling curve applicable where as a non-standard structure, a fine ferrite-pearlite structure is to be obtained. When at the end of the hot forging step, that is, during a period in which cooling is effected after the hot forging, a component part to be modified (raw material) by means of showering of a coolant is locally cooled as shown by Process (D) in FIG. 3 and is subsequently allowed to be self-recuperated after the cooling with the cooling time controlled, the fine ferrite-pearlite structure can be obtained as the non-standard structure. The fine ferrite-pearlite structure is a structure that can be obtained by normalizing, that is, a normalized structure.

A curve (2) shown in FIG. 5 is a different cooling curve applicable where as a non-standard structure, a fine ferrite-pearlite structure is to be obtained. In this case, where the hot forging step includes a plurality of forging substeps such as shown in and described with reference to FIG. 3, the component part (raw material W3) is locally or entirely cooled (as shown by Process (C) in FIG. 3) prior to the forging step at the final stage (shown by Process (D) in FIG. 3) and, thereafter, the forging substep at the final stage (shown by Process (D) in FIG. 3) is carried out. The final forging substep is carried out, for example, during the self recuperation taking place subsequent to the cooling discussed above. In this way, addition of a forging substep subsequent to the cooling is effective to provide dynamic strains and, therefore, the fine ferrite-pearlite structure can be obtained.

Curves (3) and (4) represent a cooling curve applicable where as a non-standard structure, a tempered martensite structure, which is a quenched and tempered structure, is to be obtained. When at the end of the hot forging step the component part is partly cooled down to a temperature falling within the range of Ms point and Mf point and is subsequently recuperated and tempered at a predetermined temperature range, the quenched and tempered structure, that is, the tempered martensite structure can be obtained as the non-standard structure. Where the temperature at which recuperating and tempering take place is chosen to be within the range of about 500 to about 600° C., the structure will become sorbite. On the other hand, where the temperature at which recuperating and tempering take place is chosen to be within the range of about 350 to about 400° C., the structure will become troostite.

Curves (5) and (6) shown in FIG. 5 represent respective cooling curves applicable where as a non-standard structure, an upper bainite and a lower bainite are to be obtained, respectively. When at the end of the hot forging step, as a controlled cooling, cooling is performed somewhat slowly at a rate lower than the cooling speed employed during the tempering (the cooling speed required to form the martensite), the structure will develop to the upper bainite. When the tempering is carried out at a cooling speed which is more slowly than this cooling speed, the structure will develop to the lower bainite.

It is to be noted that although various cooling methods have been described with particular reference to FIG. 5, any of the cooling methods represented respectively by the curves (1) to (4) out of the cooling methods represented respectively by the curves (1) to (6) shown in FIG. 5 is preferably employed particularly where the non-standard structural portion 30 is provided locally such as, for example, at the root portion of the wheel mounting flange 17 shown in connection with the example of FIG. 1. On the other hand, any of the cooling methods represented by the curves (1) to (6) may be employed where the non-standard structural portion 30 is formed entirely on a surface of a component part.

According to the wheel support bearing assembly of the foregoing construction, the following effects can be obtained.

Since the surface area 30 of the root portion of the wheel mounting flange 17 is rendered to be a non-standard structure and since such non-standard structure is chosen to be one of the fine ferrite-pearlite structure, the upper bainite structure, the lower bainite structure, the tempered martensite structure and the mixed structure comprised of two or more of those structures, that root portion of the wheel mounting flange 17 can have an increased strength and a increased life time. Specifically, during, for example, the cornering of the automotive vehicle, deflection of a large amplitude occurs repeatedly in the wheel mounting flange 17, accompanied by repeated high stresses occurring at that root portion of the flange 17. In consideration of the repeated high stresses occurring in the manner described above, if the surface area 30 of that root portion of the wheel mounting flange 17 is of the non-standard structure referred to above, the structure can be minute as compared with the matrix portion represented by the standard structure and, also, the hardness will become equal to or higher than that of the matrix portion. Accordingly, the fatigue strength can increase as a result of minuteness of the structure and increase of the hardness as discussed above. For this reason, as compared with the conventional wheel mounting flange containing only the standard structure, not only can the wheel mounting flange be highly strengthened and withstand stresses of a high amplitude, but also an undesirable occurrence of cracking at that root portion of the wheel mounting flange 17 can be suppressed to increase the life time. In other words, such a function as occurrence of a cracking→increase of a displacement of the wheel mounting flange 17→increase of an amplitude of the automotive vehicle→damage to the wheel support bearing assembly can be suppressed to allow the life time to be increased.

Because of the foregoing, as compared with the wheel conventional support bearing assembly containing the standard structure, reduction in both size and weight can be accomplished and, accordingly, the input weight of product manufacturing of the wheel support bearing assembly can advantageously be reduced to thereby reduce the cost, making it possible to provide the wheel support bearing assembly at an inexpensive price.

Since that portion 30 of the non-standard structure can be obtained by effecting the cooling during the hot forging step or at the end of the hot forging step, addition of a simple process is sufficient and an undesirable reduction in productivity which would otherwise be brought about as a result of increase of the process steps can be suppressed. By way of example, as compared with normalizing or quenching-and-tempering, the process can be simplified. Also, since heat evolved in the hot forging is utilized, the amount of energies used in a process of modification of the structure can be reduced. Unlike the induction heat treatment, even though a corner portion delimited between the wheel mounting flange 17 and the pilot portion 20 is an area having a small radius of curvature, the process of refinement can be achieved without being accompanied by such a problem associated with melt-down resulting from overheating.

Since that portion 30, which is rendered to be the non-standard structure, is a local portion of the wheel mounting flange 17, any possible reduction in processability such as, for example, capability of being machined can be minimized.

Figure 6:
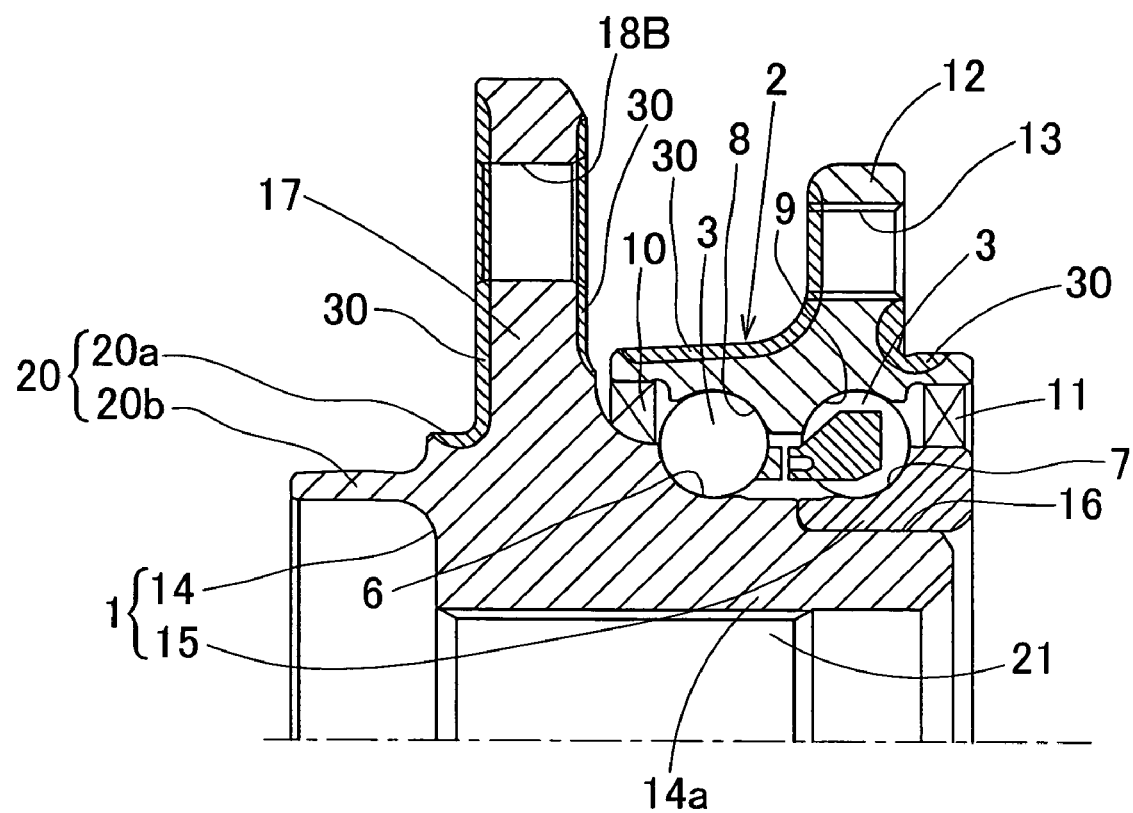
FIG. 6 is a fragmentary longitudinal sectional view of the wheel support bearing assembly according to a second preferred embodiment of the present invention.

FIG. 6 illustrates a second preferred embodiment of the present invention. This embodiment is substantially similar to that shown in and described with reference to FIGS. 1 to 5 in connection with the first embodiment, but differs therefrom in that the area of portion 30, where the non-standard structure is formed, is increased. In this embodiment, entire annular inboard and outboard surfaces of the wheel mounting flange 17 of the wheel hub 14, which are opposite to each other, and a surface area ranging from the annular outboard surface of the wheel mounting flange 17 to an outer peripheral surface of the brake pilot 20a at the root portion of the wheel mounting flange 17 are rendered to be a respective portion 30 of the non-standard structure.

Also, a surface area ranging from an entire annular outboard surface of the outer member 2, which is an annular side surface of the vehicle body fitting flange 12 remote from the opposite annular side surface thereof that is held in contact with a vehicle body, and an entire surface of an outer diametric surface of the outer member 2 on the outboard side of the vehicle body fitting flange 12 is rendered to be a portion 30 of the non-standard structure. In addition, an annular surface area of the root portion of the vehicle body fitting flange 12 on the inboard side, which is a surface area on the side adjacent the vehicle body to which the vehicle body fitting flange 12 is secured, is rendered to be a portion 30 of the non-standard structure.

Those portions 30 of the non-standard structure could be obtained as a portion where the non-standard structure was formed by showering a coolant locally during or at the end of the hot forging step. The non-standard structure is identical with any of the structures enumerated in connection with the previously described first embodiment. Other structural features of the second embodiment than those described above are substantially similar to those of the previously described first embodiment.

In the case of this construction, since the opposite annular side surfaces of the wheel mounting flange 17 in their entirety are rendered to be the respective portion 30 of the non-standard structure, the wheel mounting flange 17 in its entirety can have an increased strength and a further increased life time. Also, although a brake disc (not shown) is secured in overlapping relation to the annular outboard side surface of the wheel mounting flange 17, to which the vehicle wheel is mounted, an undesirable reduction in surface precision, which would result from a frictional wear of a flange surface that is brought about by a fretting between it and the brake disc, can be suppressed. Because of it, an undesirable degradation of the feeling of use of the brake, for example, judder and kick back of the brake, can be suppressed.

Even in the vehicle body fitting flange 12 integral with the outer member 2, repeated deflection of considerable amplitude takes place during an abrupt cornering of an automotive vehicle and high stresses are repeatedly generated in the root portion of this flange 12. However, in this embodiment, since those portions 30 of the non-standard structure are provided in the root portion of the vehicle body fitting flange 12 and the entire outboard surface thereof, respectively, the strength and the fatigue strength of those portion 30 of the non-standard structure can increase as a result of structural minuteness and increase of the hardness, enough to withstand against the high stress amplitude and to increase the life time. For this reason, further reduction in size and weight of the wheel support bearing assembly can be accomplished and the input weight of product manufacturing of the wheel support bearing assembly can advantageously be reduced to thereby reduce the cost.

It is to be noted that in the foregoing embodiment, each of the portions 30 of the non-standard structure may be selectively provided with a plurality of portions 30 which results in an arbitrarily chosen combination.

Figure 7B:
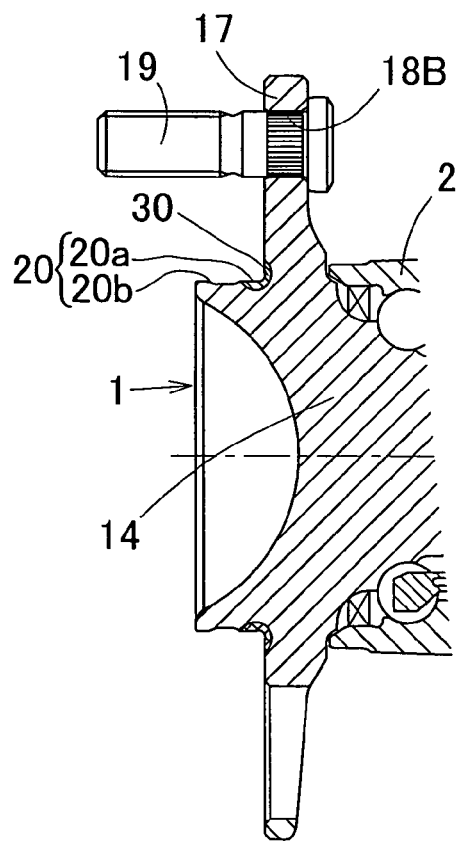
FIG. 7B is a fragmentary longitudinal sectional view showing a modified form of the wheel support bearing assembly according to the third preferred embodiment of the present invention.

The wheel support bearing assembly according to a third preferred embodiment of the present invention as shown in FIGS. 7A and 7B is substantially similar to the wheel support bearing assembly according to the first embodiment shown in and described with particular reference to FIG. 1, but is modified therefrom to permit it to be used for supporting a vehicle driven wheel. In this third embodiment, as hereinbefore described, the wheel hub 14 is rendered to be of a type having no throughhole such as identified by 21 in connection with the first embodiment shown in and described with reference to FIG. 1. Also, the inner race segment 15 is axially fixedly mounted on the wheel hub 14 by means of a crimped portion 14b formed by crimping an inboard end of the hub axle 14a of the wheel hub 14 in a direction radially outwardly.

In the embodiment shown in and described with reference to FIGS. 7A and 7B, that portion 30 of the non-standard structure may be provided only in the surface area of the root portion of the wheel mounting flange 17. Also, as shown in FIG. 7A, as is the case with the example shown in FIG. 6, the entire annular outboard and inboard surfaces of the wheel mounting flange 17 and those portions of the outer member 2 similar to those portion in the example of FIG. 6 may be provided with a respective portion 30 which exhibits the non-standard structure.

Effects brought about by the employment of that portion 30 of the non-standard structure are similar to those afforded by the first embodiment shown in and described with reference to FIG. 1. Also, in the case of the wheel support bearing assembly of a type having such crimped portion 14b as employed in the example shown in and described with particular reference to FIG. 7, the crimped portion 14b will not be hardened and, therefore, any crimping work will not be disturbed where that portion 30 of the non-standard structure is formed by showering the coolant during or at the end of the hot forging step effected to the wheel hub 14 to thereby cool a portion of the wheel hub 14.

FIGS. 8A to 8I illustrate other preferred embodiments of the present invention, respectively. In those embodiments, unless otherwise specifically described, they are substantially similar to the first embodiment shown in and described with reference to FIGS. 1 to 5. Also, in each of those embodiments, where that portion 30 which is rendered to be the non-standard structure is employed at a plurality of locations, that portion 30 of the non-standard structure in each embodiment may be selectively include a plurality of portions 30, each of which is either one of them or an arbitrarily chosen combination thereof. When in each of those embodiments, that portion 30 of the non-standard structure is employed, such effects can be obtained that the minuteness of such structure and the increased hardness can result in increase of the strength and the fatigue strength, resulting in increase of the lifetime and reduction of, for example, fretting wear as a result of the increase of the hardness. In FIGS. 8A and 8B to FIGS. 15A and 15B, the affix "A" to each of those figure numbers indicates a corresponding one of the fourth to eleventh preferred embodiments, whereas the affix "B" to each of those figure numbers indicates a corresponding one of modified forms of the respective fourth to eleventh preferred embodiments, in which that portion 30 of the non-standard structure is formed at a location different from that in the fourth to eleventh embodiments.

Figure 8A:
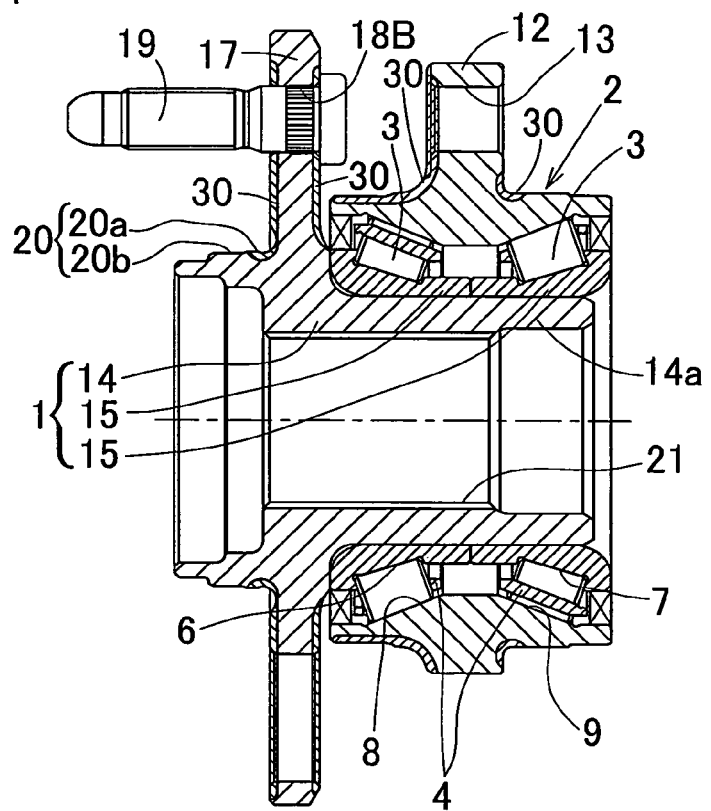
FIG. 8A is a longitudinal sectional view of the wheel support bearing assembly according to a fourth preferred embodiment of the present invention.
Figure 8B:
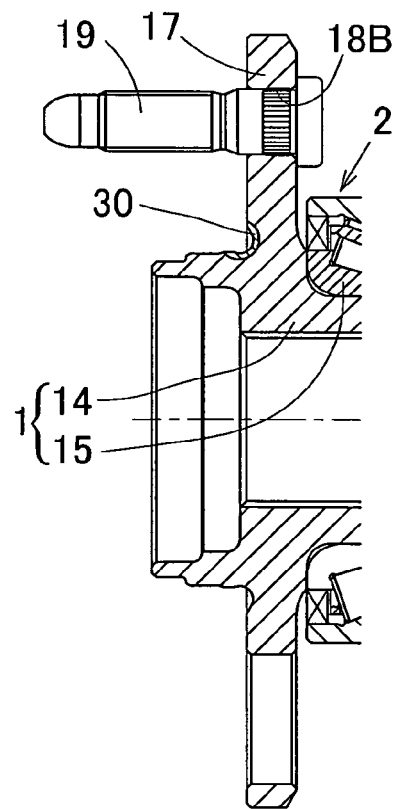
FIG. 8B is a fragmentary longitudinal sectional view showing a modified form of the wheel support bearing assembly according to the fourth preferred embodiment of the present invention.

The wheel support bearing assembly shown in FIGS. 8A and 8B is a tapered roller bearing type for the support of a vehicle drive wheel, in which the inner member 1 is made up of a wheel hub 14 and a plurality of, for example, two inner race segments 15 mounted on an outer periphery of an hub axle 14a of the wheel hub 14. The inner race segments 15 are provided one for each row. The outer member 2 is a member of one-piece construction.

FIG. 8B illustrates an example, in which the root portion of the wheel mounting flange 17 in the wheel hub 14 is rendered to be a portion 30 of the non-standard structure. In FIG. 8A, as is the case with the example of FIG. 6, the entire annular inboard and outboard surfaces of the wheel mounting flange 17 of the wheel hub 14, which are opposite to each other, a surface area ranging from the annular outboard surface of the wheel mounting flange 17, which is remote from the vehicle body fitting side, to an outer peripheral surface of the brake pilot 20a at the root portion of the wheel mounting flange 17, and a root portion of the inboard side surface of the vehicle body fitting flange 12 are rendered to be a respective portion 30 of the non-standard structure.

Figure 9A:
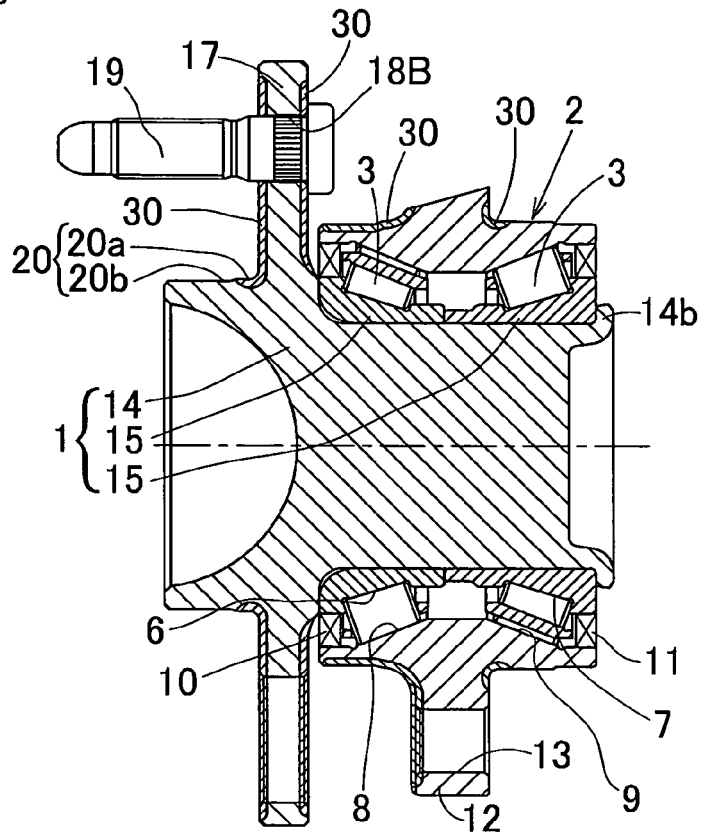
FIG. 9A is a longitudinal sectional view of the wheel support bearing assembly according to a fifth preferred embodiment of the present invention.
Figure 9B:
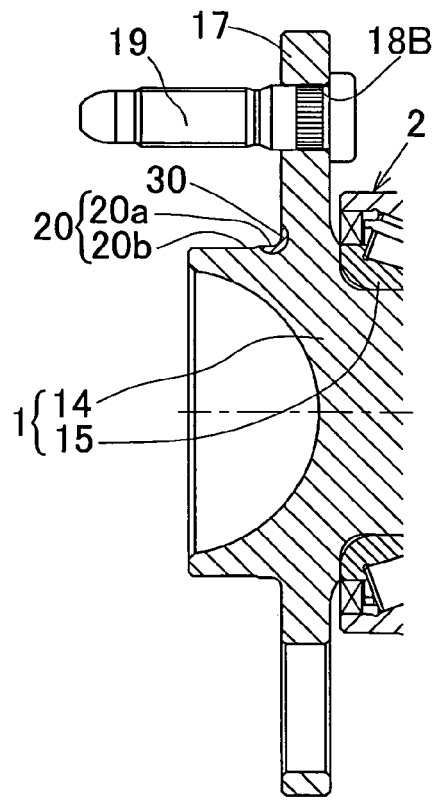
FIG. 9B is a fragmentary longitudinal sectional view showing a modified form of the wheel support bearing assembly according to the fifth preferred embodiment of the present invention.

FIGS. 9A and 9B illustrate the wheel support bearing assembly, which is similar to that shown in and described with reference to each of FIGS. 8A and 8B, but modified to render it to be used for supporting a vehicle driven wheel, in which the wheel hub 14 has defined therein no throughhole such as identified by 21 in the previously described embodiments. Also, the inner race segment 15 is fixed in position to the wheel hub 14 by means of the crimped portion 14b. Other structural features than those described above are substantially similar to those shown in and described with reference to each of FIGS. 8A and 8B.

Figure 10A:
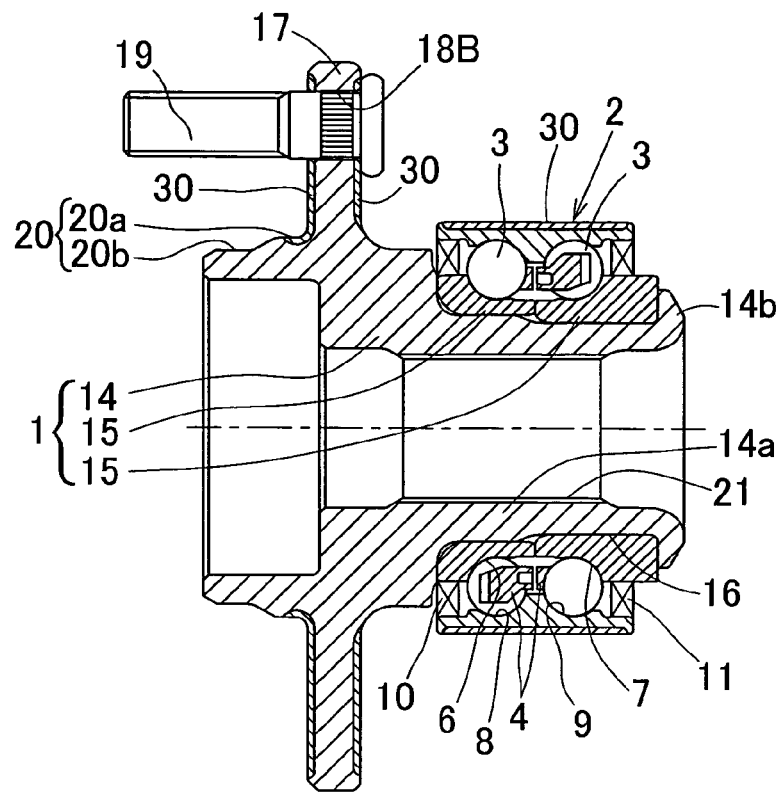
FIG. 10A is a longitudinal sectional view of the wheel support bearing assembly according to a sixth preferred embodiment of the present invention.
Figure 10B:
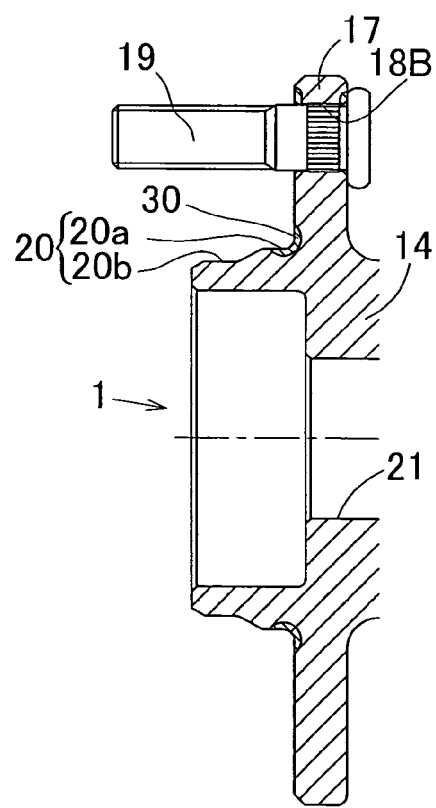
FIG. 10B is a fragmentary longitudinal sectional view showing a modified form of the wheel support bearing assembly according to the sixth preferred embodiment of the present invention.

The wheel support bearing assembly shown in each of FIGS. 10A and 10B is of an angular contact ball bearing type for use in supporting a vehicle drive wheel, in which the inner member 1 is made up of a wheel hub 14 and double rows of inner race segments 15 mounted on an outer periphery of an hub axle 14a of the wheel hub 14. The inner race segments 15 are provided one for each row and the inner race segment 15 on the inboard side may have a thickness and an axial dimension which are greater than those of the inner race segment 15 on the outboard side. Also, the inner race segments 15 and 15 are axially fixed to the wheel hub 14 by means of that crimped portion 14b provided in the wheel hub 14. The outer member 2 is in the form of a member of one-piece construction having an outer diametric surface rendered to be a cylindrical surface over the entirety and no vehicle body fitting flange such as employed in the example of FIG. 1 and shown by 12 is employed.

FIG. 10B is an example, in which the root portion of the wheel mounting flange 17 in the wheel hub 14 is rendered to be a portion 30 of the non-standard structure. In FIG. 10A, the opposite annular side surfaces of the wheel mounting flange 17 and the outer diametric surface of the outer member 2 are formed as that portion 30 of the non-standard structure.

Where as shown in FIG. 10A, the outer diametric surface of the outer member 2 is rendered to be that portion 30 of the non-standard structure, the fretting wear, which will take place in respective mating surfaces of the knuckle (not shown) for fixing the outer member 2 and the outer member 2 can be suppressed because of the high hardness of that portion 30 of the non-standard structure present on the outer diametric surface.

Figure 11A:
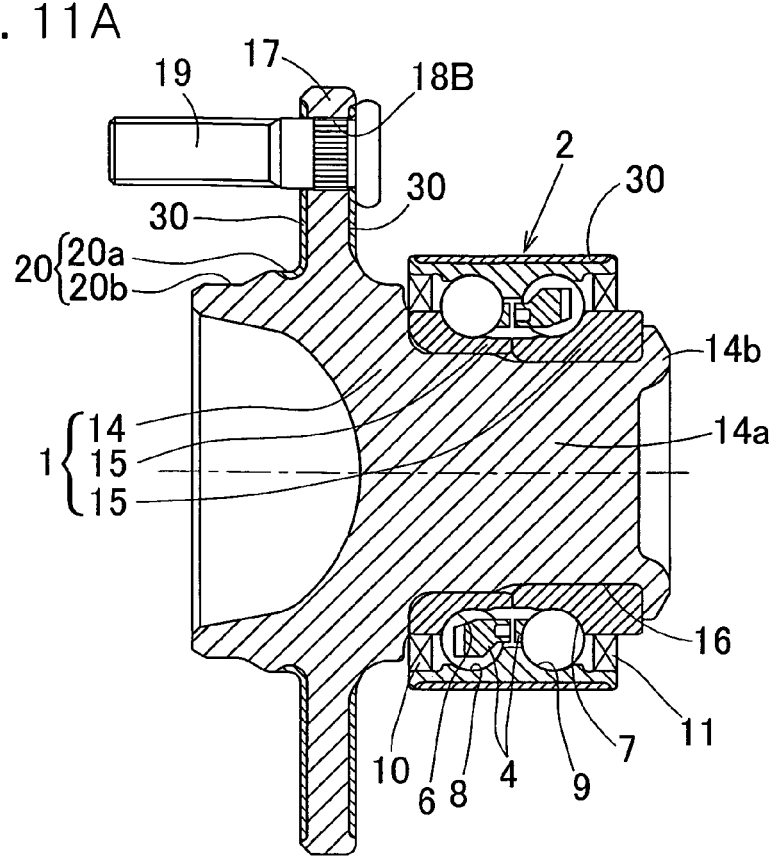
FIG. 11A is a longitudinal sectional view of the wheel support bearing assembly according to a seventh preferred embodiment of the present invention.
Figure 11B:
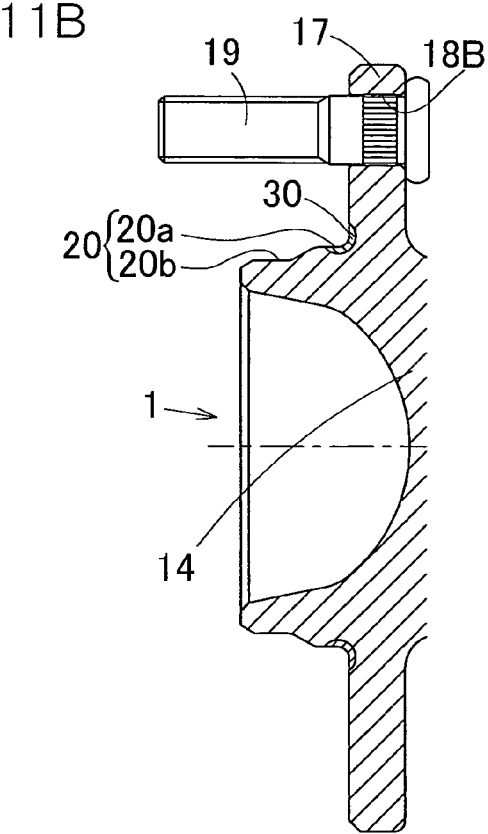
FIG. 11B is a fragmentary longitudinal sectional view showing a modified form of the wheel support bearing assembly according to the seventh preferred embodiment of the present invention.

FIGS. 11A and 11B illustrate the wheel support bearing assembly, which is similar to that shown in and described with reference to each of FIGS. 10A and 10B, but modified to render it to be used for supporting a vehicle driven wheel, in which the wheel hub 14 has a central portion having defined therein no throughhole such as identified by 21 in the previously described embodiments. Other structural features thereof than those described above are substantially similar to those of the wheel support bearing assembly shown in and described with reference to each of FIGS. 8A and 8B.

Figure 12A:
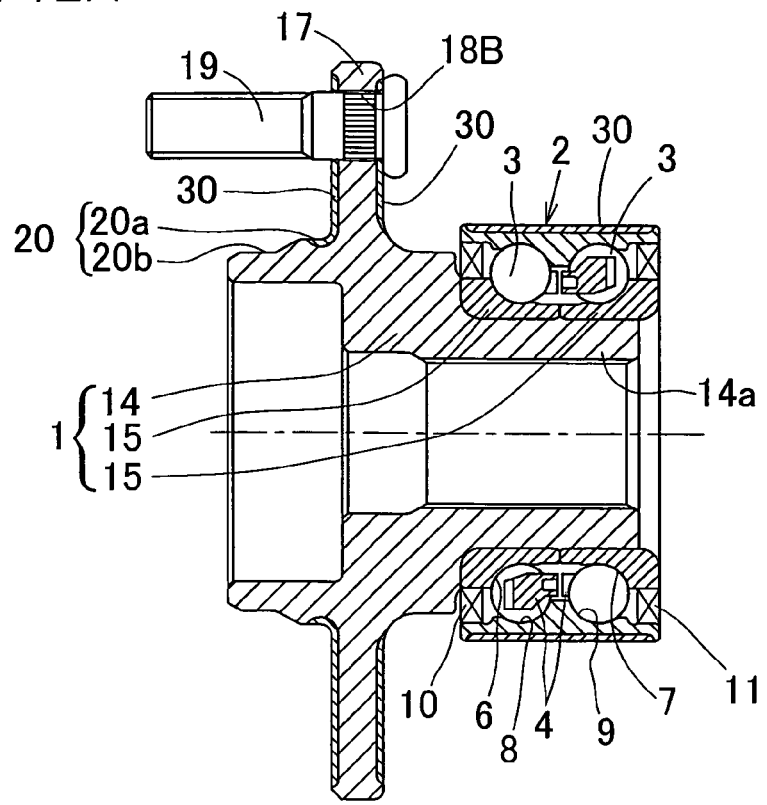
FIG. 12A is a longitudinal sectional view of the wheel support bearing assembly according to an eighth preferred embodiment of the present invention.
Figure 12B:
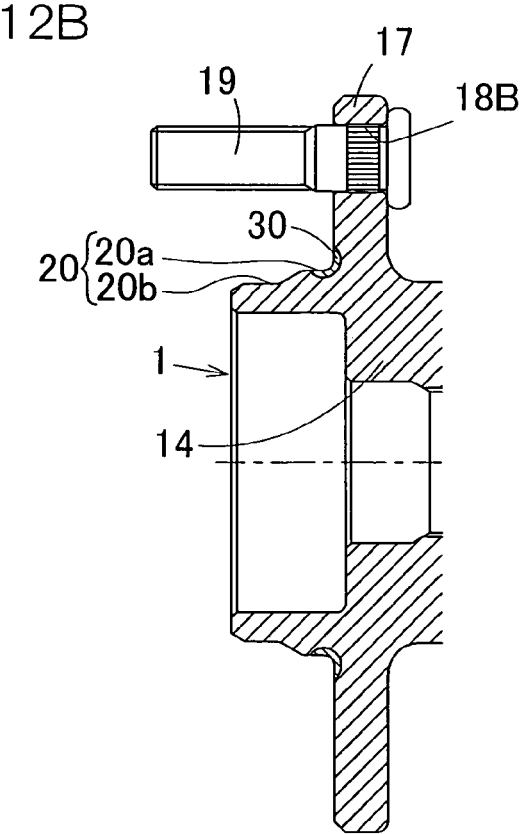
FIG. 12B is a fragmentary longitudinal sectional view showing a modified form of the wheel support bearing assembly according to the eighth preferred embodiment of the present invention.

The wheel support bearing assembly shown in each of FIGS. 12A and 12B is similar to the wheel support bearing assembly shown in and described with particular reference to each of FIGS. 10A and 10B, in which the inner member 1 is made up of the wheel hub 14 and the double rows of the inner race segments 15 mounted on the outer periphery of the hub axle 14a of the wheel hub 14. The outer member 2 is a member of one-piece construction, having no wheel mounting flange such as identified by 12 in the previously described embodiments. In the illustrated instance, the two inner race segments 15 are of the same size and fixing of the inner race segments 15 axially relative to the wheel hub 14 is accomplished not by the use of a crimping technique, but by means of a constant velocity joint (not shown) coupled with the wheel hub 14. That portion 30 to be rendered as the non-standard structure is the same as that in the example shown in and described with particular reference to each of FIGS. 10A and 10B.

Figure 13A:
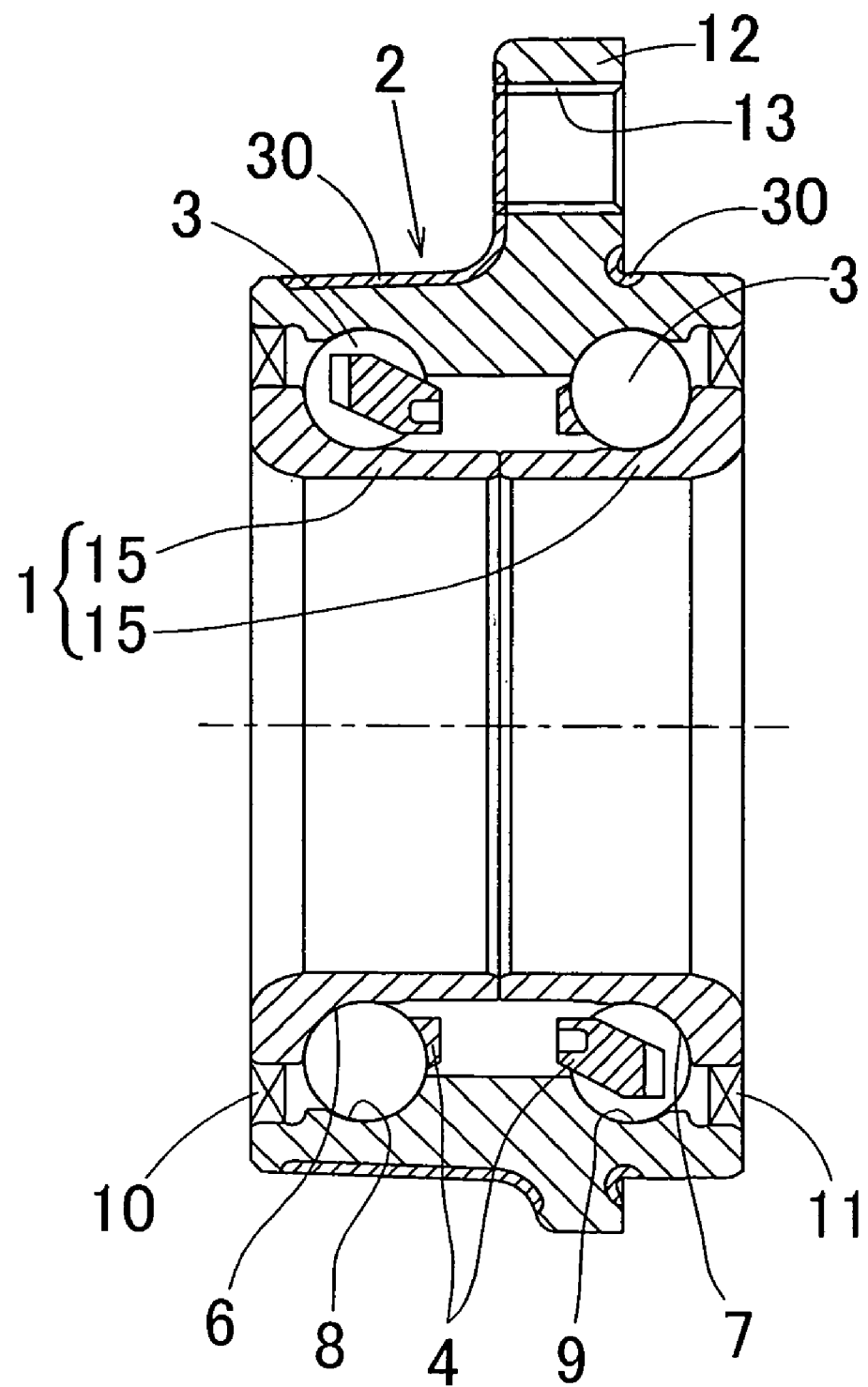
FIG. 13A is a longitudinal sectional view of the wheel support bearing assembly according to a ninth preferred embodiment of the present invention.
Figure 13B:
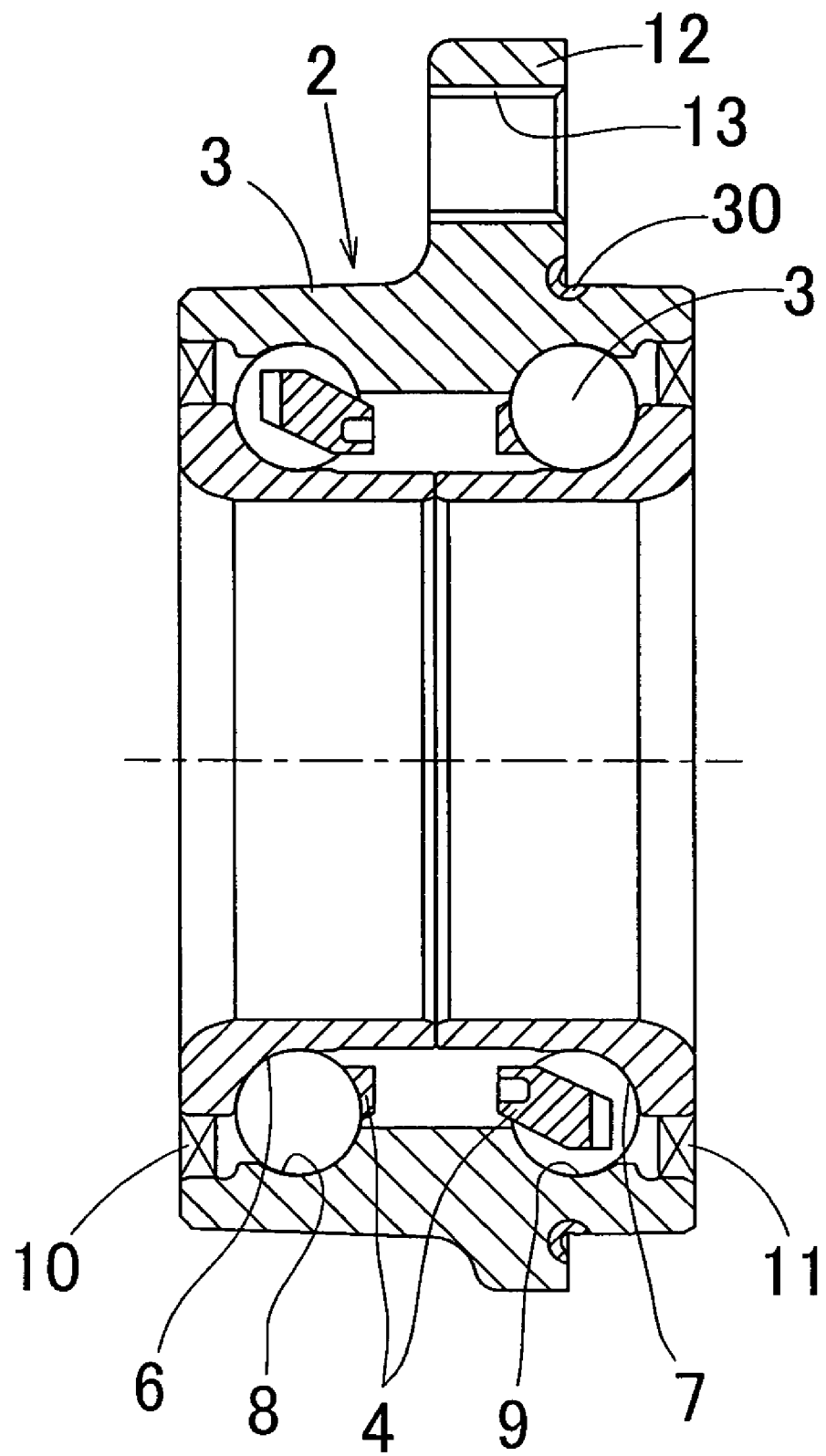
FIG. 13B is a fragmentary longitudinal sectional view showing a modified form of the wheel support bearing assembly according to the ninth preferred embodiment of the present invention.

The wheel support bearing assembly shown in each of FIGS. 13A and 13B is an inner race segment rotating model of a second generation, in which the outer member 2 has a vehicle body fitting flange 12 and the inner member 1 is made up of a plurality of, for example, two rows of inner race segments 15 and the wheel hub (not shown) having a hub axle with the inner race segments 15 mounted on the outer periphery of the hub axle. The hub axle is of a type having the wheel mounting flange as is the case with the example shown in each of FIGS. 12A and 12B.

In the example shown in FIG. 13A, that portion of the non-standard structure is provided in a surface area of the outer member 2 ranging from the opposite annular side surfaces of the vehicle body fitting flange 12 to the outer diametric surface thereof.

In the example shown in FIG. 13B, that portion 30 of the non-standard structure is provided at the root portion of the vehicle body fitting flange 12.

It is to be noted that the wheel hub (not shown), on which the inner race segments 15 are mounted, may have that portion 30 of the non-standard structure provided at the root portion of the wheel mounting flange 17 or the opposite annular side surfaces thereof.

Figure 14A:
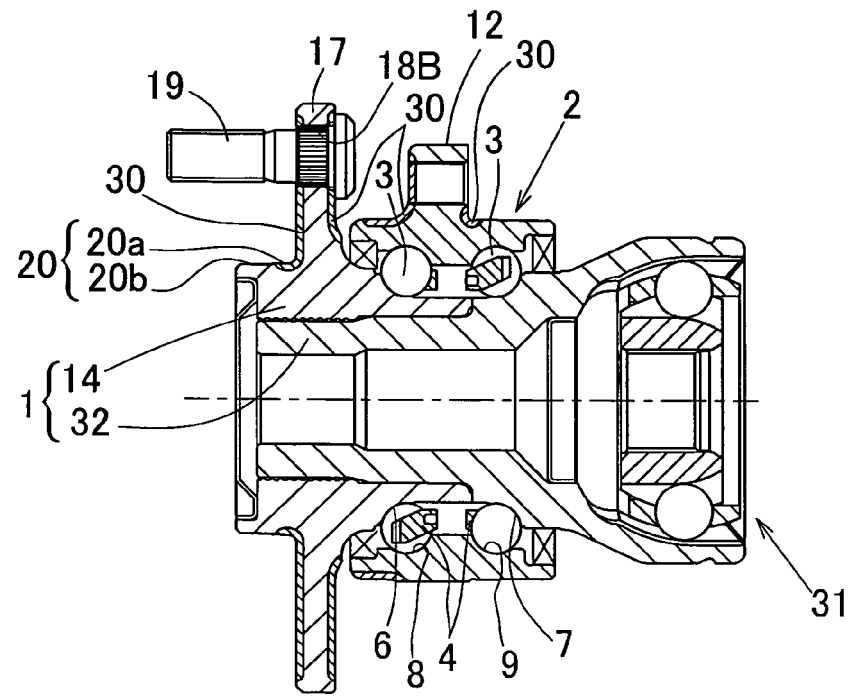
FIG. 14A is a longitudinal sectional view of the wheel support bearing assembly according to a tenth preferred embodiment of the present invention.
Figure 14B:
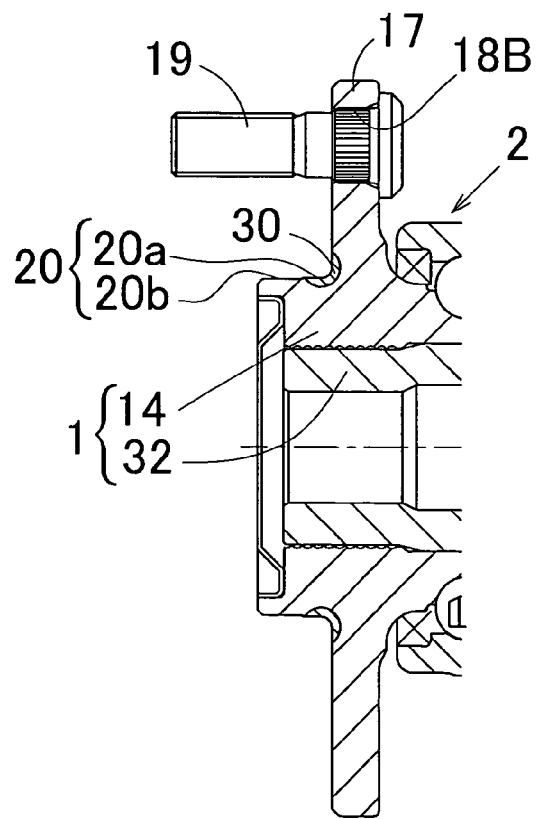
FIG. 14B is a fragmentary longitudinal sectional view showing a modified form of the wheel support bearing assembly according to the tenth preferred embodiment of the present invention.

The wheel support bearing assembly shown in each of FIGS. 14A and 14B is of a fourth generation type, in which the inner member 1 is made up of the wheel hub 14 and a joint outer ring 32, which is one of coupling members forming respective parts of a constant velocity joint 31, with rows of raceways 6 and 7 being formed respectively on the wheel hub 14 and the joint outer ring 32. The outer member 2 is of one-piece construction, having a vehicle body fitting flange 12.

FIG. 14B illustrates an example, in which the root portion of the wheel mounting flange 17 integral with the wheel hub 14 is rendered to be that portion 30 of the non-standard structure. On the other hand, FIG. 14A illustrates an example, in which the annular opposite side surfaces of the wheel mounting flange 17 and a surface area of the outer member ranging from the opposite annular side surface of the vehicle body fitting flange 12 to the outer diametric surface thereof are rendered to be that portion 30 of the non-standard structure.

Figure 15A:
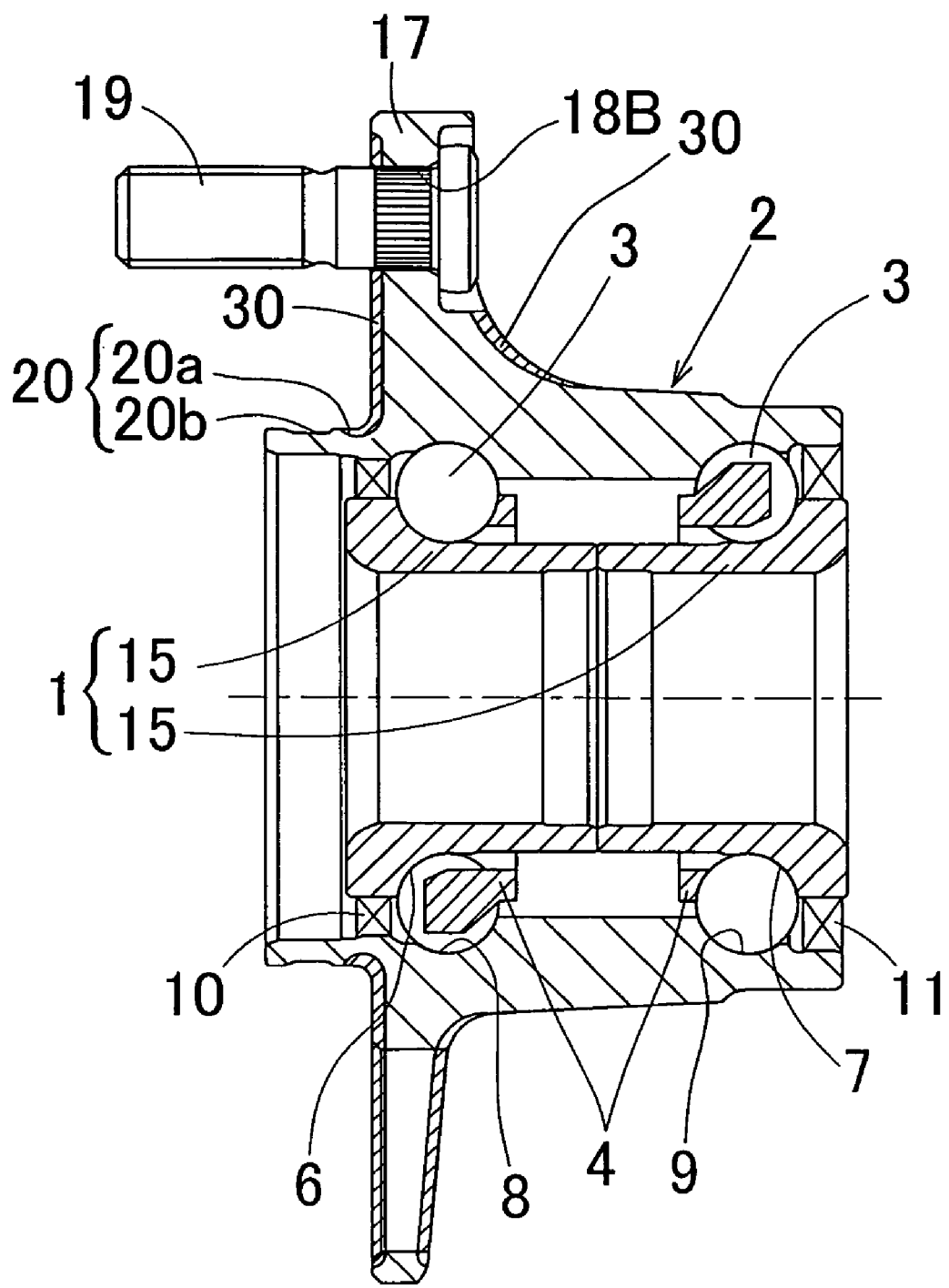
FIG. 15A is a longitudinal sectional view of the wheel support bearing assembly according to an eleventh preferred embodiment of the present invention.
Figure 15B:
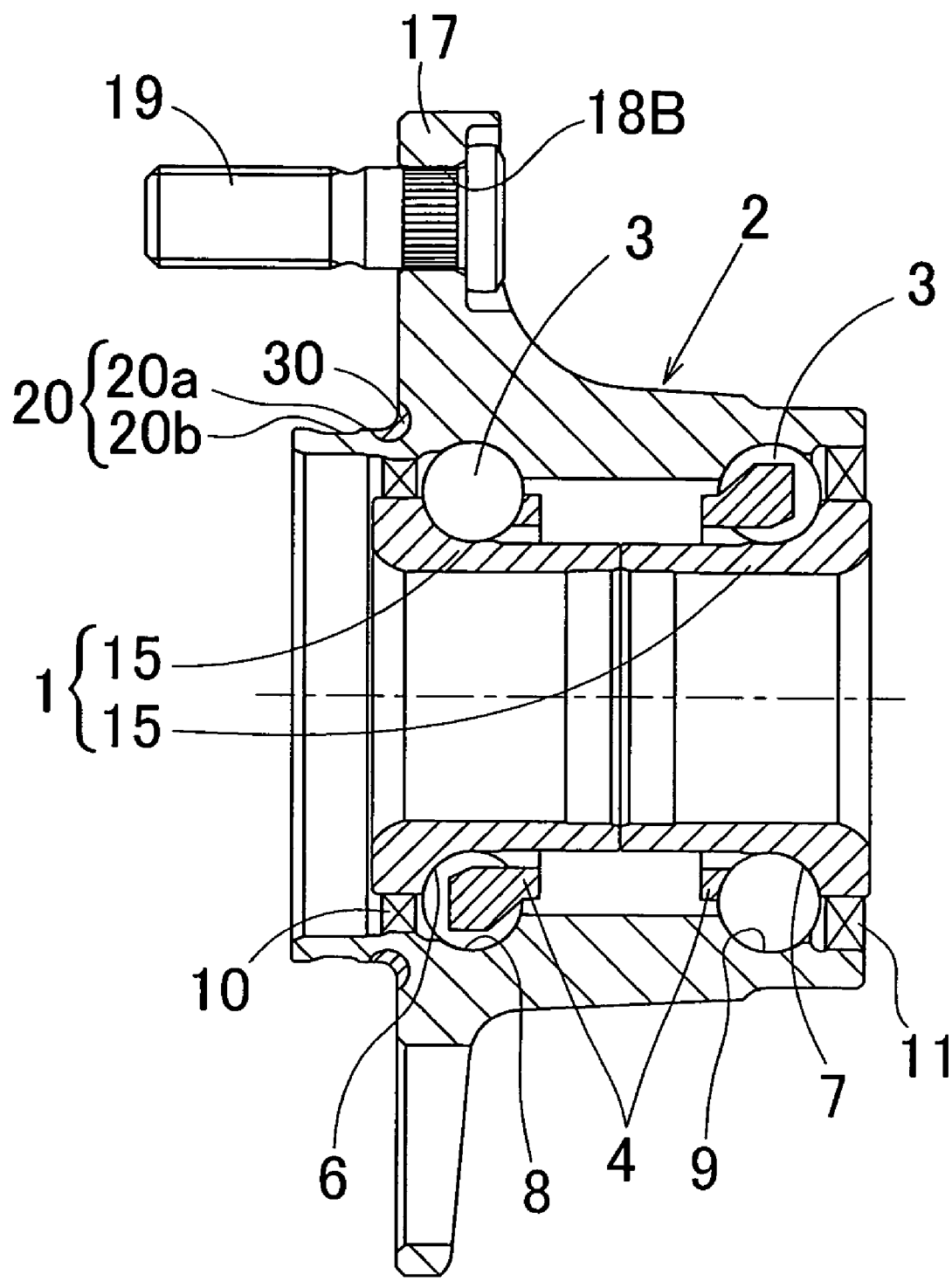
FIG. 15B is a longitudinal sectional view showing a modified form of the wheel support bearing assembly according to the eleventh preferred embodiment of the present invention.

The wheel support bearing assembly shown in FIGS. 15A and 15B is an outer member rotating model of a second generation type, in which the inner member 1 is in the form of a plurality of rows of inner race segments 15. The outer member is provided with the wheel mounting flange 17 and the pilot portion 20.

FIG. 15B illustrates an example, in which the root portion of the wheel mounting flange 17 integral with the outer member 2 is rendered to be that portion 30 of the non-standard structure. On the other hand, FIG. 15A illustrates an example, in which the annular opposite side surfaces of the wheel mounting flange 17 and the outer diametric surface of the outer member 2 are rendered to be that portion 30 of the non-standard structure.

In any one of the embodiments described hereinbefore, a component part forming either one or both of the inner and outer members 1 and 2 has been shown and described as having its surface provided locally with that portion 30 of the non-standard structure. However, the component part forming either one or both of the inner and outer members 1 and 2, for example, the wheel hub 14 or the outer member 2 may have an entire surface rendered to be that portion 30 of the non-standard structure.

It is to be noted that in any one of the foregoing embodiments described above, a product which has been shown and described as obtained by cooling at the end of the hot forgoing step may be a standard hot forged product which has been heated and then cooled.

Figure 16:
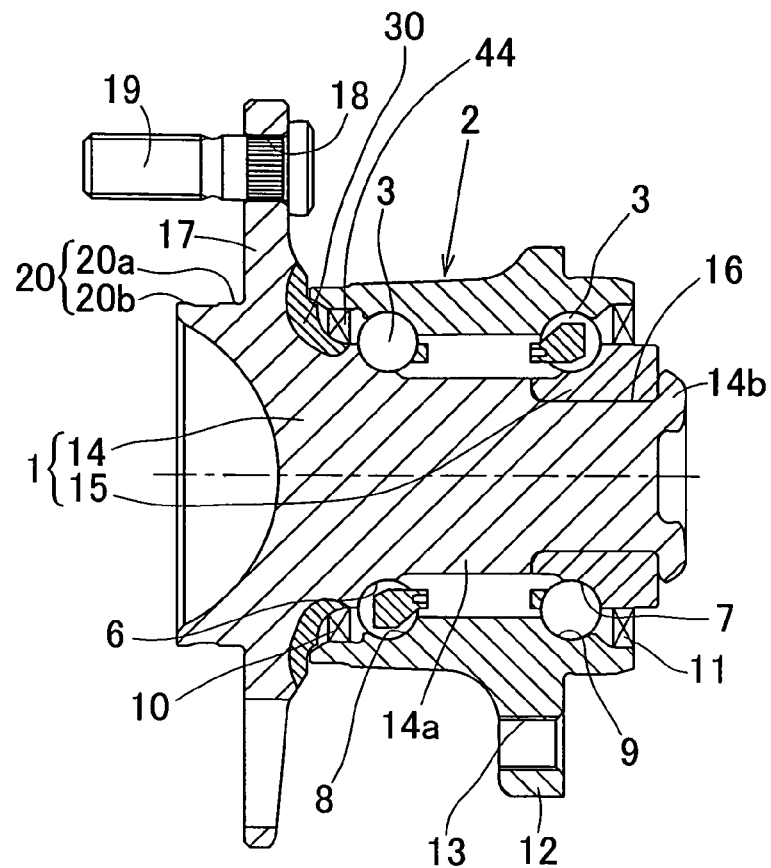
FIG. 16 is a longitudinal sectional view of the wheel support bearing assembly according to a twelfth preferred embodiment of the present invention.
Figure 17:
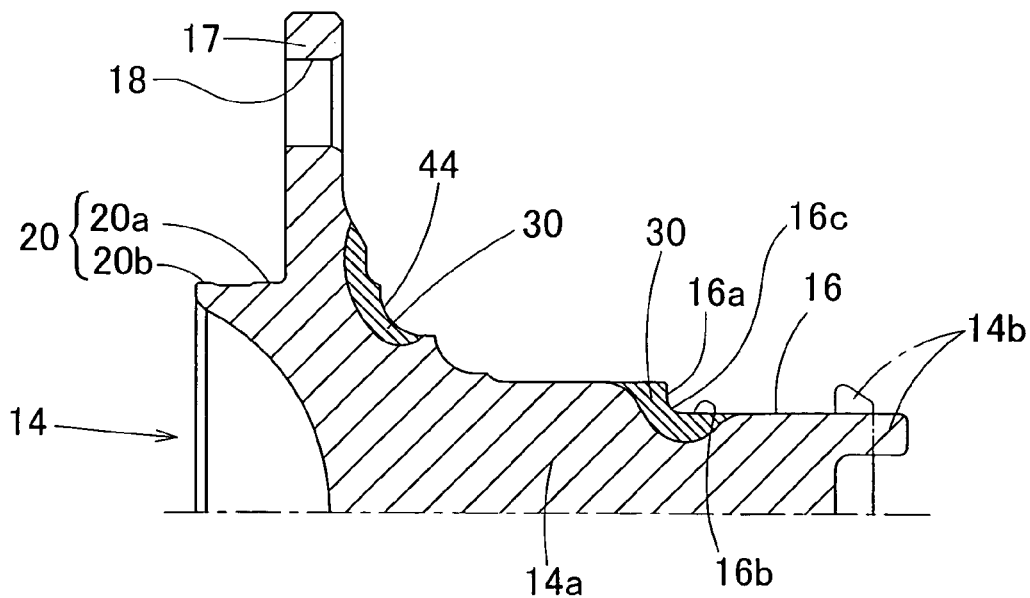
FIG. 17 is a fragmentary longitudinal sectional view showing the wheel hub employed in the wheel support assembly according to the twelfth preferred embodiment of the present invention.

The twelfth preferred embodiment of the present invention will now be described with particular reference to FIGS. 16 and 17. FIG. 16 illustrates an example of the wheel support bearing assembly, which is of a third generation type for supporting a vehicle driven wheel.

Any of the wheel hub 14, the inner race segments 15 and the outer member 2 is a hot forged product of steel material and, of them, the surface of the outer periphery of the hub axle 14a of the wheel hub 14 is rendered to be that portion 30 of the non-standard structure. More specifically, of the outer peripheral surface of the hub axle 14a of the wheel hub 14, a portion of the outer member 2, which defines a seal contact surface 44 defined in a portion of the outer member 2 where a sealing member 10 secured to an outboard end of the outer member 2 contacts, and an inner race segment mounting surface 16 are rendered to be that portion 30 of the non-standard structure. The seal contact surface 44 referred to above is a portion lying between the wheel mounting flange 17 and the outboard raceway 6 and that portion 30 of the non-standard structure is formed over the root portion of the wheel mounting flange 17. The inner race segment mounting surface 16 may have its entire surface rendered to be that portion 30 of the non-standard structure, but an axially oriented stepped annular face 16a of the inner race segment mounting surface 16 and a peripheral portion 16b in the vicinity thereof are rendered to be that portion 30 of the non-standard structure.

Although the various cooling methods have been described with particular reference to FIG. 5, the cooling methods represented respectively by the curves (3) and (4) of that represent respectively by the curves (5) and (6) out of the cooling methods represented respectively by the curves (1) to (6) shown in FIG. 5 are preferably employed particularly where that portion 30 of the non-standard structure is to be provided in the seal contact surface 44 in the wheel hub 14 and a portion thereof in the vicinity of the inner race segment mounting surface 16.

According to the wheel support bearing device of the foregoing construction, the following effects can be obtained. Since of the hub axle 14a of the wheel hub 14 the respective surface portions 30 of the seal contact surface 44 and in the vicinity of the inner race segment mounting surface 16 are formed as the non-standard structure, which is one of the fine ferrite-pearlite structure, the upper bainite structure, the lower bainite structure, the tempered martensite structure and the mixed structure comprised of two or more of those structures, the strength of the hub axle 14a can be increased to allow it to have an increased life time. Specifically, during, for example, the cornering of the automotive vehicle, deflection of a large amplitude occurs repeatedly in the wheel mounting flange 17, accompanied by repeated high stresses occurring at that root portion of the flange 17 and a corner R portion 16c of the inner race segment mounting surface 16. Against the repeated high stresses occurring in the manner described above, where the non-standard structural portion 30 of the seal contact surface 44 in the vicinity of the root portion of the wheel mounting flange and the surface portion 30 in the vicinity of the inner race segment mounting surface 16 is of the non-standard structure referred to above, the structure can be minute as compared with the matrix portion represented by the standard structure and, also, the hardness will become equal to or higher than that of the matrix portion and, accordingly, the fatigue strength can increase as a result of minuteness of the structure and increase of the hardness as discussed above. For this reason, as compared with the conventional wheel hub containing the standard structure, not only can the strength be increased enough to allow it to withstand against a high stress amplitude, but also an undesirable occurrence of cracking in the vicinity of the root portion of the wheel mounting flange 17 and, also, in the corner R portion 16c of the inner race segment mounting surface 16 can be suppressed to increase the life time. In other words, such a function as occurrence of a cracking→increase of a displacement of the wheel mounting flange 17→increase of vibrations of the automotive vehicle→damage to the wheel support bearing device can be suppressed to allow the life time to be increased. Also, considering that the hardness of the seal contact surface 44 is increased as a result of that seal contact surface 44 having been rendered to be of the non-standard structure 30, frictional wear resulting from sliding contact with the sealing member can be reduced.

Because of the foregoing, as compared with the wheel support bearing device containing the conventional standard structure, reduction in both size and weight can be accomplished and, accordingly, the input weight of product manufacturing of the wheel support bearing device can advantageously be reduced to thereby reduce the cost, making it possible to provide the wheel support bearing device at an inexpensive price.

Also, the inner race segment mounting surface 16 of the wheel hub 14 is susceptible to fretting wear when finely vibrated relative to the inner race segment 15 in a direction circumferentially of the inner race segment 15. However, the provision of the portion 30 of the non-standard structure as hereinabove described is effective to suppress the fretting wear as a result of the structural minuteness and the increased hardness. Because of it, an undesirable reduction in durability, which would result from rusting, frictionally worn particles and/or bite occur, can be avoided.

Since that portion 30 of the non-standard structure can be obtained by effecting the cooling during the hot forging step or at the end of the hot forging step, addition of a simple process is sufficient and an undesirable reduction in productivity, which would otherwise be brought about as a result of increase of the process steps, can be suppressed. By way of example, as compared with normalizing or quenching-and-tempering that is performed, the process can be simplified. Also, since heat evolved in the hot forging is utilized, the amount of energies used in a process of refinement of the structure can be reduced unlike the induction heat treatment or the like. Yet, no problem associated with heat strain occurring in the case of the induction heat treatment will occur. Although the raceway 6 in the wheel hub 14 is subjected to the induction hardening as shown by Process (B) in FIG. 4, it is enough for such induction hardening to be applied only to the raceway 6 and, since the range over which the treatment is carried out is so small, the amount of electric power consumed can be minimized.

Since that portion 30, which is rendered to be the non-standard structure, is a local portion of the hub axle 14a of the wheel hub 14, any possible reduction in processability such as, for example, capability of being machined can be minimized and, also, since the crimped portion 14b remains having the standard structure, any possible reduction in crimping workability can be avoided.

It is to be noted that although in the foregoing embodiment, of the hub axle 14a of the wheel hub 14, the seal contact surface 44 and the inner race segment mounting surface 16 have been shown and described as both provided with that portion 30 of the non-standard structure, that portion 30 of the non-standard structure may be provided only one of the seal contact surface 44 and the inner race segment mounting surface 16.

Figure 18:
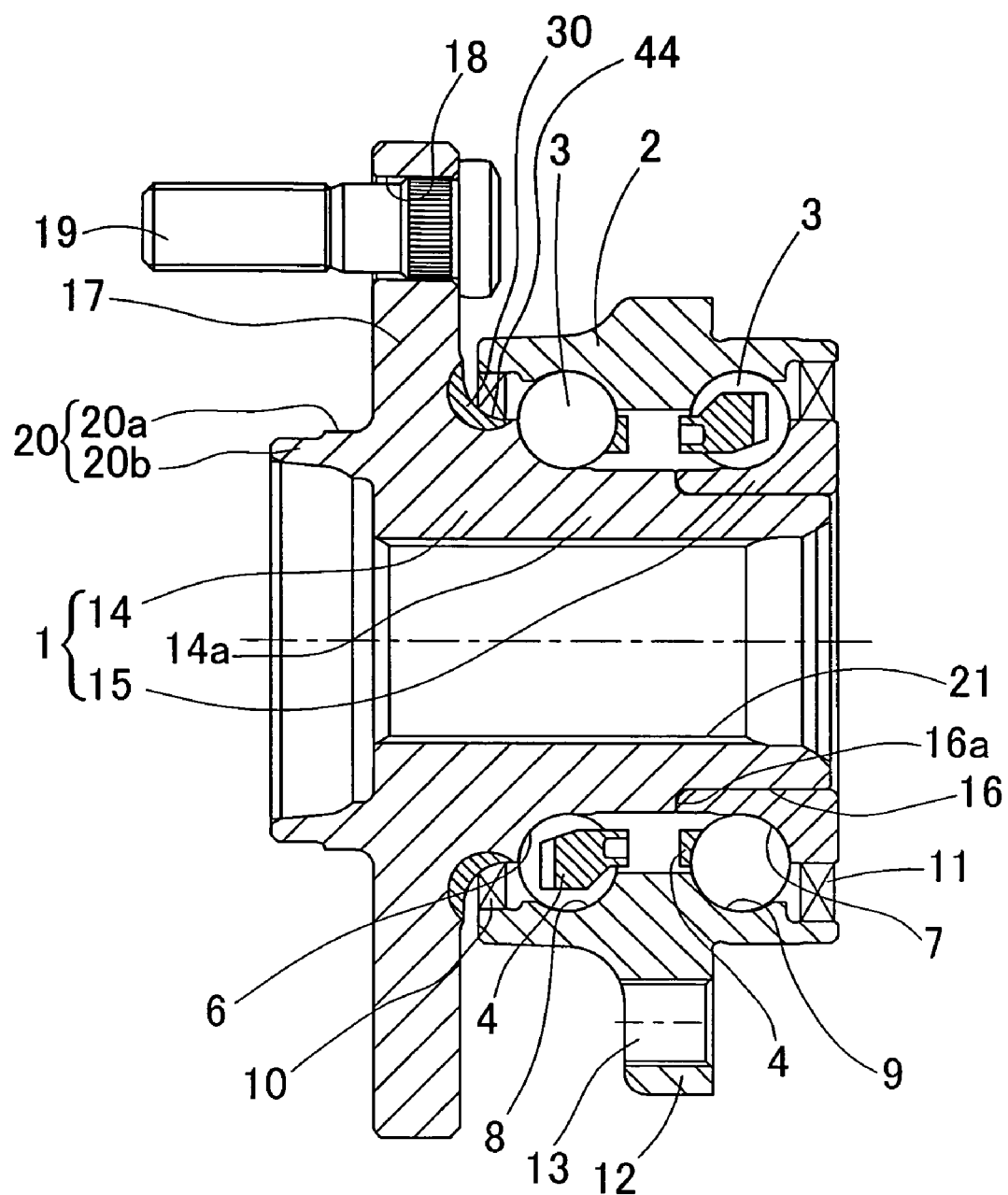
FIG. 18 is a longitudinal sectional view of the wheel support bearing assembly according to a thirteenth preferred embodiment of the present invention.

The thirteenth preferred embodiment shown in FIG. 18 is similar to the wheel support bearing assembly according to the embodiment shown in and described with reference to FIG. 16, but differs therefrom in that the wheel support bearing assembly shown in FIG. 18 is designed to permit it to be used for supporting a vehicle drive wheel. In this embodiment, the center portion of the wheel hub 14 is formed with a throughhole 21, through which a stem portion (not shown) of an outer race of the constant velocity joint is inserted. Axial fixing of the inner race segment 15 to the wheel hub 14 is accomplished not by the use of a crimped portion 14b such as employed in the example of FIG. 1, but by means of fastening of a nut (not shown) threadingly engaged on a tip of the stem portion while a stepped face of the outer race of the constant velocity joint is held in abutment with an end face of the inner race segment 15.

Figure 19:
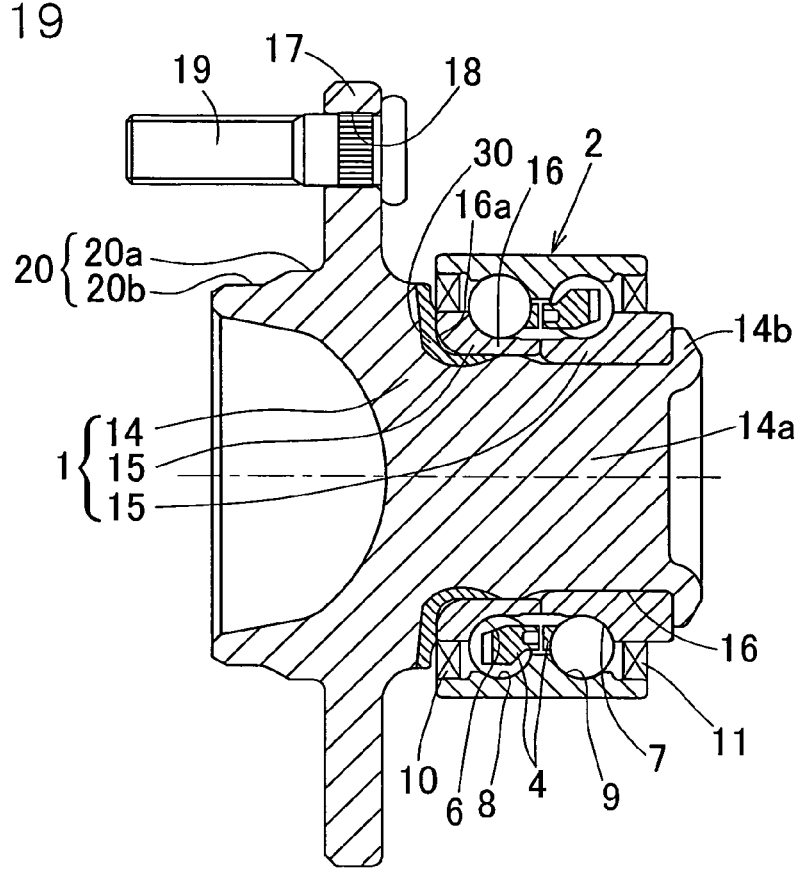
FIG. 19 is a longitudinal sectional view of the wheel support bearing assembly according to a fourteenth preferred embodiment of the present invention.

The wheel support bearing assembly according to the fourteenth preferred embodiment shown in FIG. 19 is of an angular contact ball bearing type for use in supporting a vehicle driven wheel, in which the inner member 1 is made up of a wheel hub 14 and a plurality of rows of inner race segments 15 mounted on an outer periphery of a hub axle 14a of the wheel hub 14. The inner race segments 15 are provided one for each row and the inner race segment 15 on the inboard side may have a thickness and an axial dimension, which are greater than those of the inner race segment 15 on the outboard side. Also, the inner race segments 15 are axially fixed to the wheel hub 14 by means of a crimped portion 14b provided in the wheel hub 14. The outer member 2 is in the form of a member of one-piece construction having an outer diametric surface rendered to be a cylindrical surface over the entirety and no vehicle body fitting flange such as identified by 12 in the example of FIG. 16 is employed.

In this embodiment, an surface area of the inner race segment mounting surface 16, on which the double rows of the inner race segments 15 of the wheel hub 14 are mounted, are rendered to be that portion 30 of the non-standard structure. Although the entire surface area of the inner race segment mounting surface 16 may be rendered to be that portion 30 of the non-standard structure, in the instance as shown therein that portion 30 of the non-standard structure is formed in an axially oriented annular stepped face 16a of the inner race segment mounting surface 16 and a peripheral surface portion in the vicinity of such annular stepped face 16a.

Where as hereinabove described that portion 30 of the non-standard structure is provided in the surface area of the inner race mounting surface 16, the fretting wear of the wheel hub 14 can be suppressed because of the high hardness of that portion 30 of the non-standard structure.

Figure 20:
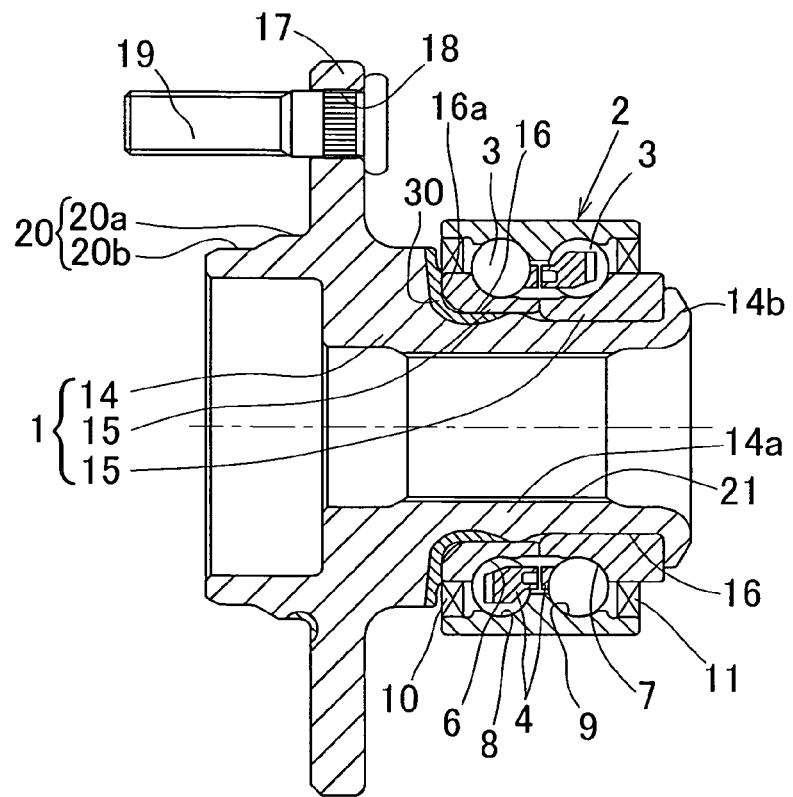
FIG. 20 is a longitudinal sectional view of the wheel support bearing assembly according to a fifteenth preferred embodiment of the present invention.

The fifteenth preferred embodiment shown in FIG. 20 is similar to the wheel support bearing assembly shown in and described with reference to FIG. 19, but differs therefrom in that wheel support bearing assembly shown in FIG. 20 is designed to allow it to be used for supporting a vehicle drive wheel. Accordingly, the wheel hub 14 has the throughhole 21 defined in the central portion thereof. Other structural features than those described above are substantially similar to those shown in and described with reference to FIG. 19.

Figure 21:
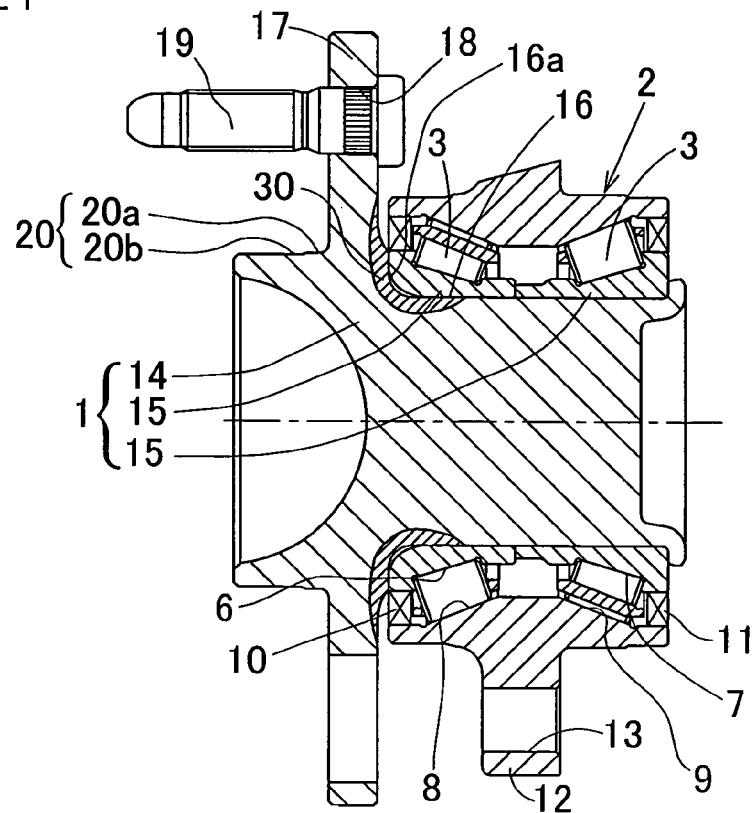
FIG. 21 is a longitudinal sectional view of the wheel support bearing assembly according to a sixteenth preferred embodiment of the present invention.

The wheel support bearing assembly according to the sixteenth preferred embodiment shown in FIG. 21 is a tapered roller bearing type for the support of a vehicle driven wheel, in which the inner member 1 is made up of a wheel hub 14 and a plurality of inner race segments 15 mounted on an outer periphery of a hub axle 14a of the wheel hub 14. The inner race segments 15 are provided one for each row. The outer member 2 is a member of one-piece construction having a vehicle body fitting flange 12 formed integrally therewith.

Even in this embodiment, that portion 30 of the non-standard structure is provided in the surface area of the inner race segment mounting surface 16 of the wheel hub 14, on which the double rows of the inner race segments 15 are mounted. Although the entire surface area of the inner race segment mounting surface 16 may be rendered to be that portion 30 of the non-standard structure, in the instance as shown therein that portion 30 of the non-standard structure is provided in an axially oriented annular stepped face 16a of the inner race segment mounting surface 16 and a peripheral surface portion in the vicinity of such annular stepped face 16a. Even in this embodiment, the fretting wear can be prevented by the provision of that portion 30 of the non-standard structure.

Figure 22:
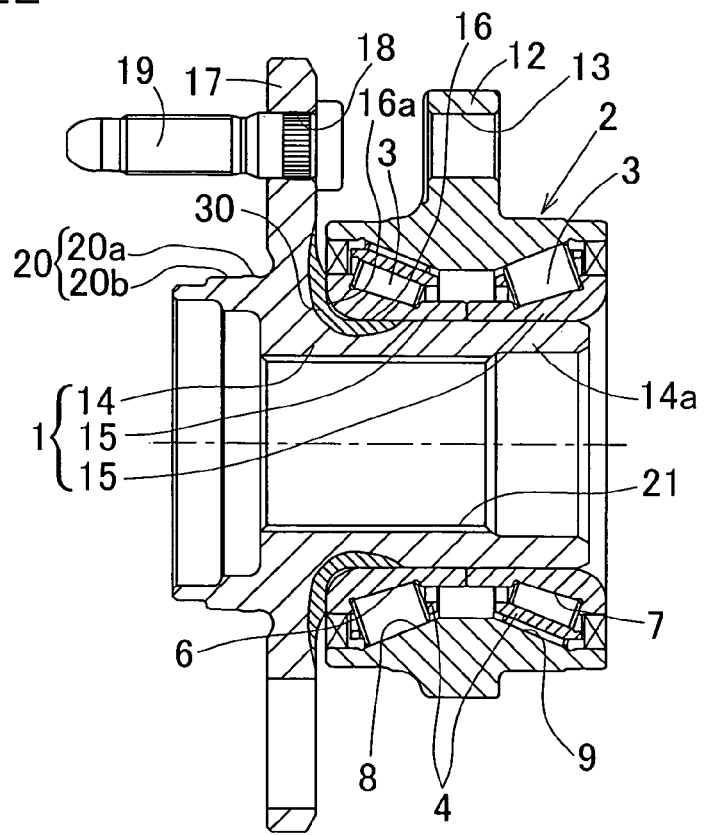
FIG. 22 is a longitudinal sectional view of the wheel support bearing assembly according to a seventeenth preferred embodiment of the present invention.

The seventeenth preferred embodiment shown in FIG. 22 is similar to the wheel support bearing assembly shown in and described with reference to FIG. 21, but differs therefrom in that the wheel support bearing assembly shown in FIG. 22 is designed to permit it to be used for supporting a vehicle drive wheel. Accordingly, the wheel hub 14 has a throughhole 21 defined in a center thereof. Also, the inner race segments 15 are axially fixed to the wheel hub 14 without relying on the crimped portion 14b in the wheel hub 14, but by means of coupling with the constant velocity joint (not shown). Other structural features thereof than those described hereinabove are substantially similar to those of the wheel support bearing assembly shown in and described with reference to FIG. 21.

It is to be noted that in any one of the respective embodiments shown in FIGS. 21 and 22, it may be designed to be an angular contact ball bearing type, instead of being a tapered roller bearing type.

Figure 23:
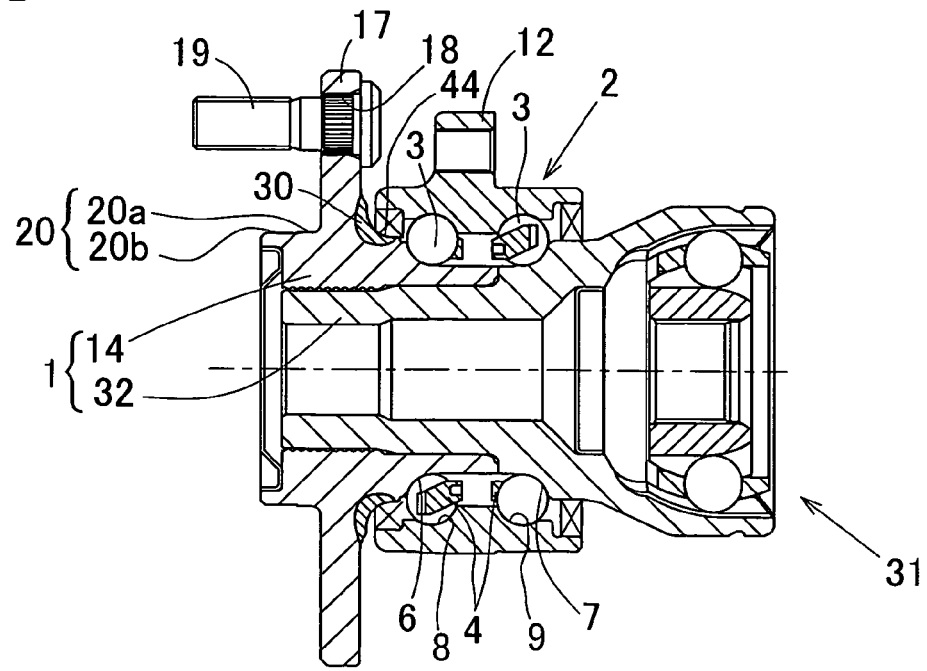
FIG. 23 is a longitudinal sectional view of the wheel support bearing assembly according to a eighteenth preferred embodiment of the present invention.

The wheel support bearing assembly according to the eighteenth preferred embodiment shown in FIG. 23 is of a fourth generation type, in which the inner member 1 is made up of a wheel hub 14 and a joint outer ring 32, which is one of coupling members forming respective parts of a constant velocity joint 31, with rows of raceways 6 and 7 being formed respectively on the wheel hub 14 and the joint outer ring 32. The wheel hub 14 is mounted on an outer periphery of a hollow stem portion of the joint outer ring 32 and the wheel hub 14 and the joint outer ring 32 are coupled together by means of a diameter expansion of the stem portion. The outer member 2 is of one-piece construction, having a vehicle body fitting flange 12.

In this embodiment, a portion of the outer peripheral surface of the wheel hub 14, which eventually defines an outboard seal contact surface 44, is rendered to be that portion 30 of the non-standard structure.

In the case of this embodiment, since that portion which defines the outboard seal contact surface 44 is rendered to be the portion 30 of the non-standard structure, the fatigue strength can be increased as a result of the structure minuteness and the hardness increase.

Figure 24:
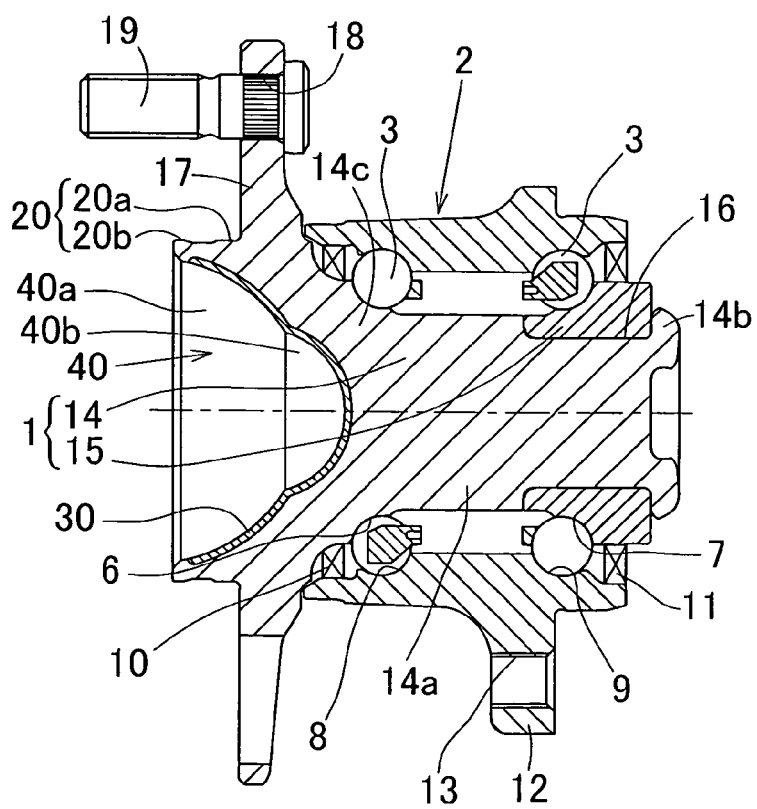
FIG. 24 is a longitudinal sectional view of the wheel support bearing assembly according to a nineteenth preferred embodiment of the present invention.

The nineteenth preferred embodiment of the present invention will now be described with particular reference to FIGS. 24 and 25. FIG. 24 illustrates an example of the wheel support bearing assembly, which is applied to a third generation type for supporting a vehicle driven wheel.

A portion of the outboard end face of the wheel hub 14, which lies radially inwardly of the pilot portion 20, is rendered to be an axially depressed recess 40. This recess 40 is depressed in a direction axially of the wheel hub 14 so as to represent a generally spherical recess and a bottom portion 40b thereof may be of a spherical shape having a radius of curvature smaller than that of an open side portion 40a. This recess 40 has a deepest area that is axially deeply depressed from an inboard side surface of the wheel mounting flange 17, terminating at an axial position in the vicinity of the outboard raceway 6 on the wheel hub 14. The boundary between the bottom portion 40b and the open side portion 40a lies at a location in the vicinity of the axial position of the inboard side surface of the wheel mounting flange 17.

Any of the wheel hub 14, the inner race segments 15 and the outer member 2 is a hot forged product of steel material. Of them, an approximately entire surface area of the inner surface of the recess 40 at the end face of the wheel hub 14 is rendered to be that portion 30 of the non-standard structure. A matrix portion of the wheel hub 14 is of the standard structure.

Although the various cooling methods have been described with particular reference to FIG. 5, any of the cooling methods represented respectively by the curves (1) to (4) out of the cooling methods represented respectively by the curves (1) to (6) shown in FIG. 5 is preferably employed particularly where that portion 30 of the non-standard structure is to be formed inside the recess 40 in the wheel hub 14 such as shown in the example of FIG. 24. Also, any of the cooling methods represented respectively by the cooling curves (5) and (6) may also be employed equally.

According to the wheel support bearing assembly of the foregoing construction, the following effects can be obtained. Since the surface area inside the recess 40 at the end face of the wheel hub 14 is rendered to be that portion 30 of the non-standard structure and since such non-standard structure is chosen to be one of the fine ferrite-pearlite structure, the upper bainite structure, the lower bainite structure, the tempered martensite structure and the mixed structure comprised of two or more of those structures, a portion 14c intermediate between the inner surface of the recess 40 and the outer peripheral surface of the hub axle 14a of the wheel hub 14 can have an increased strength and a increased life time. Specifically, during, for example, the cornering of the automotive vehicle, deflection of a large amplitude occurs repeatedly in the wheel mounting flange 17, accompanied by repeated high stresses occurring at that root portion of the flange 17. Such high stress sets up even in that portion 14c of the outer periphery of the recess 40 in the hub axle 14a of the wheel hub 14, which defines the root portion. Against the repeated high stresses occurring in the manner described above, where the inner surface portion 30 of the recess 40 is the non-standard structure, the structure can be minute as compared with the matrix portion represented by the standard structure and, also, the hardness will become equal to or higher than that of the matrix portion and, accordingly, the fatigue strength can increase as a result of minuteness of the structure and increase of the hardness as discussed above. For this reason, as compared with the conventional wheel mounting flange containing the standard structure, not only can the wheel mounting flange be highly strengthened and withstand stresses of a high amplitude, but also an undesirable occurrence of cracking in the recess outer peripheral portion 14c can be suppressed to increase the life time. In other words, such a function as occurrence of a cracking→increase of a displacement of the wheel mounting flange 17→increase of an amplitude of the automotive vehicle→damage to the wheel support bearing assembly can be suppressed to allow the life time to be increased.

Because of the foregoing, while an attempt is made to reduce the weight with the recess 40 increased in size as large as possible, it is possible to increase the strength and the fatigue strength of the recess outer peripheral portion 14c of the hub axle 14a, which are enough to withstand against the high stress and repeated stress.

Because of the foregoing, as compared with the wheel conventional support bearing assembly containing the standard structure, reduction in both size and weight can be accomplished and, accordingly, the input weight of product manufacturing of the wheel support bearing assembly can advantageously be reduced to thereby reduce the cost, making it possible to provide the wheel support bearing assembly at an inexpensive price.

Since that portion 30 of the non-standard structure can be obtained by effecting the cooling during the hot forging step or at the end of the hot forging step, addition of a simple process is sufficient and an undesirable reduction in productivity which would otherwise be brought about as a result of increase of the process steps can be suppressed. By way of example, as compared with normalizing and quenching-and-tempering, the process can be simplified. Also, since heat evolved in the hot forging is utilized, the amount of energies used in a process of refinement of the structure can be reduced unlike the induction heat treatment. Yet, no problem associated with heat strain, which tends to occur in the case of the induction heat treatment, will occur.

Since that portion 30, which is rendered to be the non-standard structure, is the inner surface of the recess 40, any possible reduction in processability such as, for example, capability of being machined and capability of being crimped to define the crimped portion 14b can be minimized.

Figure 26:
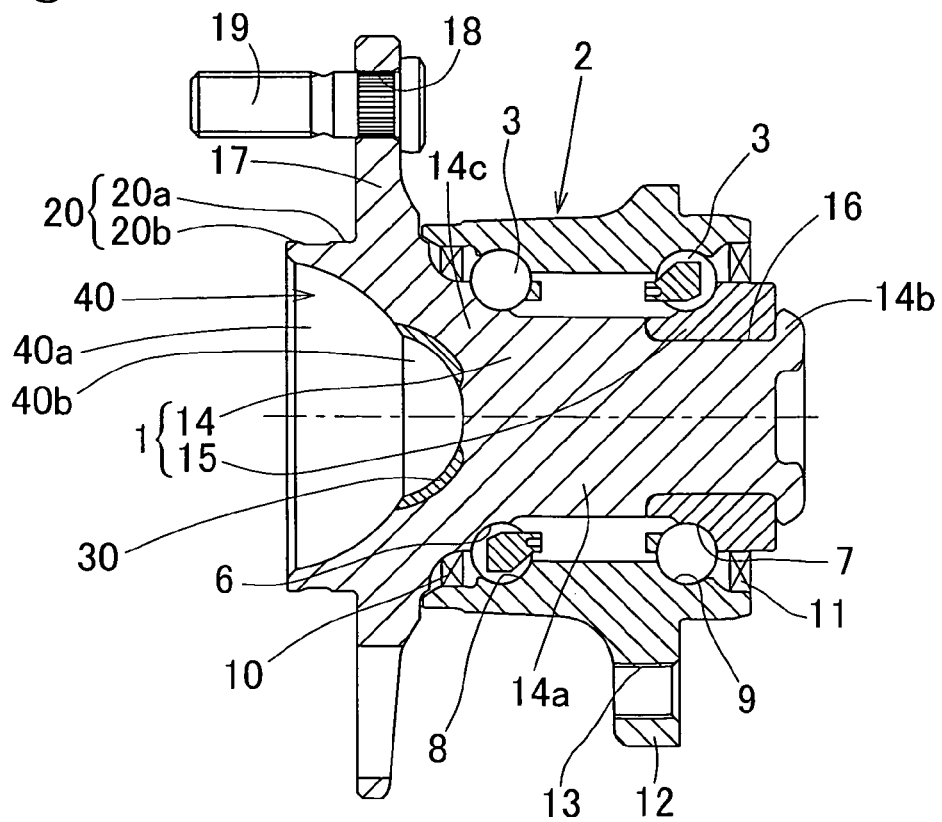
FIG. 26 is a longitudinal sectional view showing a modified form of the wheel support bearing assembly according to the nineteenth preferred embodiment of the present invention.

It is to be noted that although in the foregoing embodiment, the approximately entire surface inside the recess 40 at the end face of the wheel hub 14 has been shown and described as having been rendered to be that portion 30 of the non-standard structure, that portion 30 of the non-standard structure may be formed only in the bottom portion 40b of the recess 40 as shown in FIG. 26. In this instance, an annular inner surface portion ranging from a location in the vicinity of the inboard side face of the wheel mounting flange 17 to a location in the vicinity of the deepest portion of the recess 40 is rendered to be that portion 30 of the non-standard structure. Also, of the axially inwardly depressed spherical surface portions of the recess 40 having two different radii of curvature, the bottom portion 40b of the recess 40, which is a spherical surface portion of the recess 40 having a smaller radius of curvature, is provided with that portion 30 of the non-standard structure.

Since of the outer peripheral portion 14c of the recess 40, a portion intermediate between the wheel mounting flange 17 and the raceway 6 tends to be susceptible to the repeated stress from the wheel mounting flange 17, the strength and the fatigue strength can be increased against the high stress and the repeated stress acting through the wheel mounting flange 17 even though that portion 30 of the non-standard structure is formed only in the bottom portion 40b as described hereinabove.

FIGS. 27 to 30 illustrate twentieth to twenty-third preferred embodiments of the present invention, respectively. In those embodiments, as a result of that portion 30 of the non-standard structure formed in the inner surface of the recess 40, it is possible to increase the strength and fatigue strength of a portion of the hub axle 14a in the vicinity of the recess 40, which are sufficient to withstand against the high stress and the repeated stress, while reduction in weight can be concurrently achieved as a result of the provision of the recess 40 in the end face of the wheel hub 14 and, therefore, it is accordingly possible to suppress any undesirable reduction in productivity, which would be otherwise brought about as a result of an increase of the cost of energies and of the number of process steps necessitated to achieve refinement.

Figure 25:
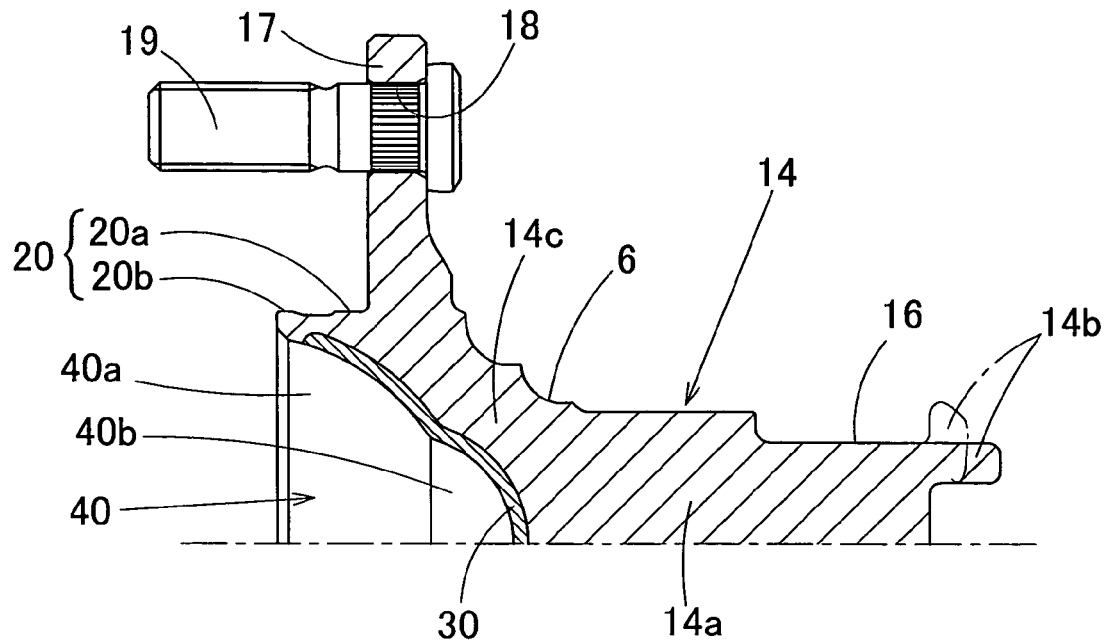
FIG. 25 is a fragmentary longitudinal sectional view showing the wheel hub employed in the wheel support bearing assembly according to the nineteenth preferred embodiment of the present invention.

It is to be noted that unless otherwise specifically described, each of those embodiments is substantially similar to the nineteenth embodiment shown in and described with particular reference to FIGS. 24 and 25.

Also, in describing each of the embodiments shown respectively in FIGS. 27 to 30, that portion 30 of the non-standard structure has been shown and described as formed on the approximately entirety of the inner surface of the recess 40. However, in each of those embodiments shown respectively in FIGS. 27 to 30, that portion 30 of the non-standard structure may be formed only in the bottom portion 40b, which is a portion of the recess 40 as is the case with the embodiment shown in and described with reference to FIG. 26.

Figure 27:
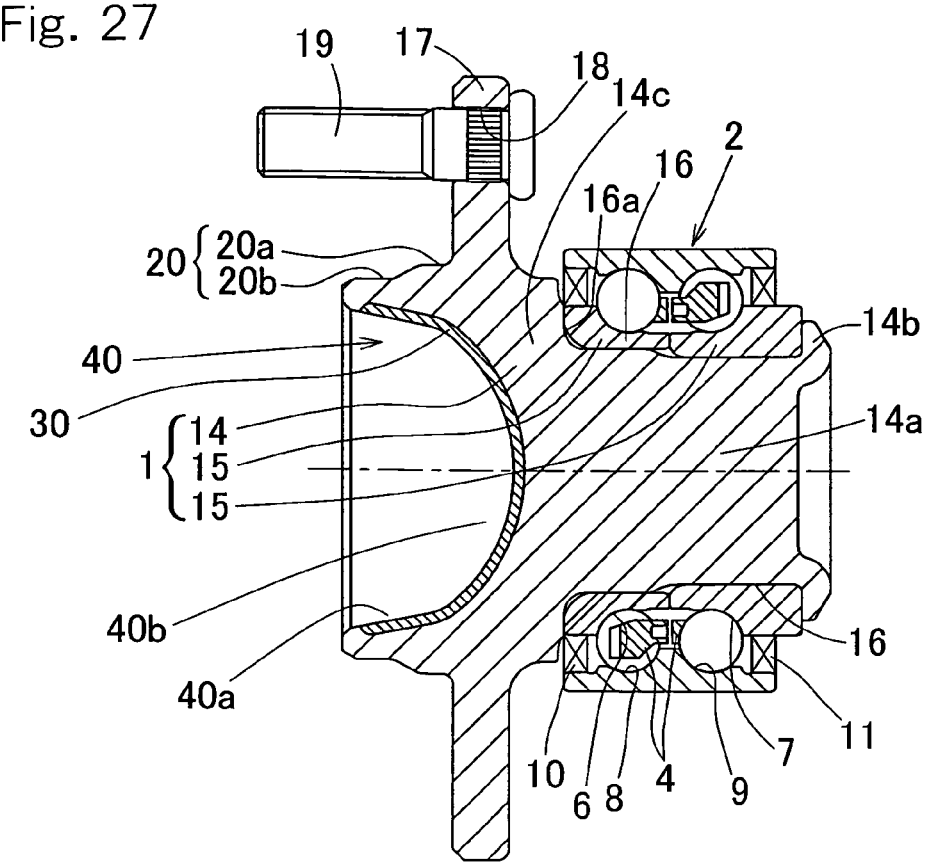
FIG. 27 is a longitudinal sectional view of the wheel support bearing assembly according to a twentieth preferred embodiment of the present invention.

The wheel support bearing assembly shown in FIG. 27 is of an angular contact ball bearing type for the support of a vehicle driven wheel, in which the inner member 1 is made up of the hub axle 14 and the plural rows of the inner race segments 15 mounted on the outer periphery of the hub axle 14a of the wheel hub 14. The inner race segments 15 are employed one for each row and the inner race segment 15 on the inboard side may have a thickness and an axial dimension, which are greater than those of the inner race segment 15 on the outboard side. Also, the inner race segments 15 are axially fixed to the wheel hub 14 by means of that crimped portion 14b provided in the wheel hub 14. The outer member 2 is in the form of a member of one-piece construction having an outer diametric surface rendered to be a cylindrical surface over the entirety and no vehicle body fitting mounting flange such as identified by 12 in the example of FIG. 24 is employed.

Figure 28:
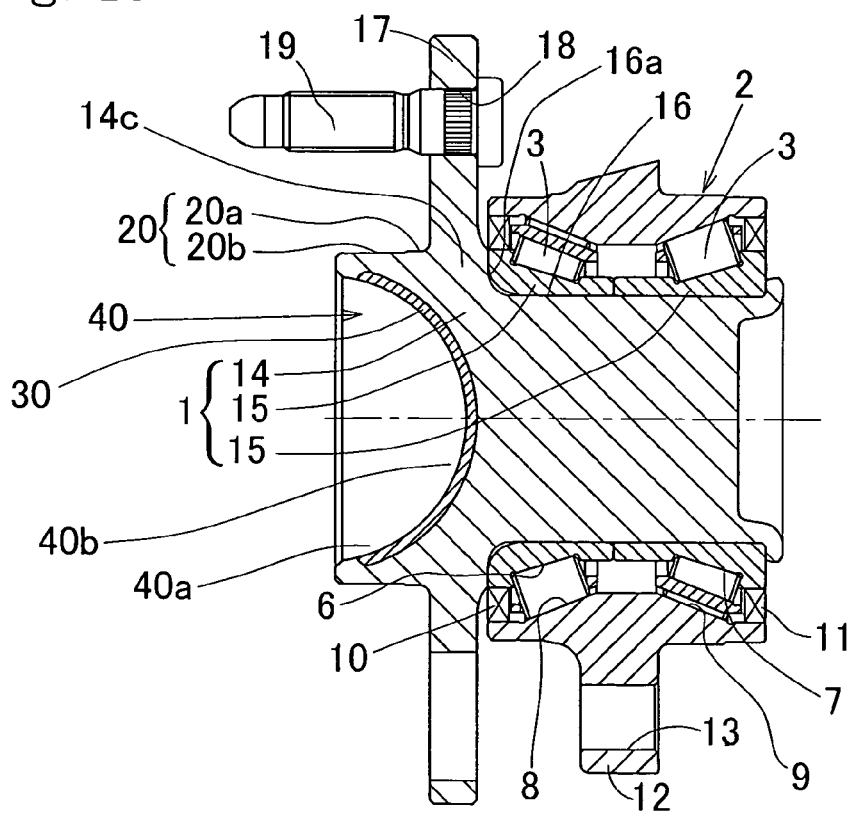
FIG. 28 is a longitudinal sectional view of the wheel support bearing assembly according to a twenty-first preferred embodiment of the present invention.

The wheel support bearing assembly shown in FIG. 28 is a tapered roller bearing type for the support of a vehicle driven wheel, in which the inner member 1 is made up of the wheel hub 14 and the plural rows of the inner race segments 15 mounted on the outer periphery of the hub axle 14a of the wheel hub 14. The inner race segments 15 are employed one for each row. The outer member 2 is a member of one-piece construction.

Figure 29:
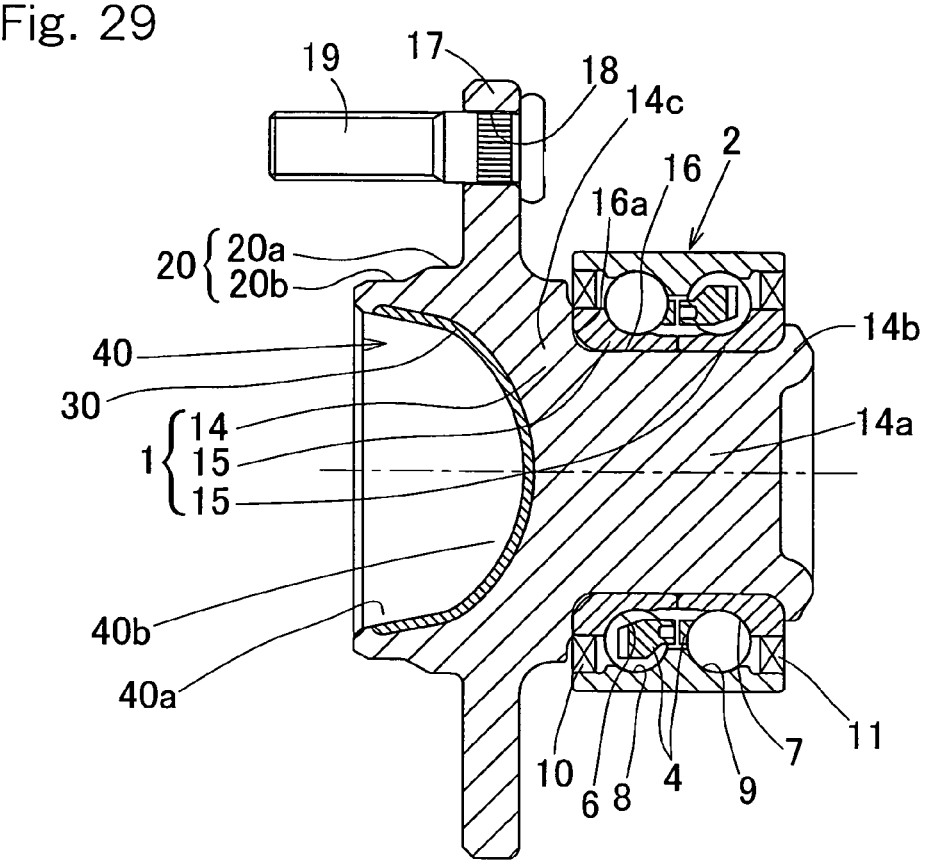
FIG. 29 is a longitudinal sectional view of the wheel support bearing assembly according to a twenty-second preferred embodiment of the present invention.

The wheel support bearing assembly shown in FIG. 29 is an angular contact ball bearing type for the support of a vehicle driven wheel as is the case with the example shown in and described with reference to FIG. 27, in which the inner member 1 is made up of the wheel hub 14 and the plural rows of the inner race segments 15 mounted on the outer periphery of the hub axle 14a of the wheel hub 14. The inner race segments 15 are employed one for each row. In the instance as shown, the inner race segments 15 for the respective rows have the same size. Other structural features thereof than those described above are substantially similar to those of the wheel support bearing assembly shown in and described with particular reference to FIG. 27.

Figure 30:
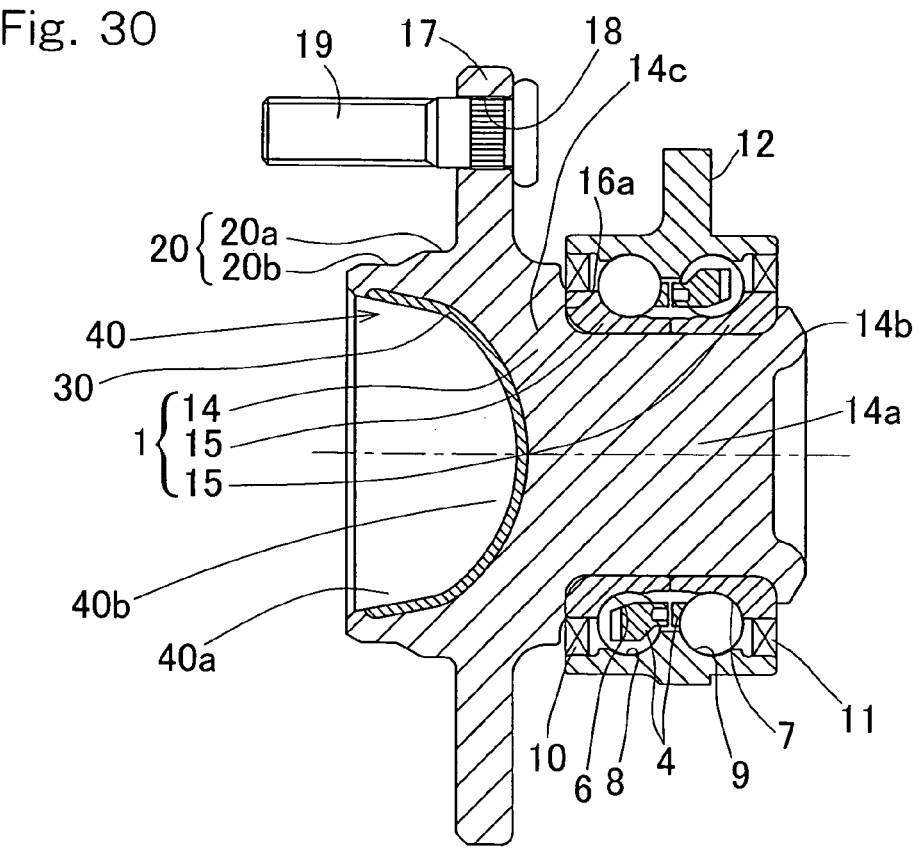
FIG. 30 is a longitudinal sectional view of the wheel support bearing assembly according to a twenty-third preferred embodiment of the present invention.

The wheel support bearing assembly shown in FIG. 30 is similar to that shown in and described with reference to FIG. 29, but differs therefrom in that in the wheel support bearing assembly shown in FIG. 30, the outer member 2 has its outer periphery formed with the wheel mounting flange 12. Other structural features thereof than those described above are substantially similar to those of the wheel support bearing assembly shown in and described with particular reference to FIG. 29.

Figure 31:
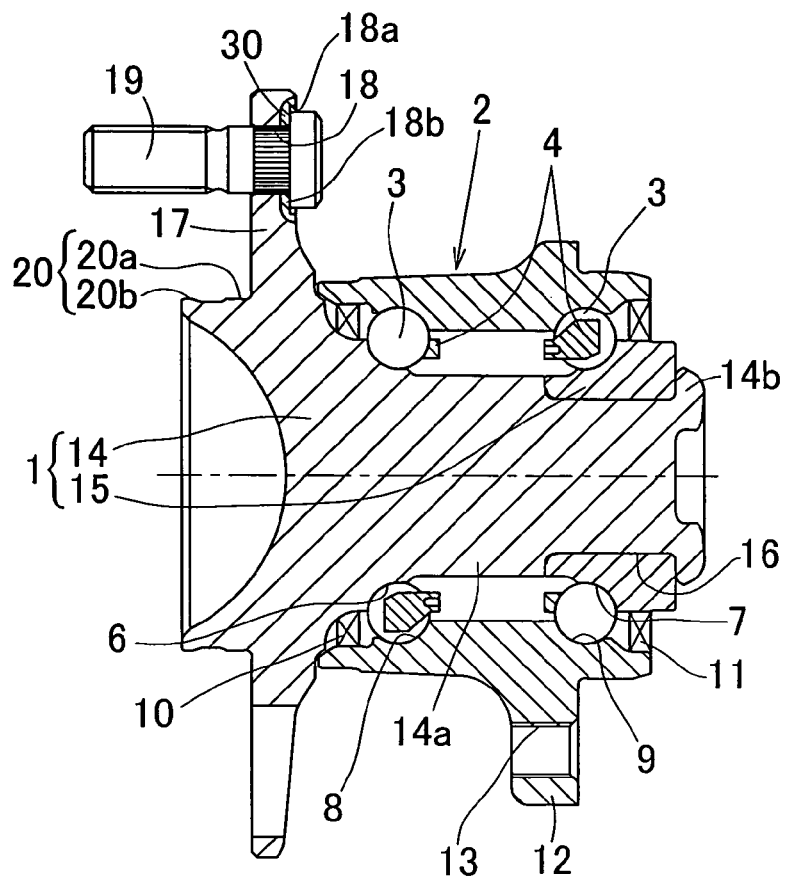
FIG. 31 is a longitudinal sectional view of the wheel support bearing assembly according to a twenty-fourth preferred embodiment of the present invention.

The twenty-fourth preferred embodiment of the present invention will be described with particular reference to FIGS. 31 and 32. FIG. 1 illustrates one example of the wheel support bearing assembly, which is of a third generation type and is used for supporting a vehicle driven wheel.

The wheel hub 14 includes a wheel mounting flange 17 formed with an outer periphery of the outboard end of the hub axle 14a so as to extend radially outwardly therefrom and hub bolts 19 are fitted in a press-fitted fashion to respective bolt press-fitting holes 18 defined in the wheel mounting flange 17 at a plurality of locations circumferentially thereof. Each of the bolt holes 18 is formed with a counterbore 18a defined on the inboard side of the wheel mounting flange 17 and having an annular bottom face thereof defining a seating face 18b with which a head portion 19a of the respective hub bolt 19 is held in contact. Instead of the seating counterbore 18a, the annular seating face 18b may be defined as a turned face.

The wheel hub 14 and the inner race segment 15, both forming the inner member 1, and the outer member 2 are hot forged products of steel material and, of the entirety thereof, the annular seating faces 18b of the respective bolt holes 18 in the wheel mounting flange 17 of the wheel hub 14 and a surface area in the vicinity thereof are rendered to be that portion 30 of the non-standard structure. Where the seating counterbores 18a are employed, even a corner portion between the bottom face of each of the seating counterbores, which defines the respective seating face 18b, and a respective peripheral wall of each seating counterbore are rendered to be that portion 30 of the non-standard structure. The wheel hub 14 has its matrix portion that is the standard structure.

According to the wheel support bearing assembly of the above described construction, the following effects can be obtained. Specifically, during, for example, the cornering of the automotive vehicle, deflection of a large amplitude occurs repeatedly in the wheel mounting flange 17, accompanied by repeated high stresses occurring at a portion in the vicinity of the seating faces 18b of the respective bolt holes 18 in the wheel mounting flange 17. In particular, where the bolt holes 18 have the respective counterbores 18a defined therein and where the annular seating faces 18b is in the form of a turned face and corners such as steps are formed between it and the periphery thereof, such high stresses occurs in corners of the seating counterbores 18a and around the annular seating faces 18b defined by the turned faces.

However, the annular seating faces 18b and their peripheries are rendered to be that portion 30 of the non-standard structure and one of the fine ferrite-pearlite structure, the upper bainite structure, the lower bainite structure, the tampered martensite structure and a mixed structure of at least one or more of them, which is chosen for that portion 30 of the non-standard structure, are minute in structure and has a hardness about equal to or higher than those of the matrix portion exhibiting the standard structure.

Because of the minuteness of the structure and the increase of the hardness, the annular seating faces 18b of the bolt holes 18 and their peripheral portions, which are rendered to be that portion 30 of the non-standard structure, can have an increased strength and an increased fatigue strength and, as compared with the wheel mounting flange 17 including only the conventional standard structure, it is possible to withstand against a high stress amplitude and, also, to increase the life time. In other words, an undesirable occurrence of cracking in the annular seating faces 18b of the respective bolt holes 18 in the wheel mounting flange 17 and their peripheries can be suppressed and such a function as occurrence of a cracking→increase of a displacement of the wheel mounting flange 17→increase of vibrations of the automotive vehicle→damage to the wheel support bearing device can be suppressed to allow the life time to be increased.

Because of the foregoing, as compared with the conventional wheel support bearing assembly containing the standard structure, reduction in both size and weight can be accomplished. Accordingly, the input weight of product manufacturing of the wheel support bearing device can advantageously be reduced to thereby reduce the cost, making it possible to provide the wheel support bearing device at an inexpensive price.

Also, since the annular seating faces 18b has a hardness increased as a result of the use of the non-standard structure, frictional wear can be reduced and lowering of an axial force of each hub bolt 19 resulting from the frictional wear of the corresponding annular seating face 18b can be suppressed.

Since that portion 30 of the non-standard structure can be obtained by effecting the cooling during the hot forging step or at the end of the hot forging step, addition of a simple process is sufficient and an undesirable reduction in productivity which would otherwise be brought about as a result of increase of the process steps can be suppressed. Also, since heat evolved in the hot forging is utilized, the amount of energies used in a process of refinement of the structure can be reduced.

That portion 30 to be rendered as the non-standard structure may be an entire surface of the wheel hub 14, but if it is limited to a required portion such as the annular seating faces 18b of the respective bolt holes 18 and their peripheries, any possible reduction in processability such as, for example, capability of being machined can be minimized.

Unlike the induction heat treatment, even though the bolt holes 18 have the respective seating counterbores 18a and the corner between each of the seating counterbore bottom faces, which define the respective annular seating faces 18b, and the adjacent counterbore peripheral surfaces is angled, the process of refinement can be achieved without being accompanied by such a problem associated with melt-down resulting from overheating.

FIGS. 33 to 40 illustrate the twenty-fifth to thirty-second preferred embodiments of the present invention, respectively. Even in each of those embodiments, the annular seating faces 18b of the bolt holes 18, that are defined in the side surface of the wheel mounting flange 17, respectively, and their peripheries are rendered to be that portion 30 of the non-standard structure and, accordingly, as a result of the minuteness of the structure and the increase of the hardness, the strength and the fatigue strength can be increased to thereby increase the life time. Also, a possible frictional wear of the annular seating faces 18b can be reduced to thereby avoid a reduction of the axial force of the hub bolts 19, which would otherwise result from the frictional wear. Even in each of those embodiments, as is the case with the twenty-fourth embodiment described hereinbefore, each of the bolt holes 18 may be provided with a counterbore and/or the annular seating face 18b of each of the bolt holes 18 may be defined in the form of a turned surface. It is to be noted that unless otherwise specifically described, each of those embodiments is substantially similar to the twenty-fourth embodiment shown in and described with particular reference to FIGS. 31 and 32.

Figure 32:
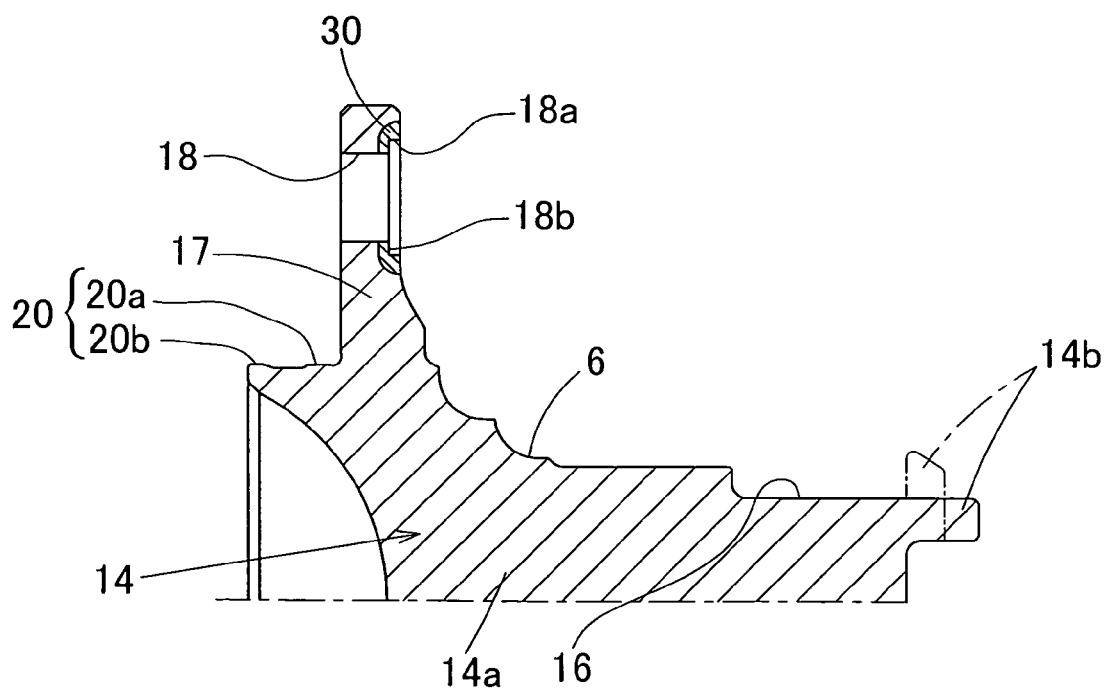
FIG. 32 is a fragmentary longitudinal sectional view showing the wheel hub employed in the wheel support bearing assembly according to the twenty-fourth preferred embodiment of the present invention.
Figure 33:
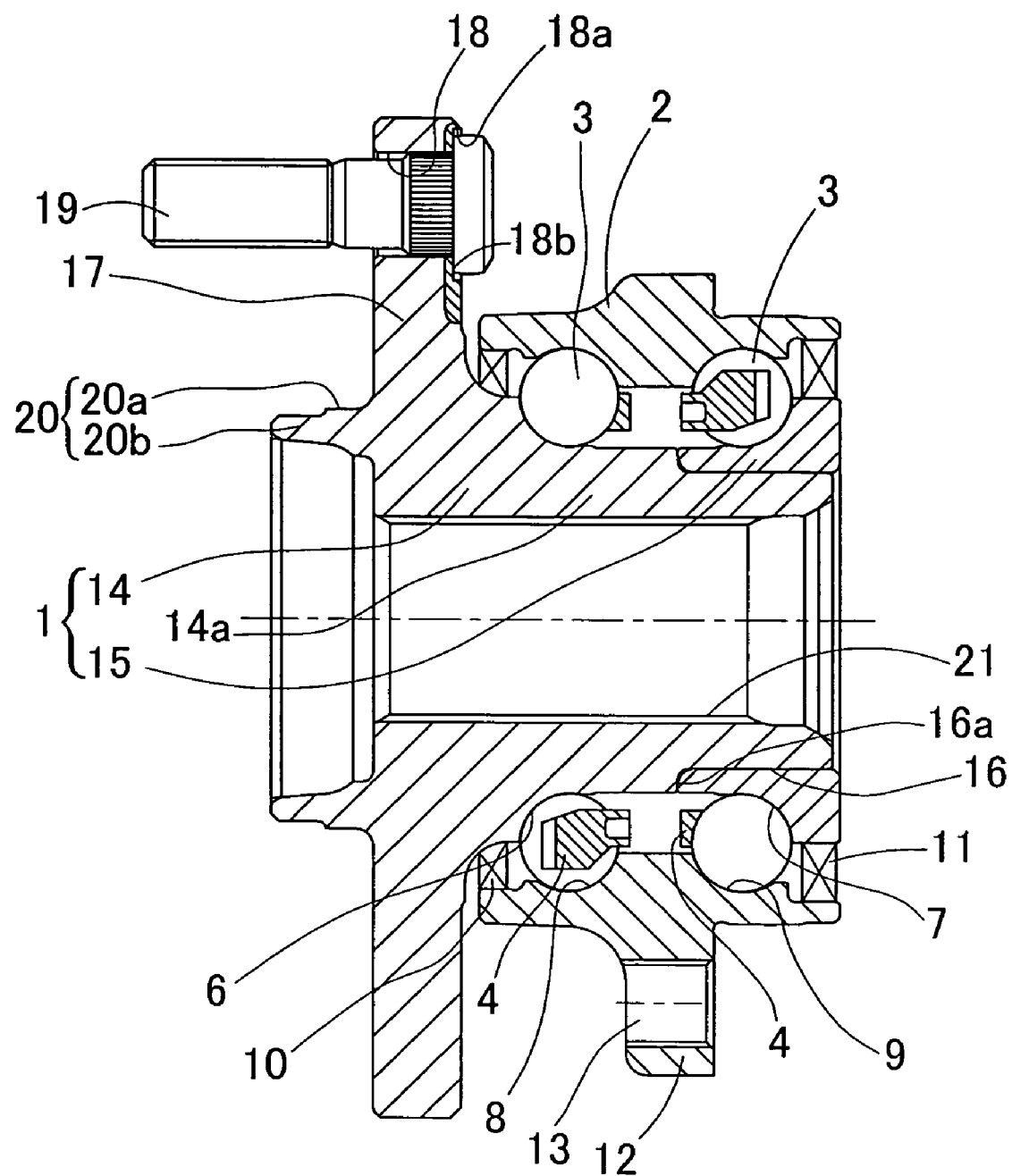
FIG. 33 is a longitudinal sectional view of the wheel support bearing assembly according to a twenty-fifth preferred embodiment of the present invention.

FIG. 33 illustrates the wheel support bearing assembly shown in FIG. 32, which is modified to allow it to support a vehicle drive wheel. In this embodiment, the center portion of the wheel hub 14 is provided with a throughhole 21, through which a stem portion (not shown) of an outer race of the constant velocity joint is inserted. Axial fixing of the inner race segment 15 to the wheel hub 14 is accomplished not by the use of a crimped portion 14b such as employed in the example of FIG. 31, but by means of fastening of a nut (not shown) threadingly engaged on a tip of the stem portion while a stepped face of the constant velocity joint is held in abutment with an end face of the inner race segment 15.

Figure 34:
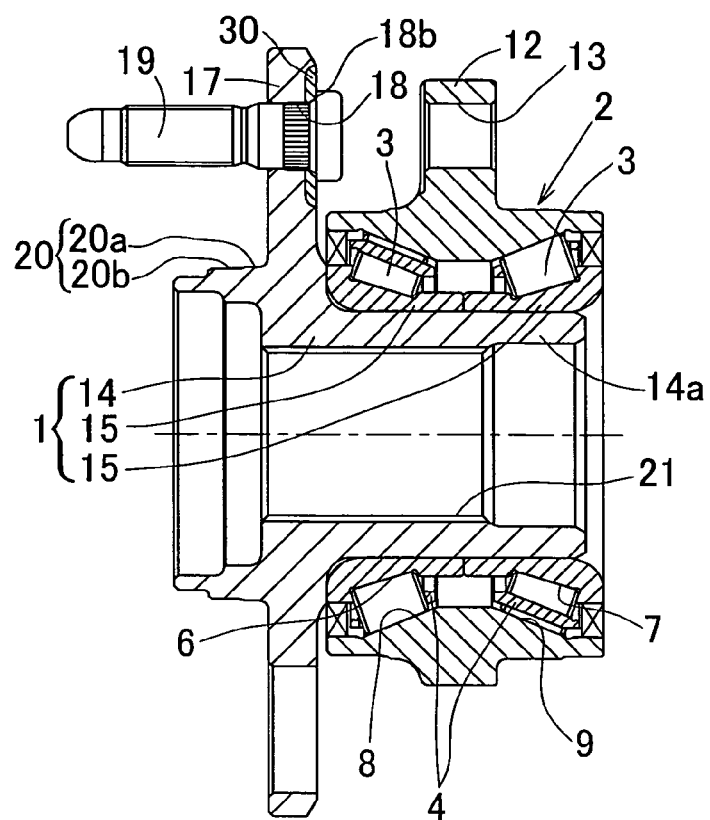
FIG. 34 is a longitudinal sectional view of the wheel support bearing assembly according to a twenty-sixth preferred embodiment of the present invention.

The wheel support bearing assembly shown in FIG. 34 is a tapered roller bearing type for the support of a vehicle drive wheel, in which the inner member 1 is made up of a wheel hub 14 and a plurality of, for example, two inner race segments 15 mounted on an outer periphery of an hub axle 14a of the wheel hub 14. The inner race segments 15 are provided one for each row. The outer member 2 is a member of one-piece construction.

Figure 35:
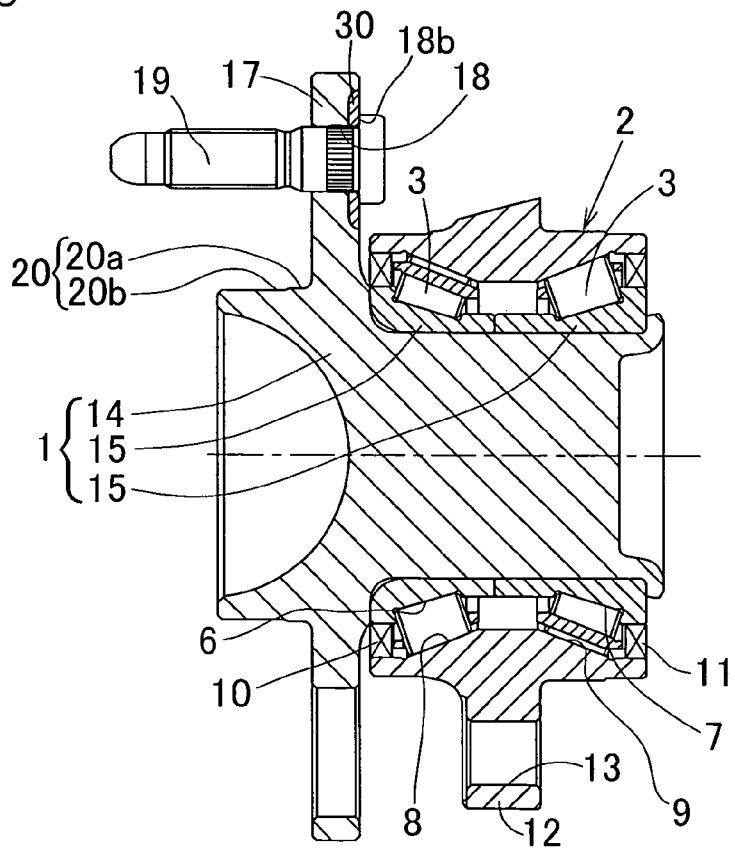
FIG. 35 is a longitudinal sectional view of the wheel support bearing assembly according to a twenty-seventh preferred embodiment of the present invention.

FIG. 35 illustrates the wheel support bearing assembly shown in FIG. 34, which is modified to permit it to be used for supporting a vehicle driven wheel, in which the wheel hub 14 is of a type having no throughhole such as identified by 21 in the previously described embodiment. Also, the inner race segments 15 are fixed to the wheel hub 14 by means of the crimped portion 14b defined in the wheel hub 14. Other structural features thereof than those described above are substantially similar to the example shown in and described with reference to FIG. 34.

Figure 36:
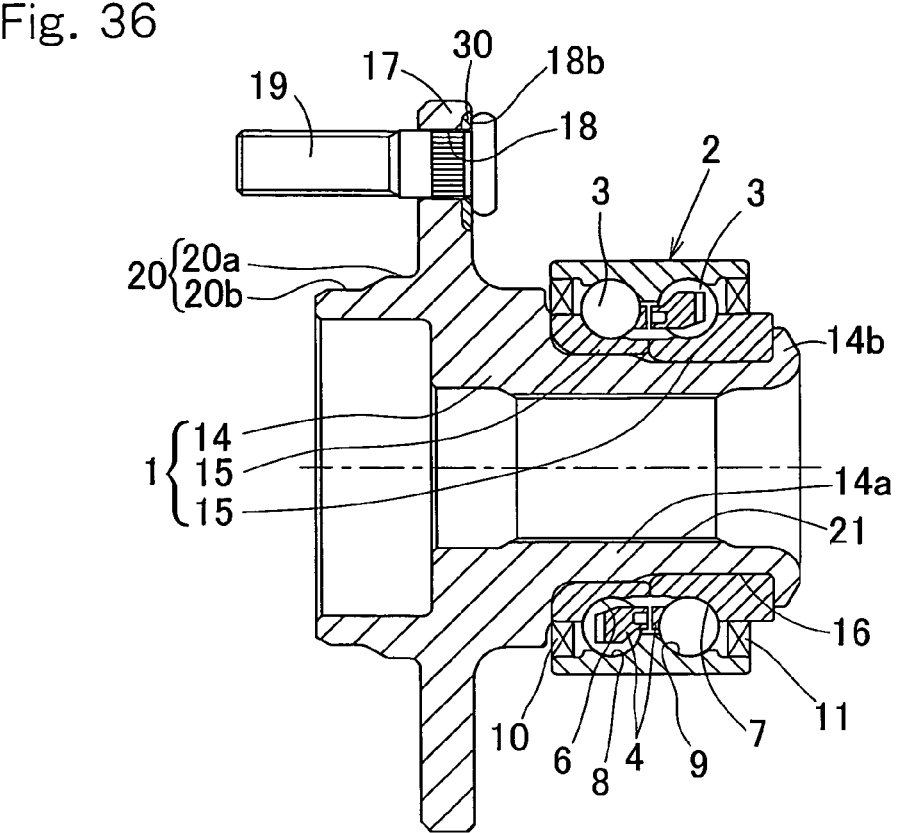
FIG. 36 is a longitudinal sectional view of the wheel support bearing assembly according to a twenty-eighth preferred embodiment of the present invention.

The wheel support bearing assembly shown in FIG. 36 is of an angular contact ball bearing type for use in supporting a vehicle drive wheel, in which the inner member 1 is made up of a wheel hub 14 and a plurality of rows of inner race segments 15 mounted on an outer periphery of a hub axle 14a of the wheel hub 14. The inner race segments 15 are provided one for each row and the inner race segment 15 on the inboard side may have a thickness and an axial dimension, which are greater than those of the inner race segment 15 on the outboard side. Also, the inner race segments 15 are axially fixed to the wheel hub 14 by means of a crimped portion 14b provided in the wheel hub 14. The outer member 2 is in the form of a member of one-piece construction having an outer diametric surface rendered to be a cylindrical surface over the entirety and no vehicle body fitting flange such as identified by 12 in the example of FIG. 31 is employed.

Figure 37:
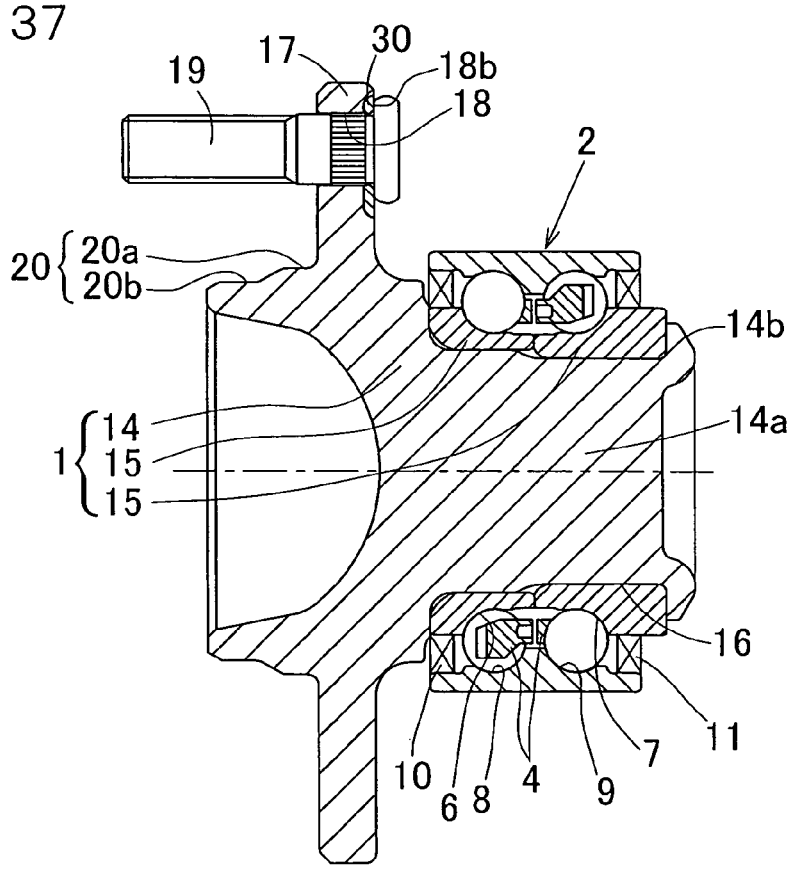
FIG. 37 is a longitudinal sectional view of the wheel support bearing assembly according to the twenty-ninth preferred embodiment of the present invention.

FIG. 37 illustrates the wheel support bearing assembly shown in FIG. 36, which is modified to permit it to be used in supporting a vehicle driven wheel, in which the wheel hub 14 has no throughhole 21 defined in the central portion thereof. Other structural features thereof than those described above are substantially similar to the example shown in and described with reference to FIG. 36.

Figure 38:
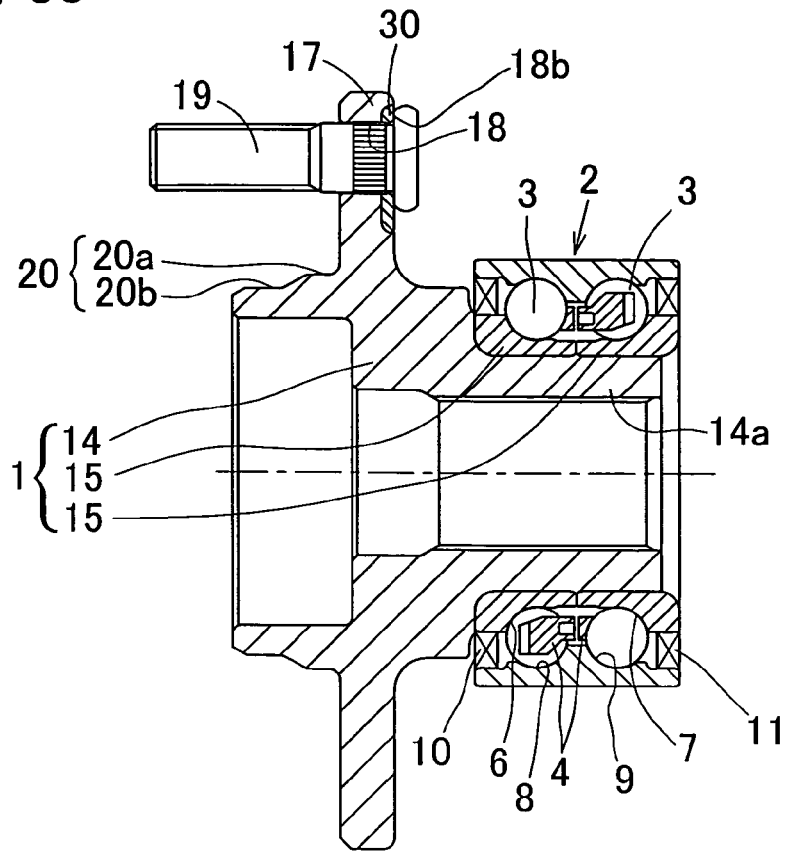
FIG. 38 is a longitudinal sectional view of the wheel support bearing assembly according to a thirtieth preferred embodiment of the present invention.

The wheel support bearing assembly shown in FIG. 38 is substantially similar to the wheel support bearing assembly shown in and described with reference to FIG. 37, in which the inner member 1 is made up of the wheel hub 14 and the plural rows of the inner race segments 15 mounted on the outer periphery of the hub axle 14a of the wheel hub 14. The outer member 2 is a member of one-piece construction and has no vehicle body fitting flange 12. In the instance as shown, the inner race segments 15 for the respective rows have the same size and fixing of the inner race segments 15 axially relative to the wheel hub 14 is accomplished not by the use of a crimping technique, but by means of a constant velocity joint (not shown) coupled with the wheel hub 14.

Figure 39:
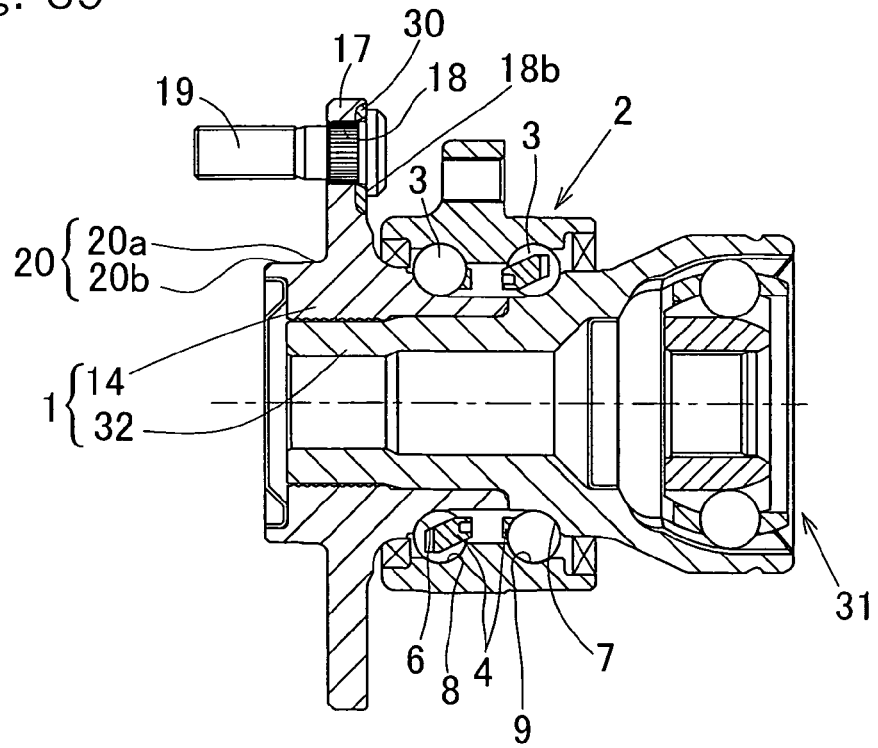
FIG. 39 is a longitudinal sectional view of the wheel support bearing assembly according to a thirty-first preferred embodiment of the present invention.

The wheel support bearing assembly shown in FIG. 39 is of a fourth generation type, in which the inner member 1 is made up of a wheel hub 14 and a joint outer ring 32, which is one of coupling members forming respective parts of a constant velocity joint 31, with rows of raceways 6 and 7 being formed respectively on the wheel hub 14 and the joint outer ring 32. The outer member 2 is of one-piece construction, having a vehicle body fitting flange 12.

Figure 40:
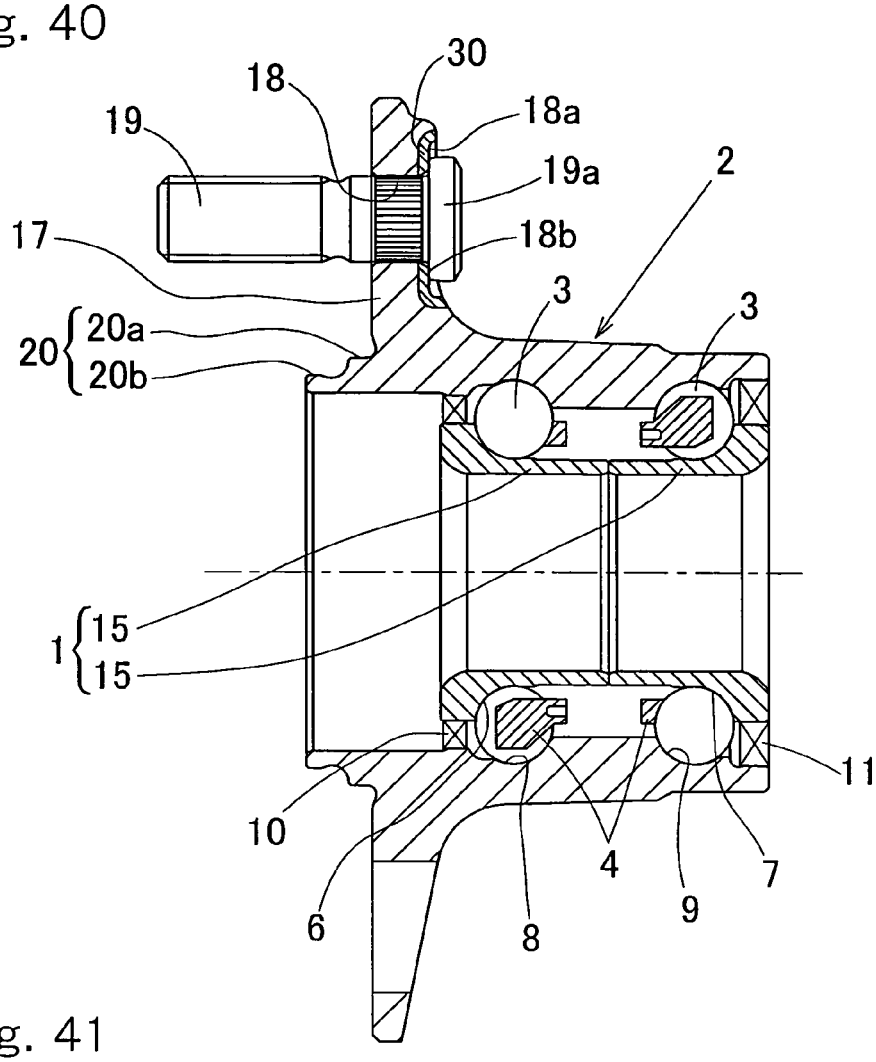
FIG. 40 is a longitudinal sectional view of the wheel support bearing assembly according to a thirty-second preferred embodiment of the present invention.

The wheel support bearing assembly shown in FIG. 40 is an outer member rotating model of a second generation type, in which the inner member 1 is made up of the plural rows of the inner race segments 15. The outer member 2 includes the wheel mounting flange 17 and the pilot portion 20.

Figure 41:
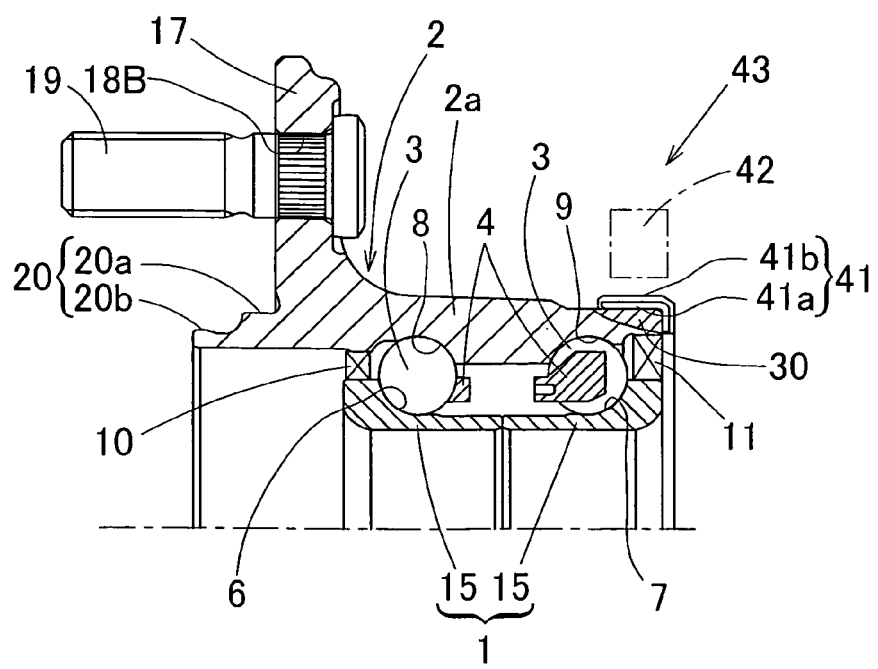
FIG. 41 is a fragmentary longitudinal sectional view of the wheel support bearing assembly according to a thirty-third preferred embodiment of the present invention.
Figure 42:
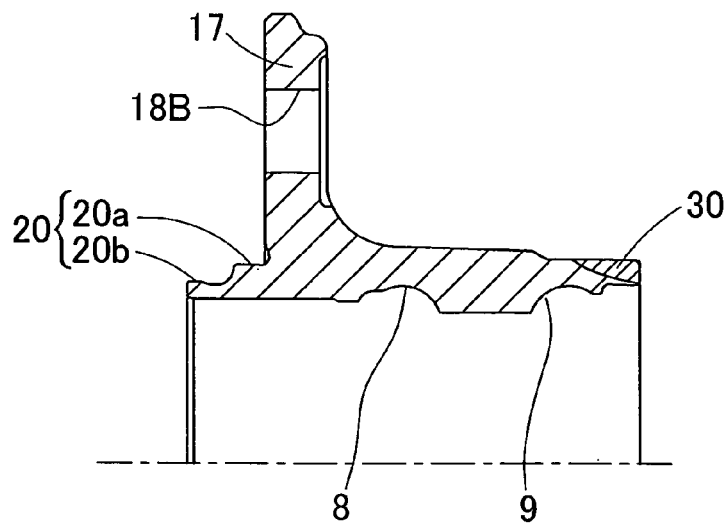
FIG. 42 is a fragmentary longitudinal sectional view showing an outer member employed in the wheel support bearing assembly according to the thirty-third preferred embodiment of the present invention.

The thirty-third preferred embodiment of the present invention will be described with particular reference to FIGS. 41 to 43. FIG. 41 illustrates an example of a wheel support bearing assembly, which is an outer member rotating model of a second generation type. This wheel support bearing assembly includes an inner member 1 and an outer member 2, which are rotatable relative to each other through plural rows of rolling elements 3, and the rolling elements 3 of each row are retained by a respective retainer 4. The plural rows referred to above may mean two or more rows, but in the instance shown therein, the double rows are employed. Each of the inner and outer members 1 and 2 has respective raceways 6 or 7 and respective raceways 8 or 9 defined therein. This wheel support bearing assembly is rendered to be a double row angular contact ball bearing type, in which the rolling elements of each row are in the form of balls and the raceways 6 and 7 are so formed as to permit the contact angle to be oriented outwards. Opposite annular ends of a bearing space delimited between the inner member 1 and the outer member 2 may sealed by respective sealing members 10 and 11. The inner member 1 is of a type, in which the two inner race segments 15 are juxtaposed relative to each other.

The outer member 2 is provided with a wheel mounting flange 17 formed therein so as to extend radially outwardly from the outer periphery thereof at the outboard end and hub bolts 19 are inserted in a press-fitted fashion into respective bolt press-fitting holes 18B defined in the wheel mounting flange 17 at a plurality of location circumferentially thereof.

A generally or substantially annular pilot portion 20 coaxial with the outer member 2 protrudes axially outwardly from a root portion of the wheel mounting flange 17 in the outer member 2. This pilot portion 20 is made up of a brake pilot 20a for guiding a brake disc, which is fitted to an outboard side face of the wheel mounting flange 17 in overlapped relation therewith, and a wheel pilot 20b protruding in an outward direction beyond the brake pilot 20a.

A pulsar ring 41, which is a member for supporting a to-be-detected member 41b, is mounted in a press-fitted fashion on an outer periphery of an inboard end of an tubular portion 2a of the outer member 2. The pulsar ring 41 is of a type, in which the to-be-detected member 41b in the form of a multipolar magnet such as, for example, a rubber magnet or a plastic magnet having a plurality of alternating magnetic poles defined therein in a direction circumferentially thereof, is provided on an outer periphery of a ring-shaped core metal 41a. The core metal 41a is of a generally L-sectioned shape and is held in contact with an inboard end face of the tubular portion 2a of the outer member 2. A detector 42 such as, for example, a magnetic sensor or the like is provided in, for example, an automotive suspension system of the automotive vehicle in face-to-face relation with an outer periphery of the pulsar ring 41. The pulsar ring 41 and the detector 42 cooperate with each other to define a rotation detecting unit 43 for detecting the rotational speed of the outer member 2. The outer member 2 is a hot forged product and an outer peripheral portion thereof, on which the pulsar ring 41 is mounted, is rendered to be that portion 30 of the non-standard structure. The outer member has a matrix portion which exhibits the standard structure.

Figure 43:
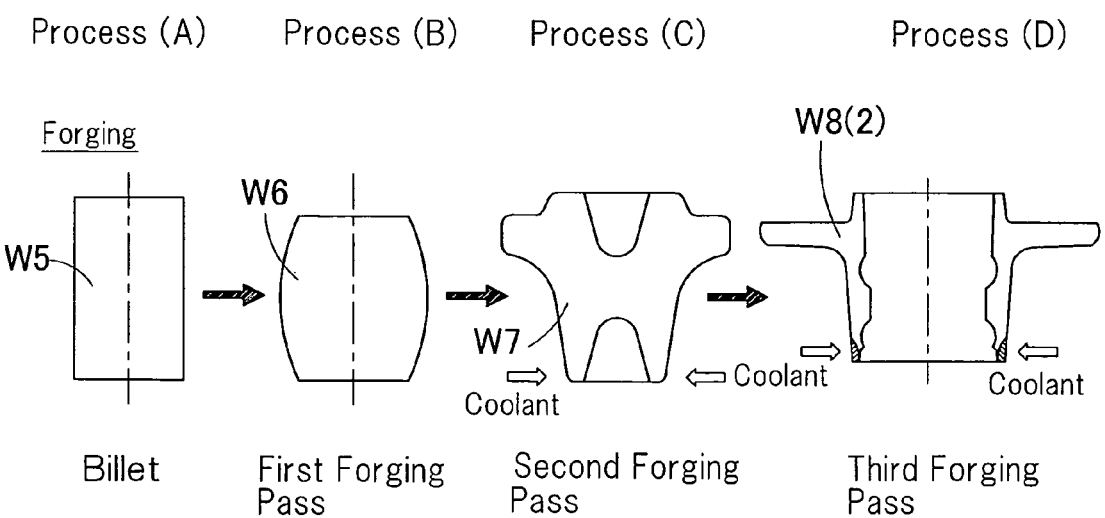
FIG. 43 is a flowchart showing the forging process for forging the outer member employed in the wheel support bearing assembly according to the thirty-third preferred embodiment of the present invention.

FIG. 43 illustrates a hot forging step of the process of manufacture of the outer member 2.

As shown by Process (A) in FIG. 43, a bar or pipe (not shown) is cut to a predetermined length to provide a billet W1, which eventually serves as a raw material for one outer member 2. This billet W5 is then passed sequentially through a plurality of steps of the hot forging process, for example, a first forging pass, a second forging pass and a third forging pass, to allow it to eventually assume a shape generally similar to the shape of the outer member and, at the final forging step (the third forging pass), a finally forged product W8 of a shape approximately similar to the shape of the outer member 2 can be obtained (Process (B) to Process (D) in FIG. 43).

The finally forged product W8 is subjected to turning and raceway 8 and 9 are subsequently treated with an induction hardening, followed by grinding of the raceways 8 and 9 and others (not shown). If required, a secondary machining of surfaces of the wheel mounting flange 17 and other is carried out prior to the grinding. The outer member 2, of which raceways have been completely ground, is subsequently incorporated in a wheel support bearing assembly to complete the latter.

As is the case with the previously described wheel hub 14, the non-standard structural portion 30 of the outer member 2 is modified when a coolant is locally sprayed over a modification subject area at the end of the forging step as shown by Process (D) in FIG. 43 or when a coolant is locally sprayed over a modification subject area subsequent to the termination of the forging step (the second forging pass) preceding the final forging step (the third forging pass) as shown by Process (C) in FIG. 43. A preferable kind of the coolant and a preferable method of spraying the coolant are substantially the same as in the case of the previously described wheel hub 14.

It is to be noted that although the various cooling methods have been described with particular reference to FIG. 5, any of the cooling methods represented respectively by the curves (1) to (4) out of the cooling methods represented respectively by the curves (1) to (6) shown in FIG. 5 is preferably employed particularly where the non-standard structural portion 30 is provided locally such as, for example, at the end of the outer member 2 shown in connection with the example of FIG. 41. On the other hand, any of the cooling methods represented by the curves (1) to (6) may be employed where the non-standard structural portion 30 is formed entirely on a surface of a component part.

According to the wheel support bearing assembly of the foregoing construction, the following effects can be obtained. That portion 30 of the non-standard structure including one of the fine ferrite-pearlite structure, the upper bainite structure, the lower bainite structure, the tempered martensite structure and the mixed structure comprised of two or more of those structures is minute in structure and has a hardness about equal to or higher as compared with the matrix portion exhibiting the standard structure. Because of the minuteness of the structure and the increase of the hardness, the fatigue strength of that portion 30 of the non-standard structure can increase and, even where a high stress during, for example, the cornering of the automotive vehicle occurs repeatedly enough to deform, it is possible to suppress frictional wear of a member, engaged with the pulsar ring 41, as a result of creepage. In other words, such a sequential occurrence as generation of frictional wear→decrease of the interference→further generation of creepage→displacement of the pulsar ring 41→an abnormality detection of the detector unit 42 can be suppressed.

Since that portion 30 of the non-standard structure can be obtained by effecting the cooling during the hot forging step or at the end of the hot forging step, as compared with the induction heat treatment, quenching-and-tempering, shot peening or the like, addition of a simple process is sufficient and an undesirable reduction in productivity which would otherwise be brought about as a result of increase of the process steps can be suppressed. Also, since heat evolved in the hot forging is utilized, the amount of energies used in a process of refinement of the structure can be reduced.

Since that portion 30, which is rendered to be the non-standard structure, may be the entire surface of the outer member 2, which is a member engaged with the pulsar ring 41, any possible reduction in processability such as, for example, capability of being machined can be minimized, where the non-standard structural portion 30 is limited to a required location such as, for example, a surface that is engaged with the pulsar ring 41.

Figure 44:
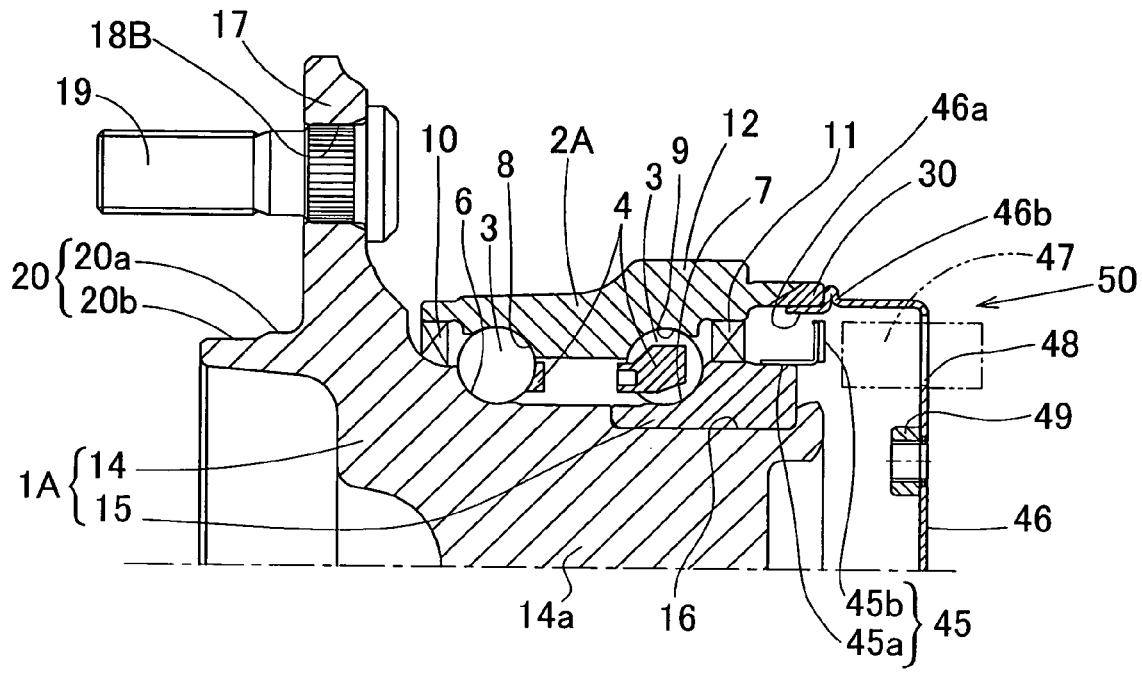
FIG. 44 is a fragmentary longitudinal sectional view of the wheel support bearing assembly according to a thirty-fourth preferred embodiment of the present invention.
Figure 45:
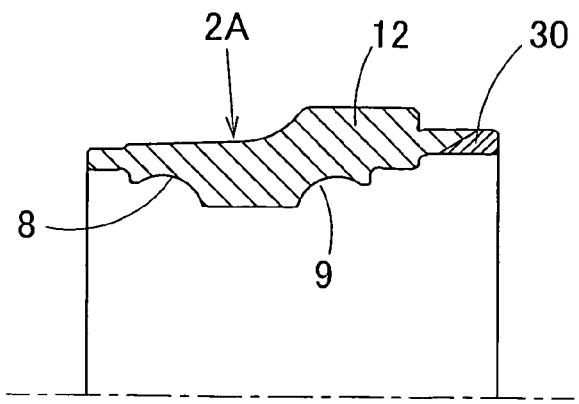
FIG. 45 is a fragmentary longitudinal sectional view of the outer member employed in the wheel support bearing assembly according to the thirty-fourth preferred embodiment of the present invention.

FIGS. 44 and 45 illustrate the thirty-fourth preferred embodiment of the present invention. This wheel support bearing assembly is an inner race segment rotating model of a third generation type. It is to be noted that parts, which are shown therein, but correspond to like parts shown in FIG. 41, are designated by like reference and, therefore, the details are not reiterated. This wheel support bearing assembly includes an inner member 1A and an outer member 2A rotatable relative to each other through a plurality of rows of rolling elements 3, and the rolling elements 3 of each row are retained by a respective retainer 4. The inner member 1A and the outer member 2A have rows of raceways 6 and 7 and rows of raceways 8 and 9, respectively. This wheel support bearing assembly is rendered to be a double row angular contact ball bearing type, in which the rolling elements 3 are in the form of balls and the raceways 6 and 7 are so formed as to permit the contact angle to be oriented outwards. Opposite annular ends of a bearing space delimited between the inner member 1A and the outer member 2A are sealed by respective sealing members 10 and 11.

The outer member 2A is of one-piece construction in its entirety and is provided with a vehicle body fitting flange 12 at an arbitrarily chosen position in a direction axially thereof. An outer diametric portion of the outer member 2A on the inboard side of the vehicle body fitting flange 12 serves as a surface engageable with a knuckle (not shown) which will become an automotive suspension system of the automotive vehicle. The vehicle body fitting flange 12 has a vehicle body fitting hole 13 (not shown) in the form of a bolt insertion hole or a screw hole defined therein at a plurality of locations circumferentially of the vehicle body fitting flange 12.

The inner member 1A is of two-piece construction including the wheel hub 14 and an inner race segment 15 mounted on an outer periphery of an inboard end of the hub axle 14a of the wheel hub 14. The raceways 6 and 7 on the side of the inner member 1A are defined in the wheel hub 14 and the inner race segment 15, respectively. An inboard end of an outer periphery of the hub axle 14a of the wheel hub 14 is formed with an inner race segment mounting surface 16 that is radially inwardly stepped to have a small diameter, with the inner race segment 15 mounted on this inner race segment mounting surface 16.

The wheel hub 14 has a wheel mounting flange 17 formed on an outer periphery of an outboard end of the hub axle 14a so as to extend radially outwardly therefrom and hub bolts 19 are fitted in a press-fitted fashion to respective bolt press-fitting holes 18B defined in the wheel mounting flange 17 at a plurality of locations circumferentially thereof.

A pulsar ring 45 for the rotation detection is mounted in a press-fitted fashion on an outer periphery of the inner race segment 15 of the inner member 1A. The pulsar ring 45 is includes a ring-shaped core metal 45a of a generally L-sectioned configuration and a to-be-detected member 45b mounted on a surface of an upright plate portion of the core metal 45a, which member 45b is in the form of a multipolar magnet having a plurality of alternating magnetic poles defined therein in a direction circumferentially thereof.

The outer member 2A has an inner peripheral surface of the inboard end thereof, on which a tubular portion 46a at an outer periphery of a sensor cap 46 is mounted in a press-fitted fashion. The tubular portion 46a is provided with a double folded flange portion 46b so as to protrude outwardly of the outer periphery thereof and the axial position of the sensor cap 46 is restricted with the tubular portion 46a held in abutment with an end face of the outer member 2A. The sensor cap 46 is a component for fitting a detector 47 of a magnetic sensor or the like in face-to-face relation with the to-be-detected member 45b and is provided with an insertion hole 48 for the detector 47 and a nut 49 for fitting the detector 47. This sensor cap 46 is so provided as to cover the entirety of the inboard end of the wheel support bearing assembly. The to-be-detected member 45b and the detector 47 cooperate with each other to define a rotation detecting unit 50.

The wheel hub 14 and the inner race segment 15, both forming respective parts of the inner member 1A, and the outer member 2A are hot forged products of steel material. Of them, the outer member 2A has that portion 30 of the non-standard structure formed in a mounting surface of the sensor cap 46. A matrix portion of the wheel hub 14 represents the standard structure. Although that portion 30 of the non-standard structure may be formed in an inner peripheral portion of the outer member 2A, in the instance as shown that portion 30 of the non-standard structure is formed over the outer periphery. The non-standard structure of that portion 30 is rendered to be one of the structures hereinbefore described in connection with the thirty-fourth embodiment.

Even in this embodiment, as is the case with the previously described thirty-fourth embodiment, the fatigue strength can be increased because of the minuteness of and increase of the strength of the structure of that portion 30 of the non-standard structure and, accordingly, even where a high stress during, for example, the cornering of the automotive vehicle occurs repeatedly enough to deform, it is possible to prevent the outer member 2A, which is a member engaged with the sensor cap 46, from being frictionally worn as a result of creepage. In other words, such a sequential occurrence as generation of frictional wear→decrease of the interference→further generation of creepage→displacement of the sensor cap 46→an abnormality detection of the detector 47 can be suppressed.

Figure 46:
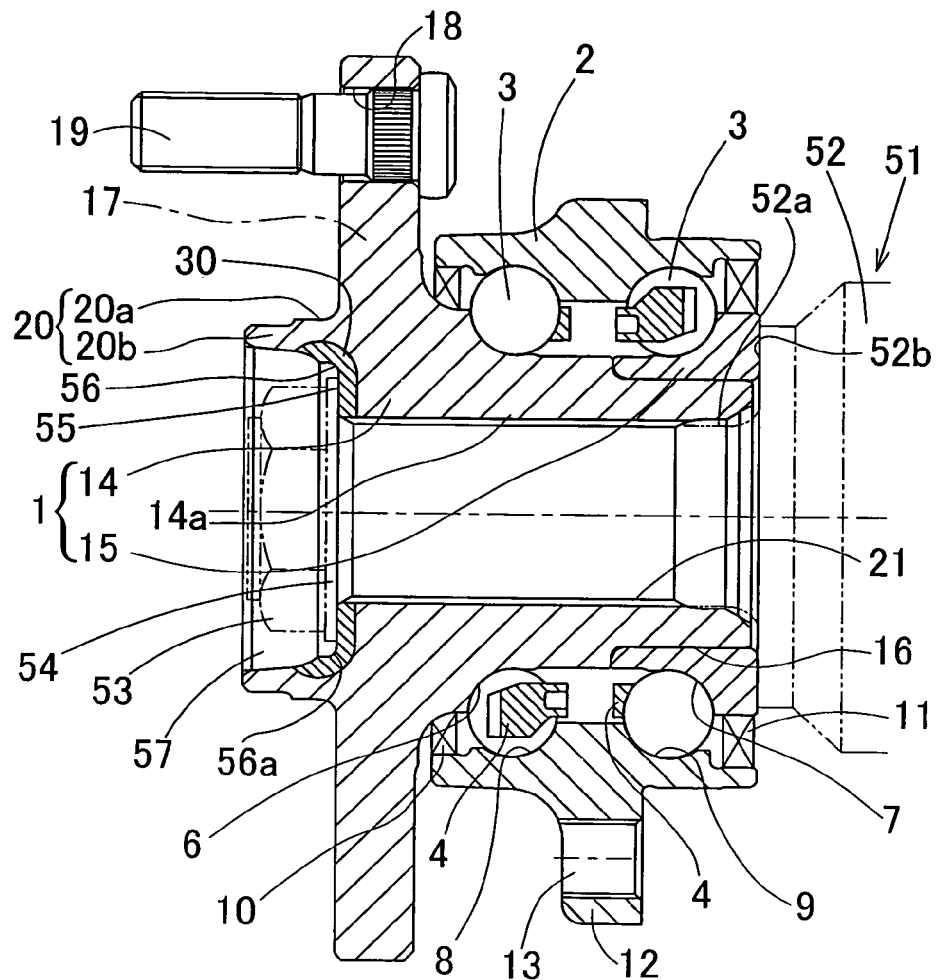
FIG. 46 is a longitudinal sectional view of the wheel support bearing assembly according to a thirty-fifth preferred embodiment of the present invention.
Figure 47:
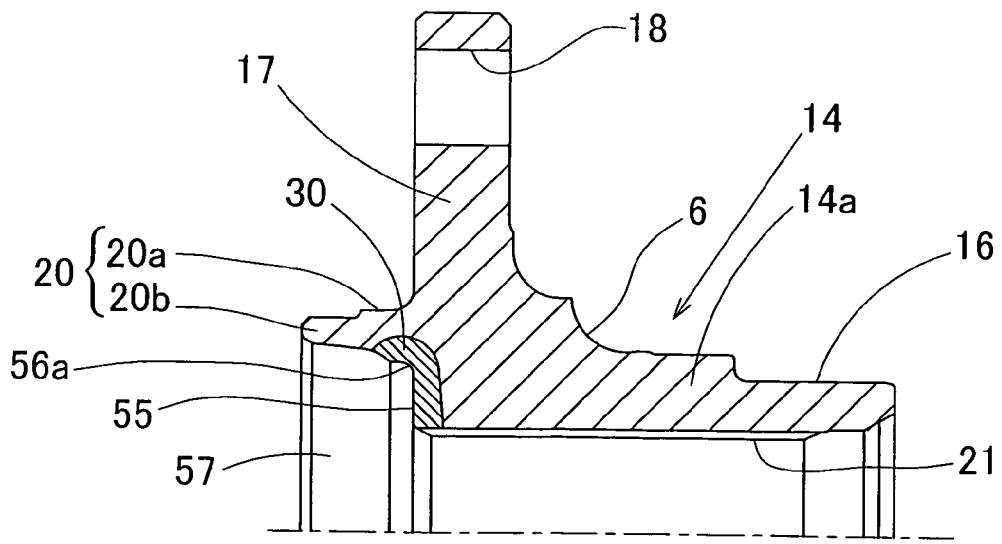
FIG. 47 is a fragmentary longitudinal sectional view showing the wheel hub employed in the wheel support bearing assembly according to a thirty-fifth preferred embodiment of the present invention.

The thirty-fifth preferred embodiment of the present invention will now be described with particular reference to FIGS. 46 and 47. FIG. 46 illustrates one example of the wheel support bearing assembly, which is to be applied to a third generation type for the support of a vehicle drive wheel.

The center portion of the wheel hub 14 is formed with a throughhole 21, through which a stem portion 52a of an outer race 52 of the constant velocity joint 51, which serves one of coupling members, is inserted. An open end edge of the throughhole 21 at the outboard end face of the wheel hub 14 defines a seating surface 55 with which a nut 53, threaded on a male thread portion at a free end of the stem portion 52a or a washer 54 placed below the nut 53 contacts. By fastening the nut 53, a stepped face 52b of the constant velocity universal joint outer ring 52 is urged to an end face of the inner race segment 15 to allow the wheel support bearing assembly and the constant velocity joint 51 to be coupled together.

The seating face 55 of the wheel hub 14 is in the form of a bottom face of a counterbore 56. An outboard end face of the wheel hub 14 is formed with a recess 57 on an inner diametric side of the pilot portion 20 and the counterbore 56 is defined at the bottom of this recess 57. As a result of formation of the recess 57, the pilot portion 20 represents a cylindrical shape.

The recess 57 has an inner surface, which is a forged skin or a turned surface, whereas an inner surface of the counterbore 56, that is, bottom and peripheral surfaces thereof are rendered to be a turned surface. The counterbore 56 may not be always limited to that formed deeply as shown therein, but may have a depth left by grinding a portion of the forged skin.

The wheel hub 14 and the inner race segment 15, both forming respective parts of the inner member 1, and the outer member 2 are hot forged products of steel material and, of them, the seating surface 55 of the wheel hub 14 and its periphery are rendered to be that portion 30 of the non-standard structure. That portion 30 of the non-standard structure is formed so as to extend from the seating surface 55 to a periphery of a corner 56a delimited between the bottom of the counterbore 56 defining this seating surface 55 and peripheral surfaces of the counterbore 56. Accordingly, the peripheral surface of the counterbore 56 is also rendered to be that portion 30 of the non-standard structure. A matrix portion of the wheel hub 14 represents the standard structure.

It is to be noted that although the various cooling methods have been described with particular reference to FIG. 5, any of the cooling methods represented respectively by the curves (1) to (4) out of the cooling methods represented respectively by the curves (1) to (6) shown in FIG. 5 is preferably employed particularly where that portion 30 of the non-standard structure is to be formed locally in the seating surface 55 and its periphery such as in the example of FIG. 1. Where the entire surface of a component part is rendered to be that portion 30 of the non-standard structure, a method shown by any one of the curves (1) and (6) may be employed.

According to the wheel support bearing assembly of the foregoing construction, the following effects can be obtained. Specifically, since the periphery of the seating surface 55 which is held in contact with the coupling nut 53 at the end face of the wheel hub 14 for connecting the constant velocity joint becomes a periphery of the root portion of the wheel mounting flange 17, a high stress repeatedly occur when during, for example, the cornering of the automotive vehicle, deflection of a large amplitude occurs repeatedly in the wheel mounting flange 17. In particular, where the seating surface 55 is a bottom surface of the counterbore 56, such high stress repeatedly occurs in the corner 56a between the bottom and peripheral surface of the counterbore 56.

Against the repeated high stresses occurring in the manner described above, since the seating surface 55 and that portion encompassing the periphery of the corner 56a of the counterbore 56 are rendered to be that portion 30 of the non-standard structure, the strength and the fatigue strength can be increased as a result of the minuteness of the structure and the increase of the hardness and, accordingly, generation of cracking from a peripheral edge of the seating surface 55 such as, for example, the corner 56a of the counterbore 56 can be suppressed. In other words, such a function as occurrence of a cracking→increase of a displacement of the wheel mounting flange 17→increase of vibrations of the automotive vehicle→damage to the wheel support bearing device can be suppressed to allow the life time to be increased.

Also, since the hardness of the seating surface 55 is increased in the presence of the non-standard structure as described above, the fretting wear which would occur as a result of contact between it and the nut 53 can be suppressed and, hence, an undesirable decrease of axial fastening force of the nut 53, which would result from such frictional wear, can be suppressed.

Since that portion 30 of the non-standard structure can be obtained by effecting the cooling during the hot forging step or at the end of the hot forging step, addition of a simple process is sufficient and an undesirable reduction in productivity which would otherwise be brought about as a result of increase of the process steps can be suppressed. Also, since heat evolved in the hot forging is utilized, the amount of energies used in a process of refinement of the structure can be reduced.

Where that portion 30 of the non-standard structure is obtained by effecting the cooling during or at the end of the hot forging step, and where the corner 56a of the counterbore 56, which defines the seating surface 55 in the case of the induction heat treatment, has a small radius of curvature, no problem associated with overheating will occur.

Although that portion 30 to be rendered as the non-standard structure may be the entire surface of the wheel hub, any possible reduction in processability such as, for example, capability of being machined can be minimized if it is limited to a required location such as the periphery of the seating surface 55.

Figure 48:
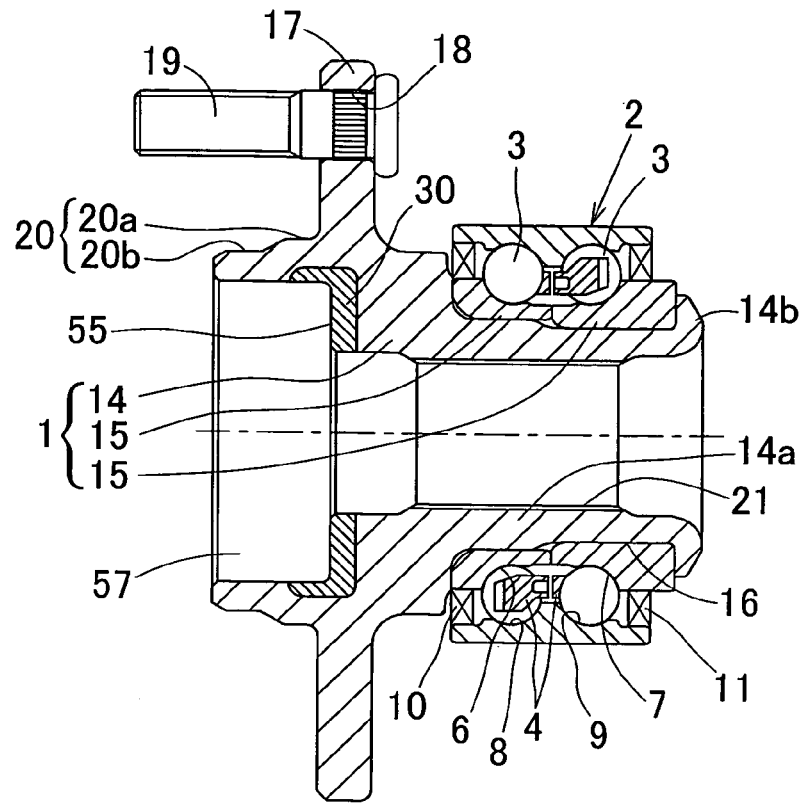
FIG. 48 is a longitudinal sectional view of the wheel support bearing assembly according to a thirty-sixth preferred embodiment of the present invention.
Figure 49:
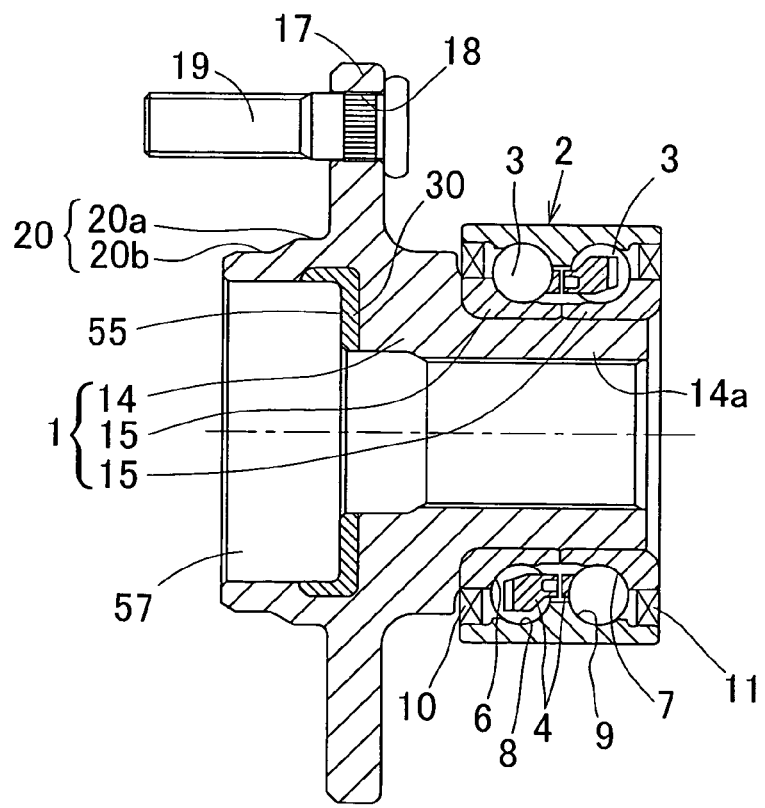
FIG. 49 is a longitudinal sectional view of the wheel support bearing assembly according to a thirty-seventh preferred embodiment of the present invention.
Figure 50:
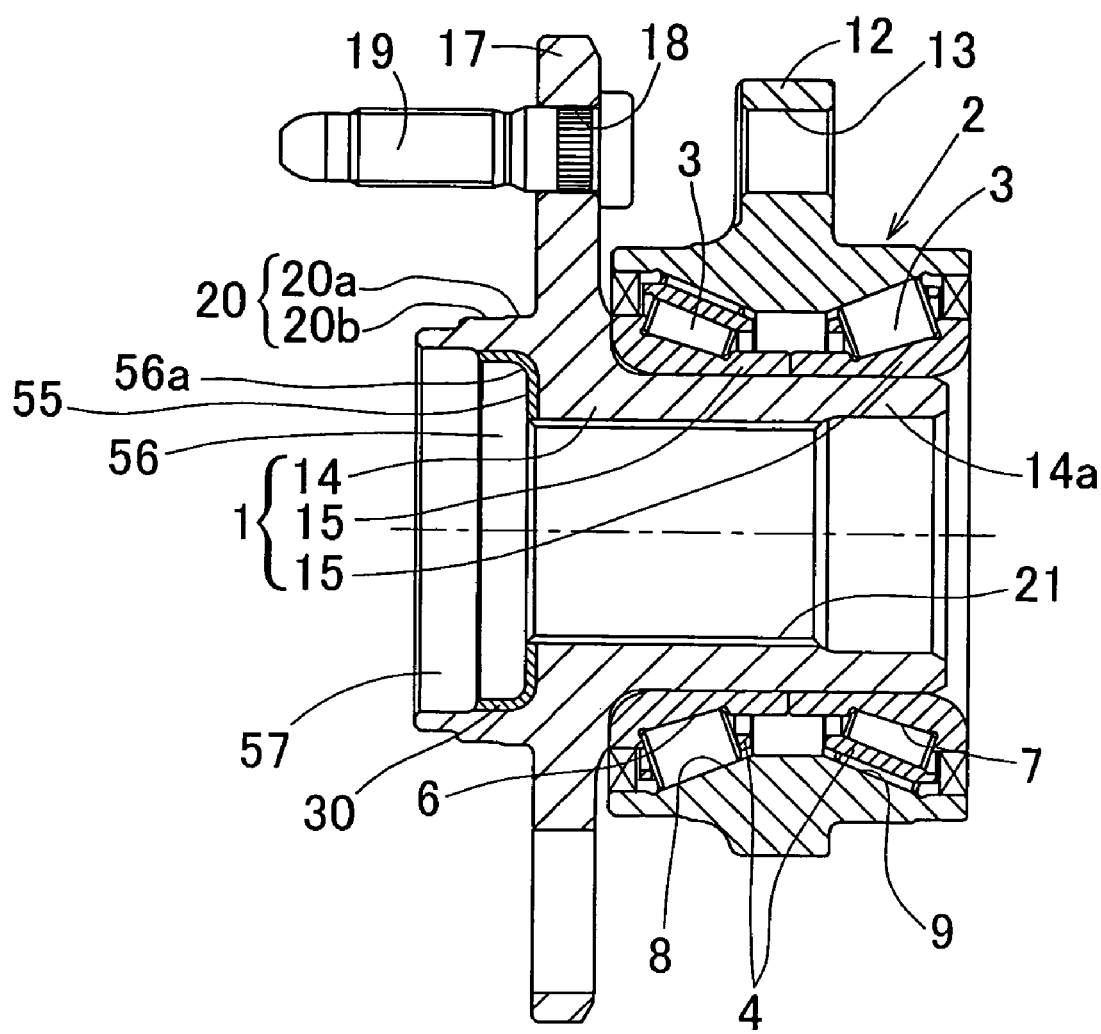
FIG. 50 is a longitudinal sectional view of the wheel support bearing assembly according to a thirty-eighth preferred embodiment of the present invention.

FIGS. 48 to 50 illustrate the thirty-sixth to thirty-eighth preferred embodiment of the present invention, respectively. Even in those embodiments, since that portion 30 of the non-standard structure is formed in the periphery of the seating surface 55, with which the nut 53 for coupling the constant velocity joint to the end face of the wheel hub 14 or the washer 54 contacts, and, as a result of the minuteness of the structure and the increase of the hardness, the strength and the fatigue strength can be increased to increase the life time. Also, as a result of the increase of the hardness of the seating surface 55, the fretting wear can be reduced and an undesirable reduction in the axial force of the nut 53 can also be suppressed.

It is to be noted that in each of those embodiments, unless otherwise specified, the wheel support bearing assembly is substantially similar to that according to the thirty-fifth embodiment shown in and described with reference to FIGS. 46 and 47.

The wheel support bearing assembly shown in FIG. 48 is an angular contact ball bearing type for use in supporting a vehicle drive wheel, in which the inner member 1 is made up of the wheel hub 14 and a plurality of rows of inner race segments 15 mounted on an outer periphery of a hub axle 14a of the wheel hub 14. The inner race segments 15 are provided one for each row and the inner race segment 15 on the inboard side may have a thickness and an axial dimension, which are greater than those of the inner race segment 15 on the outboard side. Also, the inner race segments 15 are axially fixed to the wheel hub 14 by means of a crimped portion 14b provided in the wheel hub 14. The outer member 2 is in the form of a member of one-piece construction having an outer diametric surface rendered to be a cylindrical surface over the entirety and no vehicle body fitting flange such as identified by 12 in the example of FIG. 46 is employed.

Although in this embodiment, no counterbore that defines the seating surface 55 is employed, it may be employed in a manner similar to the thirty-fifth embodiment described hereinbefore.

The wheel support bearing assembly shown in FIG. 49 is similar to the wheel support bearing assembly shown in FIG. 48, in that the inner member 1 is made up of the wheel hub 14 and a plurality of rows of inner race segments 15 mounted on an outer periphery of a hub axle 14a of the wheel hub 14. The outer member is of one-piece construction and having no vehicle body fitting flange such as identified by 12. In the instance as shown, the two inner race segments 15 have the same size.

The wheel support bearing assembly shown in FIG. 50 is a tapered roller bearing type for use in supporting a vehicle drive wheel, in which the inner race 1 is made up of the wheel hub 14 and a plurality of rows of inner race segments 15 mounted on an outer periphery of a hub axle 14a of the wheel hub 14. The inner race segments 15 are provided one for each row. The outer member 2 is a member of one-piece construction.

The thirty-ninth preferred embodiment of the present invention will be described with particular reference to FIGS. 51 and 52. This wheel support bearing assembly includes a dual row bearing units 1 and a wheel hub 14 having its outer periphery on which the bearing units 1 are mounted. The bearing units 1 is of a structure, in which a plurality of rows of rolling elements 3 are interposed between the inner race segments 15 and the outer race 2. The rolling elements 3 of each rows are retained by a corresponding retainer 4. The plural rows referred to above may mean two or more rows, but in the instance shown therein, the double rows are employed. The rolling elements 3 of each row are employed in the form of tapered rollers, but it may be balls. The outer race 2 is of one-piece construction and has a vehicle body fitting flange 12 formed on the outer periphery thereof. The vehicle body fitting flange 12 has a vehicle body fitting hole 13 in the form of a bolt insertion hole or a screw hole defined therein at a plurality of location circumferentially of the vehicle body fitting flange 12. The inner race segments 15 are provided on for each row. Opposite annular ends of a bearing space delimited between the inner race 1 and the outer race 2 are sealed by respective sealing members 10 and 11.

The wheel hub 14 includes a hub axle 14a, on which the inner race segments 15 are mounted, and a wheel mounting flange 17. The wheel mounting flange 17 has a bolt press-fitting hole 18B defined therein at a plurality of circumferential locations thereof and hub bolts 19 are fitted in a press-fitted fashion to the respective bolt press-fitting holes 18B. A central portion of the hub axle 14a is formed with a through-hole 21, through which a stem portion (not shown) of an outer race of the constant velocity joint is inserted. One end of the hub axle 14a adjacent the wheel mounting flange on the outer peripheral surface thereof is provided with a diametrically outwardly extending inner race abutment face 60, and the inner race segment 15 on the outboard side has its end face held in abutment with this inner race abutment face 60. The inner race segment 15 is axially fixed to the wheel hub 14 by means of a crimped portion 14b, which is formed by diametrically outwardly crimping the inboard end of the hub axle 14a of the wheel hub 14, at a location between it and the inner race abutment face 60. It is to be noted that without the crimped portion 14b provided, the inner race segment 15 may be fixed by urging a stepped face, defined in the outer race of the constant velocity joint, against the end face of the inner race segment 15.

Any of the wheel hub 14, the inner race segments 15 and the outer member 2 is a hot forged product of steel material. Of them, a surface area ranging from at least the neighborhood of the inner race abutment face 60 in the outer peripheral surface of the hub axle to the inner race abutment face 60 is rendered to be that portion 30 of the non-standard structure. A matrix portion of the wheel hub 14 represents the standard structure. An axial range, which is rendered to be that portion 30 of the non-standard structure, extends to a location where the inner race segment 15 on the inboard side on the outer peripheral surface of the hub axle 14a is mounted, but terminates at a point generally intermediate of the length of the inner race segment 15 on the inboard side and a portion of the outer peripheral surface on the inboard side thereof is rendered to be a portion of the standard structure as is the case with the matrix portion. Although the non-standard structural portion 30 is formed over the entire surface of the inner race abutment face 60 in this embodiment, only an inner peripheral portion of the inner race abutment face 60 may be rendered to be that portion 30 of the non-standard structure.

Figure 51:
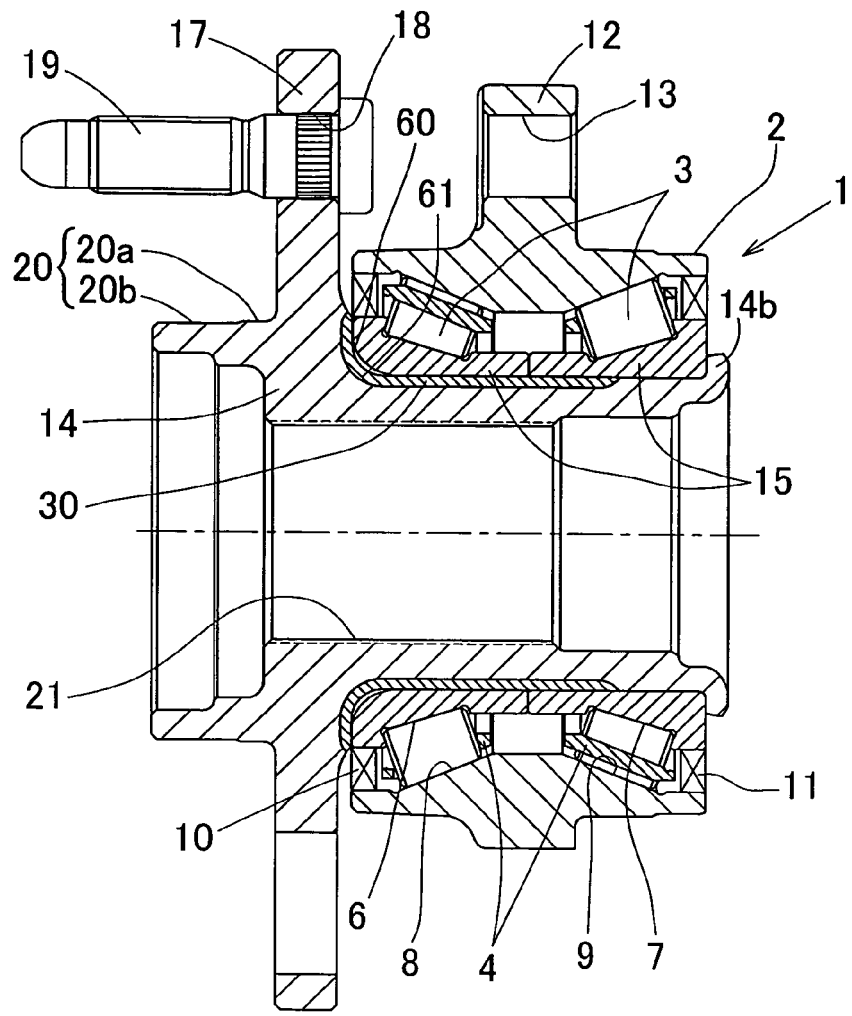
FIG. 51 is a longitudinal sectional view of the wheel support bearing assembly according to a thirty-ninth preferred embodiment of the present invention.
Figure 52:
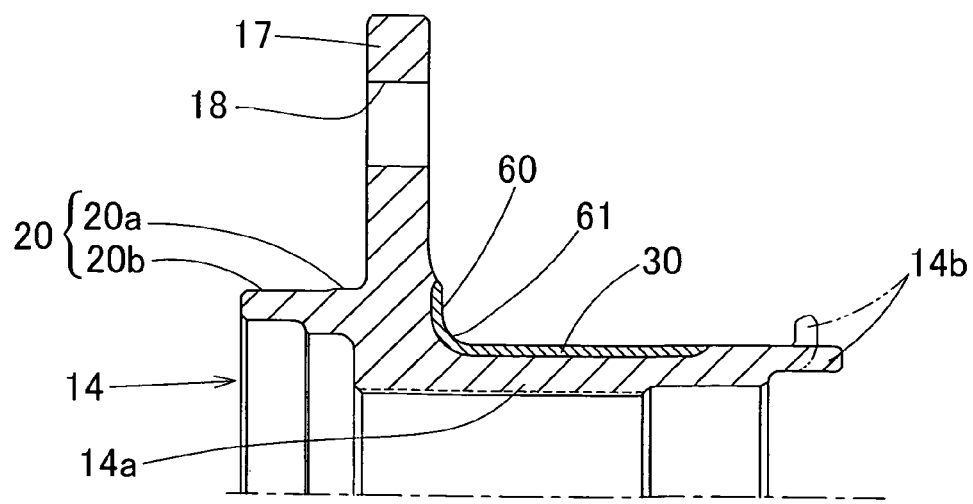
FIG. 52 is a fragmentary longitudinal sectional view showing the wheel hub employed in the wheel support bearing assembly according to the thirty-ninth preferred embodiment of the present invention.

It is to be noted that although the various cooling methods have been described with particular reference to FIG. 5, any of the cooling methods represented respectively by the curves (1) to (4) out of the cooling methods represented respectively by the curves (1) to (6) shown in FIG. 5 is preferably employed particularly where that portion 30 of the non-standard structure is to be formed locally in the outer peripheral surface of the hub axle 14a as in the example of FIG. 51 and the inner race abutment face 60. Where the entire surface of the component part is rendered to be that portion 30 of the non-standard structure, a method shown by any one of the curves (1) and (6) may be employed.

According to the wheel support bearing assembly of the foregoing construction, the following effects can be obtained. During, for example, the cornering of the automotive vehicle, deflection of a large amplitude occurs repeatedly in the wheel mounting flange 17 and a high stress repeatedly set up in the corner 61 delimited between the inner race abutment face 60 of wheel hub 14 and the outer peripheral surface thereof, which forms a root portion of the wheel mounting flange 17. Against the repeated high stresses, where the corner portion 61 between the inner race abutment face 60 of the wheel hub 14 and the outer peripheral surface thereof is formed as the non-standard structure, the strength and the fatigue strength can be increased as a result of the minuteness of the structure and the increase of the hardness and, accordingly, generation of cracking can be suppressed. In other words, such a function as occurrence of a cracking→increase of a displacement of the wheel mounting flange 17→increase of vibrations of the automotive vehicle→damage to the wheel support bearing device can be suppressed to allow the life time to be increased.

Since that portion 30 of the non-standard structure can be obtained by effecting the cooling during the hot forging step or at the end of the hot forging step, addition of a simple process is sufficient and an undesirable reduction in productivity which would otherwise be brought about as a result of increase of the process steps can be suppressed. Also, since heat evolved in the hot forging is utilized, the amount of energies used in a process of refinement of the structure can be reduced unlike the induction heat treatment.

Although that portion 30, which is rendered to be the non-standard structure, may be the entire surface of the wheel hub 14, any possible reduction in processability such as, for example, capability of being machined can be minimized if it is limited to a required location, for example, an area ranging from the neighborhood of at least the inner race abutment face 60 in the outer peripheral surface of the hub axle 14a of the wheel hub 14 to the inner race abutment face 60.

Since the non-standard structure brings about an increase of the hardness as compared with the standard structure, frictional wear of the inner race abutment face 60 of the wheel hub 14, with which the inner race segment 15 on the outboard side contacts, can be reduced, thereby suppressing creepage which would otherwise result from the frictional wear. For this reason, frictional wear of the inner race abutment face 60 resulting from creepage→reduction in the axial force→further generation of the creepage→>frictional wear of the axle→generation of cracking from an end where edge-shaped frictional wear take place→reduction in durability can be avoided.

Figure 53:
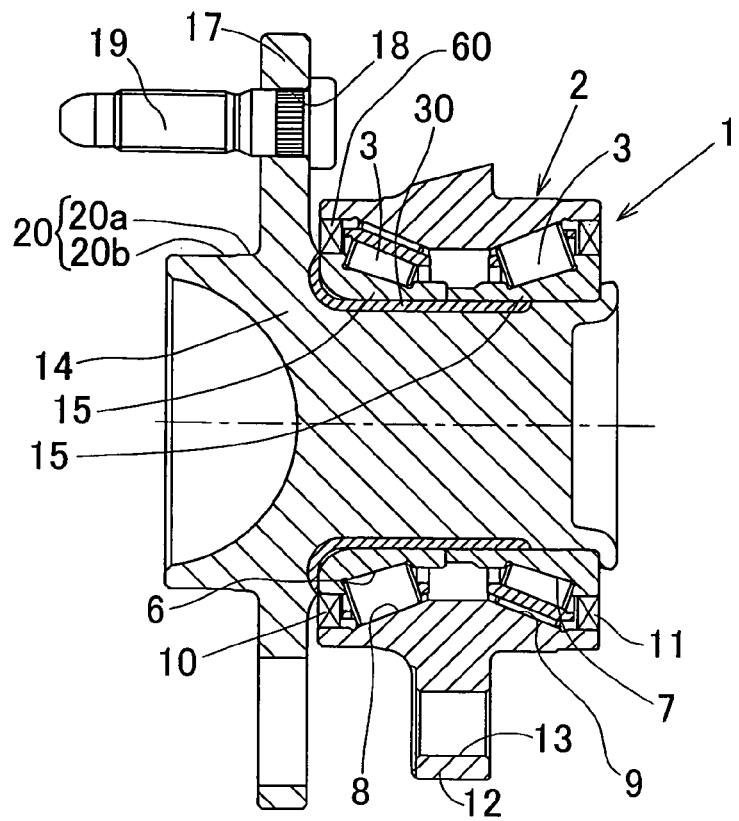
FIG. 53 is a longitudinal sectional view of the wheel support bearing assembly according to a fortieth preferred embodiment of the present invention.
Figure 54:
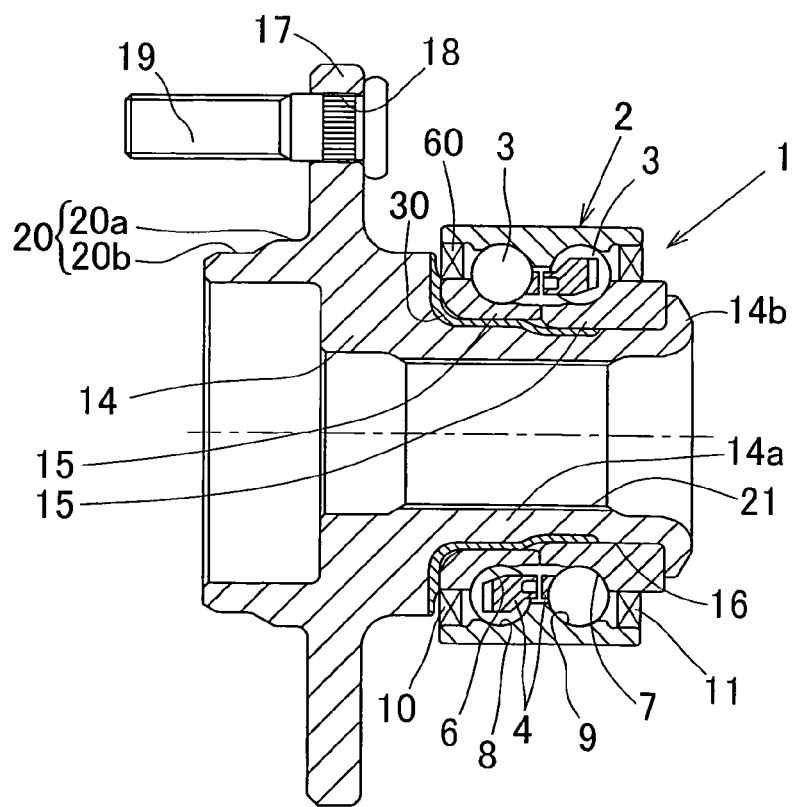
FIG. 54 is a longitudinal sectional view of the wheel support bearing assembly according to a forty-first preferred embodiment of the present invention.
Figure 55:
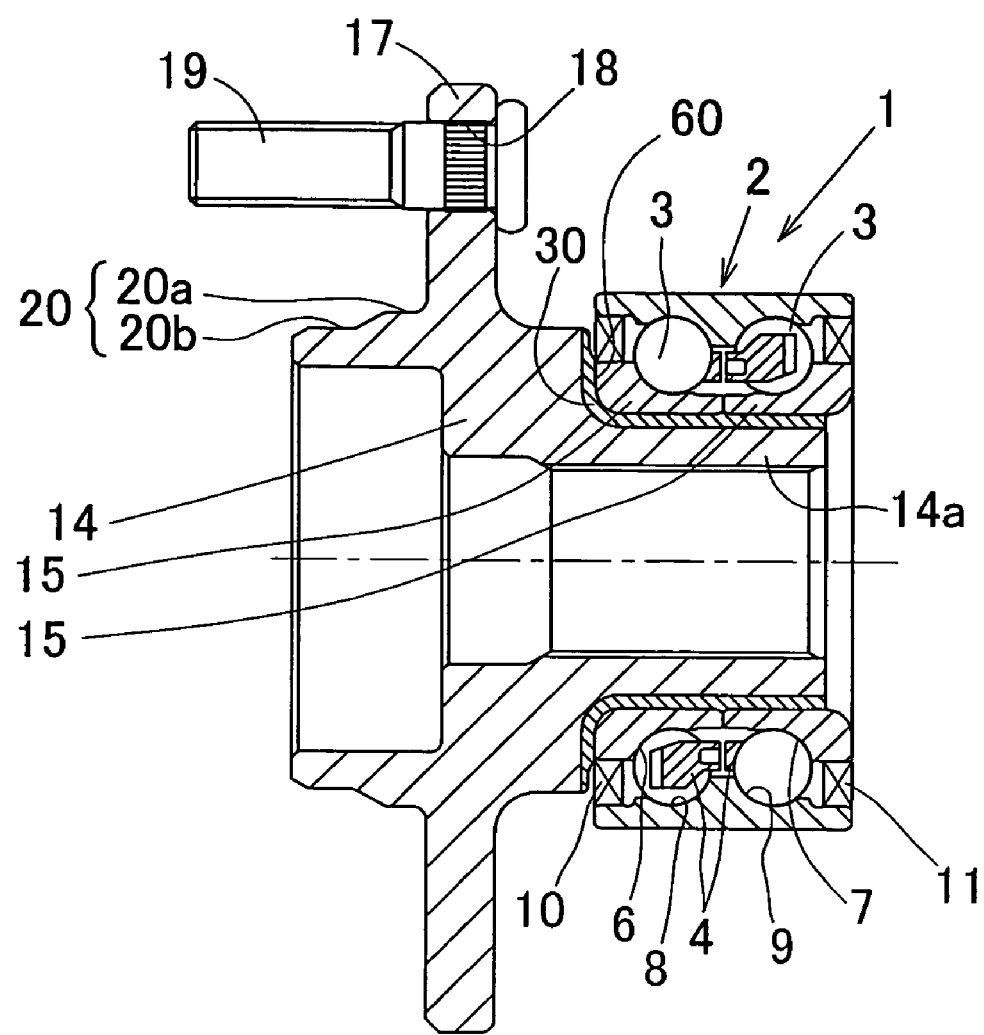
FIG. 55 is a longitudinal sectional view of the wheel support bearing assembly according to a forty-second preferred embodiment of the present invention.

FIGS. 53 to 55 illustrate the fortieth to forty-second preferred embodiments of the present invention. Even in each of those embodiments, the provision of that portion 30 of the non-standard structure in the surface area ranging from at least the neighborhood of the inner race abutment face 60 in the outer peripheral surface of the hub axle 14a of the wheel hub 14 to the inner race abutment face 60 is effective to increase the strength and the fatigue strength as a result of the minuteness of the structure and the increase of the hardness, resulting in increase of the life time. Also, as a result of the increase of the hardness of the inner race abutment face 60, frictional wear which would result from creepage can be reduced and increase of the creepage resulting therefrom and reduction in durability of the hub axle 14a can be suppressed.

It is to be noted that in each of those embodiments, unless otherwise specifically described, other structural features thereof than those described above are substantially similar to those shown and described in connection with the thirty-ninth embodiment with reference to FIGS. 51 and 52.

The wheel support bearing assembly shown in FIG. 53 is similar to the wheel support bearing assembly according to the thirty-ninth embodiment shown in and described with reference to FIGS. 51 and 52, but differs therefrom in that it is designed for use in supporting a vehicle driven wheel. Accordingly, the hub axle 14a of the wheel hub 14 has defined therein no throughhole such as identified by 21 in FIG. 51.

The wheel support bearing assembly shown in FIG. 54 is an angular contact ball bearing type for use in supporting a vehicle drive wheel, in which the outer race 2 has no vehicle body fitting flange as shown by 12 in the example of FIG. 53 and also having an entire outer diametric surface rendered to be a cylindrical surface. The inner race segments 15 are provided one for each row, but the inner race segment 15 on the inboard side has a thickness and an axial dimension both greater than those of the inner race segment 15 on the outboard side. The inner race segments 15 for the both rows may be of the same size.

Although as is the case with the wheel support bearing assembly shown in FIG. 54, the wheel support bearing assembly shown in FIG. 55 is an angular contact ball bearing type for use in supporting a vehicle drive wheel, the inner race segments 15 for the respective rows are rendered to be of the same size. In the instance as shown, the wheel hub 14 is not provided with such a crimped portion as indicated by 14b in the example of FIG. 54, and an axial fixing of the inner race segments 15 is accomplished by the constant velocity joint (not shown) that is coupled with the wheel hub 14.

It is to be noted that although the wheel support bearing assembly shown in FIGS. 54 and 55 have been shown and described for use in supporting the vehicle drive wheel, it may be rendered to be a wheel support bearing assembly for use in supporting a vehicle driven wheel. Also, in any one of the foregoing embodiments, in place of the product which has been obtained by effecting the cooling at the end of the hot forging step, the conventional hot forged product, which has been heated, may be cooled.

Figure 56:
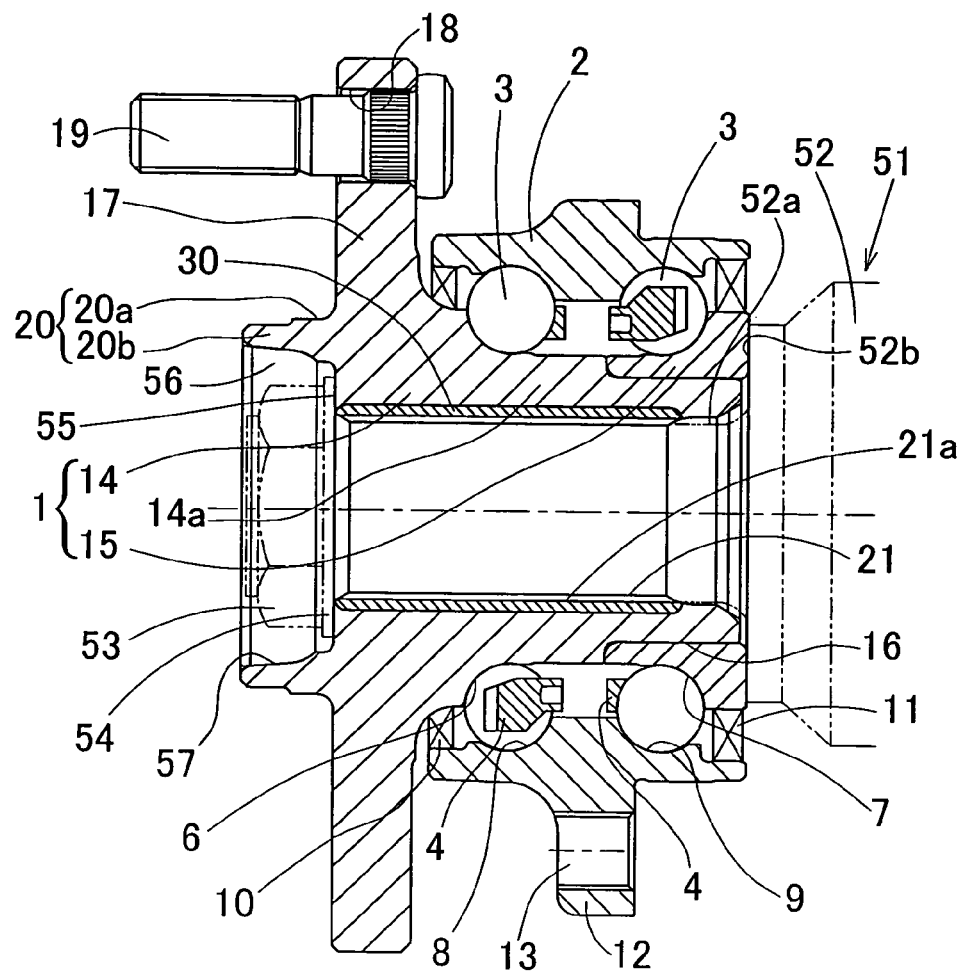
FIG. 56 is a longitudinal sectional view of the wheel support bearing assembly according to a forty-third preferred embodiment of the present invention.
Figure 57:
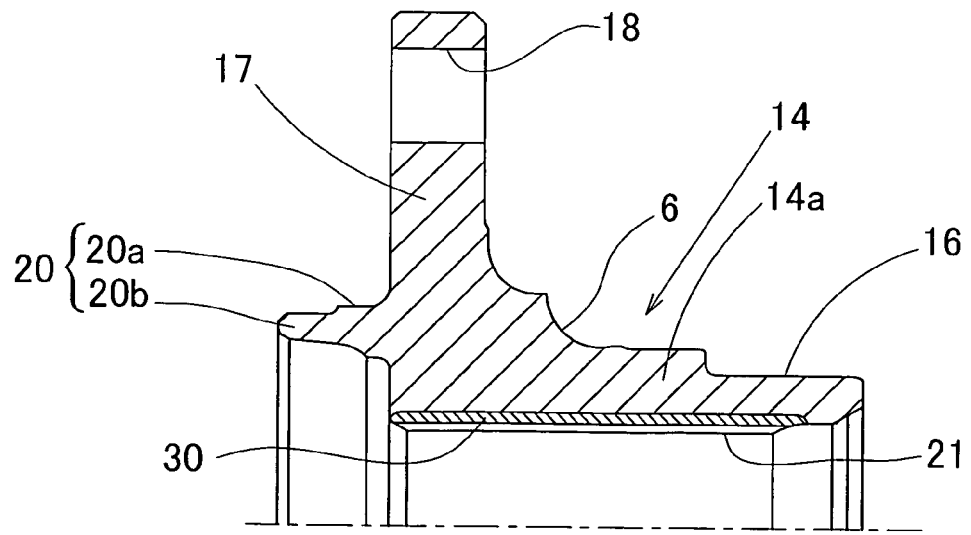
FIG. 57 is a fragmentary longitudinal sectional view showing the wheel hub employed in the wheel support bearing assembly according to the forty-third preferred embodiment of the present invention.

The forty-third preferred embodiment of the present invention will now be described with particular reference to FIGS. 56 and 57. FIG. 5 illustrates one example of the wheel support bearing assembly which is applied to a third generation type for support of a vehicle drive wheel.

The center portion of the wheel hub 14 is formed with a throughhole 21, through which a stem portion 52a of an outer race 52 of the constant velocity joint 51, which serves one of coupling members, is inserted. The stem portion 52a is in the form of a serrated axle, and the throughhole 21 has a portion of an inner diametric surface thereof, excluding the neighbor of the inboard end thereof, provided with serrations 21a that are engageable with serrations of the stem portion 52a. It is to be noted that the stem portion 52a may be in the form of a splined axle and splines may be provided in place of the serrations 21a of the hub axle 14.

An open end edge of the throughhole 21 at the outboard end face of the wheel hub 14 defines a seating surface 55 with which a nut 53, threaded on a male thread portion at a free end of the stem portion 52a or a washer 54 placed therebelow contacts. By fastening the nut 53, a stepped face 52b of the constant velocity universal joint outer ring 52 is urged to an end face of the inner race segment to allow the wheel support bearing assembly and the constant velocity joint 51 to be coupled together.

The seating surface 55 of the wheel hub 14 is in the form of a bottom face of a counterbore 56. An outboard end face of the wheel hub 14 is formed with a recess 57 on an inner diametric side of the pilot portion 20 and the counterbore 56 is defined at the bottom of this recess 57. As a result of formation of the recess 57, the pilot portion 20 represents a cylindrical shape.

Any of the wheel hub 14, the inner race segments 15, both forming respective parts of the inner member 1, and the outer member 2 is a hot forged product of steel material. Of them, a surface area of a portion of the inner diametric surface of the throughhole 21, where the serrations 21a are provided, is rendered to be that portion 30 of the non-standard structure. A matrix portion of the wheel hub 14 is of the standard structure.

According to the wheel support bearing assembly of the foregoing construction, the following effects can be obtained. Since that portion of the inner diametric surface of the wheel hub 14, where the serrations 21a are formed, represents a serrated shape, it may occur that dale portions are susceptible to a high stress during, for example, the cornering of the automotive vehicle, by the effect of a moment load acting on the wheel hub 14 and, also, by the effect of repeated minute deformation and displacement, some of the serrations 21a between the wheel hub 14 and the constant velocity joint 51 undergo friction, accompanied by frictional wear.

However, against the repeated high stresses occurring in the manner described above, when the inner diametric surface of the wheel hub 14, where the serrations 21a are formed, is rendered to be that portion 30 of the non-standard structure, the structure and the fatigue strength can increase as a result of the minuteness of the structure and the increase of the hardness thereby suppressing generation of cracking from tooth dale of the serration 21a. In other words, such a function as occurrence of a cracking→increase of a displacement of the site where the stress is generated→elongation of cracks→damage to the wheel hub can be suppressed to allow the life time to be increased.

Also, because of the increase of the hardness due to the non-standard structure, frictional wear of the serrations 21a can be avoided. For this reason, it is possible to suppress frictional wear of the teeth which would otherwise result in incapability of the driving force being transmitted.

Since that portion 30 of the non-standard structure can be obtained by effecting the cooling during the hot forging step or at the end of the hot forging step, addition of a simple process is sufficient and an undesirable reduction in productivity which would otherwise be brought about as a result of increase of the process steps can be suppressed. Also, since heat evolved in the hot forging is utilized, the amount of energies used in a process of refinement of the structure can be reduced.

Where that portion 30 of the non-standard structure is obtained by effecting the cooling during or at the end of the hot forging step, the treatment can easily be accomplished, unlike the shot peening, even though the throughhole 21 of the wheel hub 14 has a small inner diameter. Also unlike the induction heat treatment, the problem associated with occurrence of rattling and/or increase of a mounting load of the constant velocity joint 51, which would otherwise result from reduction in precision of the teeth which has resulted from thermal strain after the heat treatment can be avoided.

Although that portion 30 to be rendered as the non-standard structure may be the entire surface of the wheel hub, any possible reduction in processability such as, for example, capability of being machined can be minimized by limiting it to a required location such as the site of the inner diametric surface of the throughhole 21, where the serrations 21a are formed.

Figure 58:
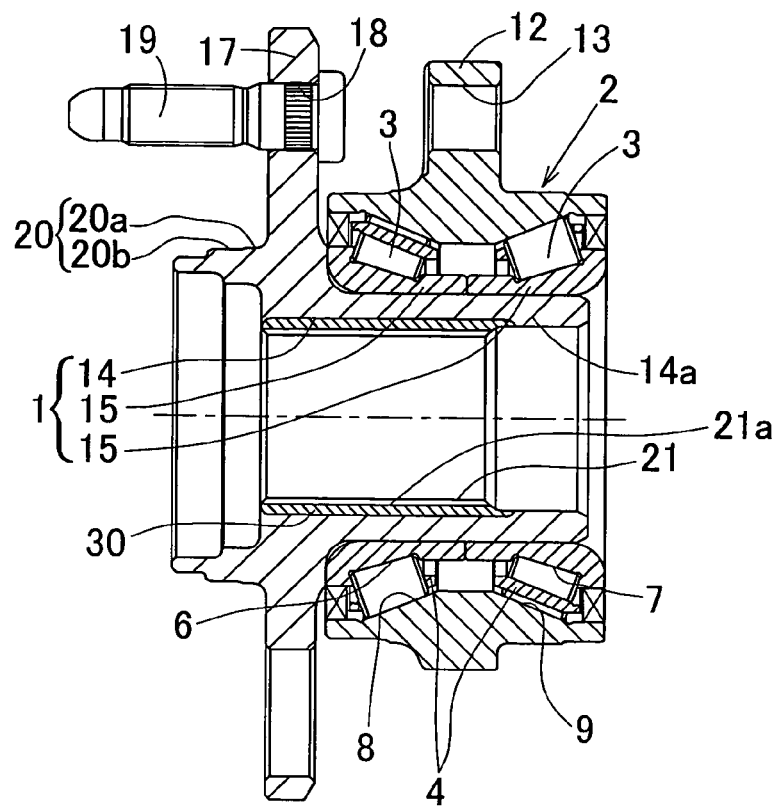
FIG. 58 is a longitudinal sectional view of the wheel support bearing assembly according to a forty-fourth preferred embodiment of the present invention.
Figure 59:
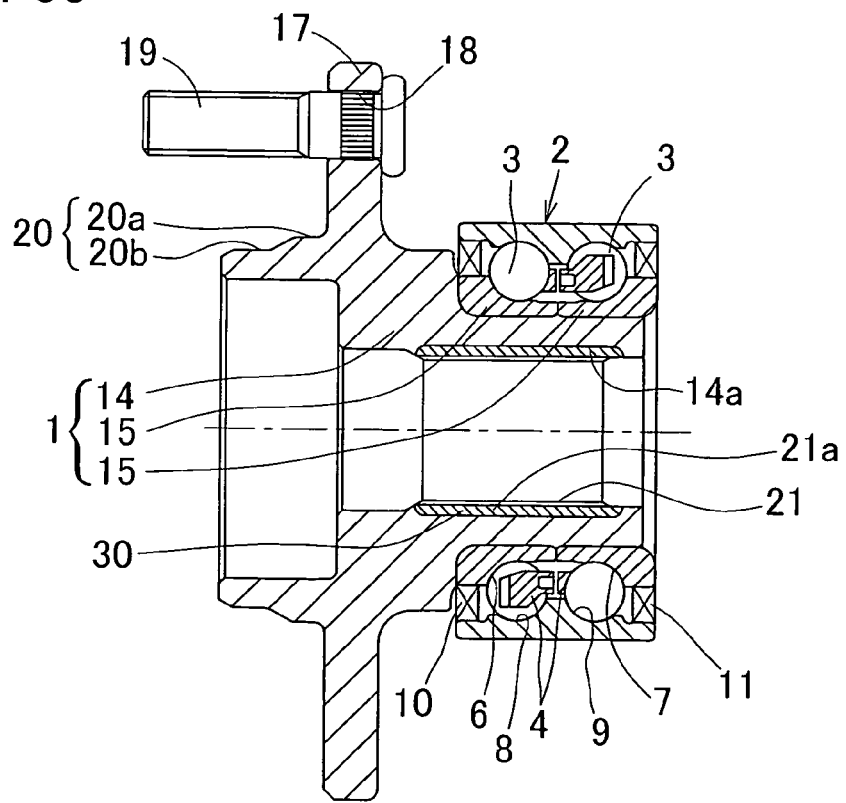
FIG. 59 is a longitudinal sectional view of the wheel support bearing assembly according to a forty-fifth preferred embodiment of the present invention.
Figure 60:
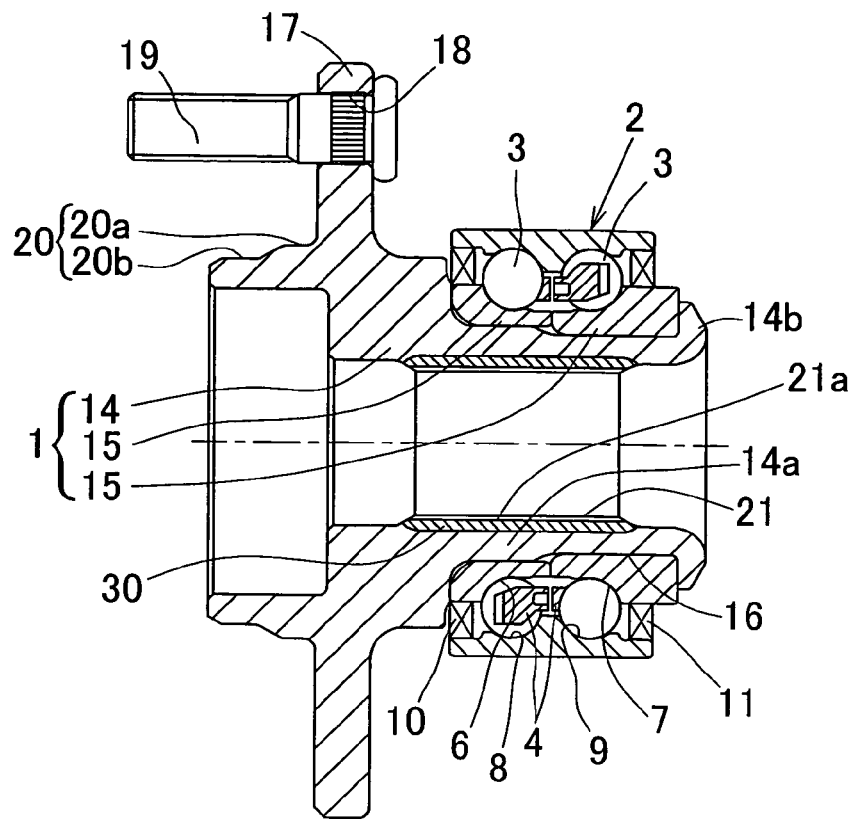
FIG. 60 is a longitudinal sectional view of the wheel support bearing assembly according to a forth-sixth preferred embodiment of the present invention.

FIGS. 58 to 60 illustrate the forty-fourth to forty-sixth preferred embodiments of the present invention, respectively. The wheel support bearing assembly shown in any one of FIGS. 58 to 60 is of a type, in which a wheel hub 14 is employed as a component part independent of a complete dual row bearing unit including the inner race segments 15, the outer member 2 and the rolling elements 3. Even in those embodiments, the surface area of the inner diametric surface of the throughhole 21 of the wheel hub 14, where the serrations 21a are formed, is rendered to be that portion 30 of the non-standard structure and, accordingly, the minuteness of the structure and the hardness thereof are increased to allow the strength and the fatigue strength to be increased to thereby increase the life time. Also, as a result that the hardness of that surface area where the serrations 21a are formed has been increased, the frictional wear, for example, of the serrations 21a can be reduced.

It is to be noted that in each of those embodiments, unless otherwise specifically described, other structural features thereof than those described above are substantially similar to those shown and described in connection with the forty-third embodiment with reference to FIGS. 56 and 57.

The wheel support bearing assembly shown in FIG. 58 is a tapered roller bearing type for the support of a vehicle drive wheel, in which the inner member 1 is made up of a wheel hub 14 and a plurality of inner race segments 15 mounted on an outer periphery of a hub axle 14a of the wheel hub 14. The inner race segments 15 are provided one for each row. The outer member 2 is a member of one-piece construction having a vehicle body fitting flange 12 formed integrally therewith.

The wheel support bearing assembly shown in FIG. 59 is of an angular contact ball bearing type for the support of a vehicle drive wheel, in which the inner member 1 is made up of the hub axle 14 and the plural rows of the inner race segments 15 mounted on the outer periphery of the hub axle 14a of the wheel hub 14, similarly to the embodiment shown in FIG. 58. The outer member 2 is in the form of a member of one-piece construction having an outer diametric surface rendered to be a cylindrical surface over the entirety and no vehicle body fitting mounting flange such as identified by 12 in the example of FIG. 56 is employed. The two inner race segments 15 are rendered to have the same size.

The wheel support bearing assembly shown in FIG. 60 is of a type, in which the inner 1 is made up of the hub axle 14 and the plural rows of the inner race segments 15 mounted on the outer periphery of the hub axle 14a of the wheel hub 14. The inner race segments 15 are provided one for each row, and the inner race segment 15 on the inboard side are rendered to have a thickness and an axial dimension both greater than those of the inner race segment 15 on the outboard side. The inner race segments 15 are axially fixed to the wheel hub 14 by means of the crimped portion 14b provided in the wheel hub 14. The outer member 2 is a member of one-piece construction and has an outer diametric surface rendered to be cylindrical over the entirety and has no vehicle body fitting flange such as identified by 12 in the example of FIG. 56.

Figure 61:
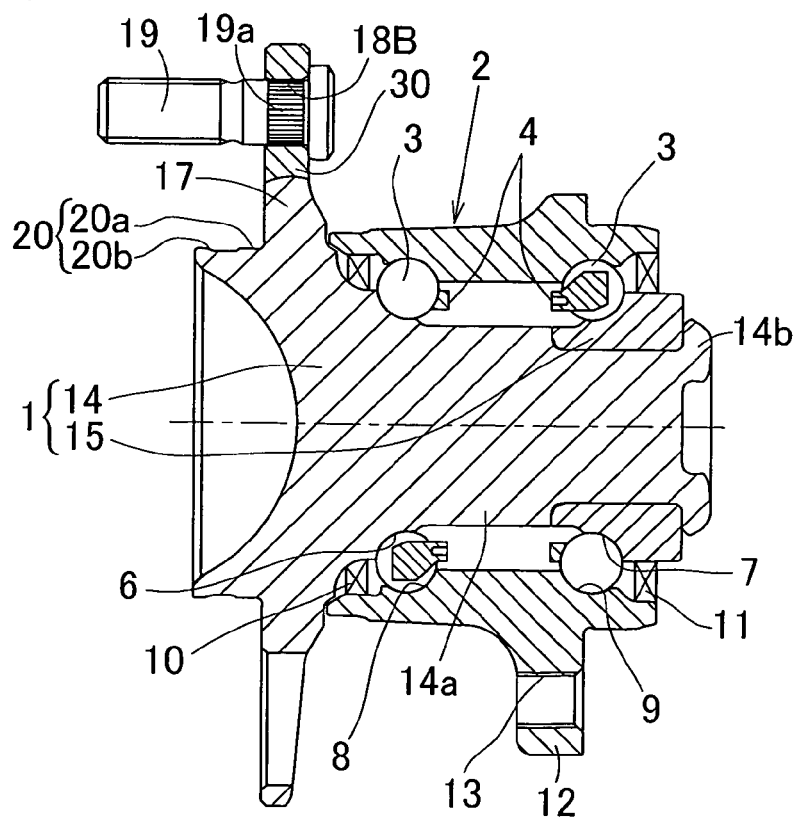
FIG. 61 is a longitudinal sectional view of the wheel support bearing assembly according to a forty-seventh preferred embodiment of the present invention.
Figure 62:
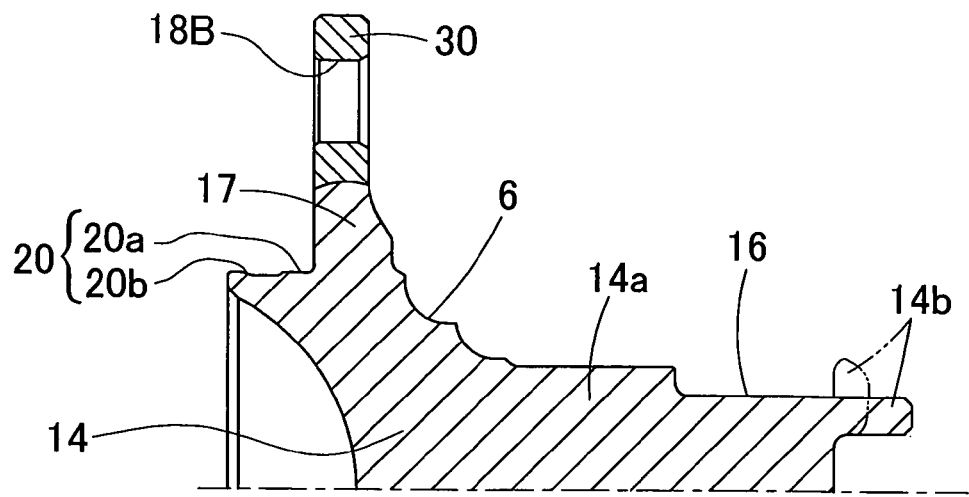
FIG. 62 is a fragmentary longitudinal sectional view showing the wheel hub employed in the wheel support bearing assembly according to the forty-seventh preferred embodiment of the present invention.

The forty-seventh preferred embodiment of the present invention will be described with particular reference to FIGS. 61 and 62. FIG. 61 illustrates one example of the wheel support bearing assembly, which is applied to a third generation type for use in supporting a vehicle driven wheel.

The inner member 1 is of two-piece construction including the wheel hub 14 and the inner race segment 15 mounted on an outer periphery of an inboard end of the hub axle 14a of the wheel hub 14. The raceways 6 and 7 on the side of the inner member 1 are defined in the wheel hub 14 and the inner race segments 15, respectively. An inboard end of an outer periphery of the hub axle 14a of the wheel hub 14 is formed with an inner race segment mounting surface 16 that is radially inwardly stepped to have a small diameter, with the inner race segment 15 mounted on this inner race segment mounting surface 16. The inner race 15 is axially fixed to the wheel hub 14 by means of the crimped portion 14b that is formed by crimping the inboard end of the hub axle 14a of the wheel hub 14 in a direction radially outwardly.

The wheel hub 14 includes a wheel mounting flange 17 formed with an outer periphery of the outboard end of the hub axle 14a so as to extend radially outwardly therefrom and hub bolts 19 are fitted in a press-fitted fashion to respective bolt press-fitting holes 18B defined in the wheel mounting flange 17 at a plurality of locations circumferentially thereof. Each of the hub bolts 19 has a neck portion formed with serrations 19a.

An annular pilot portion 20 coaxial with the wheel hub 14 protrudes outwardly from that root portion of the wheel mounting flange 17 of the wheel hub 14. This pilot portion 20 is made up of a brake pilot 20a for guiding a brake disc, which is fitted to an outboard side face of the wheel mounting flange 17 in overlapped relation therewith, and a wheel pilot 20b protruding in an outward direction beyond the brake pilot 20a. It is to be noted that pilot portion 20 may be in the form in which a plurality of cutouts are provided at a corresponding number of locations circumferentially thereof so as to be divided.

The wheel hub 14 and the inner race segments 15, both forming respective parts of the inner member 1, and the outer member 2 are hot forged products of steel material. Of them, inner surfaces of the bolt press-fitting holes 18B of the wheel hub 14 are rendered to be that portion 30 of the non-standard structure. That portion 30 of the non-standard structure is that provided locally in the wheel hub 14 and a region ranging from an inner diametric side of the circular row of the bolt press-fitting holes 18B in the wheel mounting flange 17 to a tip thereof is rendered to be that portion 30 of the non-standard structure. That portion 30 of the non-standard structure may be limited to a periphery of each of the bolt press-fitting holes 18B. A matrix portion of the wheel hub 14 represents the standard structure.

According to the wheel support bearing assembly of the above described construction, the following effects can be obtained. The fine ferrite-pearlite structure is more minute in structure than the standard structure and, because of it, where the inner surface of each of the bolt press-fitting holes 18B is formed as that portion 30 of the non-standard structure, the fitting characteristics of the serrations 19a formed in the neck portion of each hub bolt 19 can be increased. For this reason, the possibility can be suppressed, in which the hub bolt 19 press-fitted into the respective bolt press-fitting holes 18B may rotate together with the nut when the latter is turned.

Although the fine ferrite-pearlite structure referred to above is a normalized structure, since it is provided locally in the wheel hub 14 unlike that normalized over the entirety of the wheel hub 14, it can be obtained by locally cooling to allow it to be self recuperated during or at the end of the hot forging step as hereinbefore described. For this reason, the normalizing step as a process step independent of the heat treating step can be dispensed with and a problem associated with the increase of the process step can be resolved.

Figure 63:
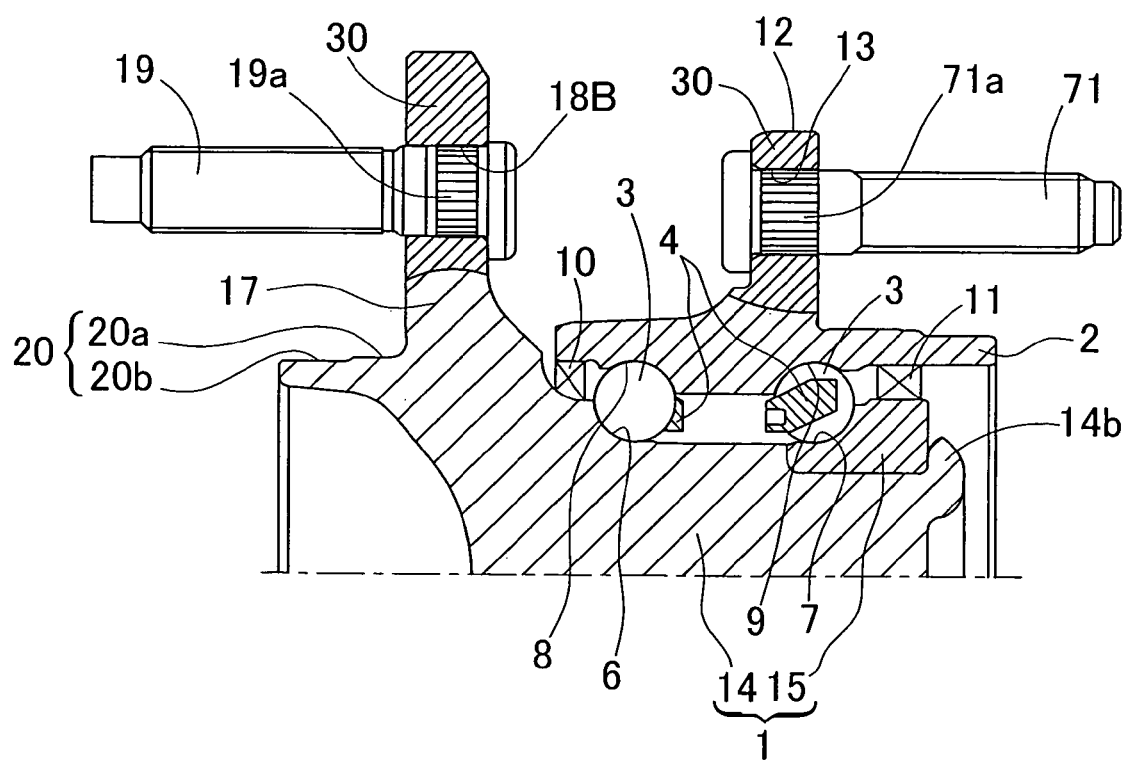
FIG. 63 is a fragmentary longitudinal sectional view of the wheel support bearing assembly according to a forty-eighth preferred embodiment of the present invention.

FIG. 63 illustrates the forty-eighth preferred embodiment of the present invention. This embodiment is substantially similar to the forty-seventh embodiment shown in and described with reference to FIGS. 61 and 62, but differs therefrom in that the area of portions 30, where the non-standard structure is formed, is increased. In this embodiment, vehicle body fitting holes 13 formed in the vehicle body fitting flange 12 of the outer member are rendered to be bolt press-fitting holes, and stud bolts 51 are respectively press-fitted into those vehicle body fitting holes 13. Each of the stud bolts 51 has a neck portion provided with serrations 71a. An inner surface of each of the vehicle body fitting holes 13, which is a bolt press-fitting hole, in the previously described vehicle body fitting flange 12 is rendered to be that portion 30 of the non-standard structure. Even in this embodiment, that portion 30 of the non-standard structure is that formed locally in the outer member 2 and a region ranging from an inner diametric side of the circular row of the bolt press-fitting holes 13 in the vehicle body fitting flange 12 to a tip thereof is rendered to be that portion 30 of the non-standard structure. That portion 30 of the non-standard structure may be limited to a periphery of each of the vehicle body fitting holes 13. A matrix portion of the wheel hub 14 represents the standard structure. Other structural features thereof than those described above are substantially similar to the forty-seventh embodiment.

In the case of this embodiment, as a result of minuteness of the structure in the vehicle body fitting holes 13 in the vehicle body fitting flange 12, which are bolt press-fitting holes, the fitting characteristics of the serrations 71a formed in each of the stud bolts 71 can be increased and the necessity of the normalizing step for the outer member 2 that is effected for that purpose can be eliminated.

FIGS. 64 to 71 illustrate the forty-ninth to fifty-sixth preferred embodiments of the present invention, respectively. Even in those embodiments, as a result that the inner surface of each of the bolt press-fitting holes 18B in the wheel mounting flange 17 of the wheel hub 14 is rendered to be that portion 30 of the non-standard structure, the fitting characteristics of the serrations 19a formed in each of the hub bolts 19 can be increased as a result of the minuteness of the structure, and the necessity of the normalizing step for the wheel hub 14 and the outer member 2 can be eliminated. In the embodiment shown in FIG. 71, as a result that the inner surface of each of the bolt press-fitting holes 18B in the outer member 2 is rendered to be that portion 30 of the non-standard structure, the fitting characteristics of the serrations 19a formed in each of the hub bolts 19 can be increased as a result of the minuteness of the structure, and the necessity of the normalizing step for the outer member 2 can be eliminated.

It is to be noted that in some of the embodiments shown in and described with reference to FIGS. 64 to 71, in which the vehicle body fitting flange 12 is employed (i.e., the embodiments shown in FIGS. 64, 65, 66 and 70, respectively), when the inner surface of each of the vehicle body fitting holes 13 is rendered to be that portion 30 of the non-standard structure where the vehicle body fitting holes 13 in the vehicle body fitting flange 12 are employed in the form of a bolt press-fitting hole, the fitting characteristics of the serrations 79a formed in each of the stud bolts 51 can be increased as a result of the minuteness of the structure, and the necessity of the normalizing step for the outer member 2 can be eliminated.

Figure 64:
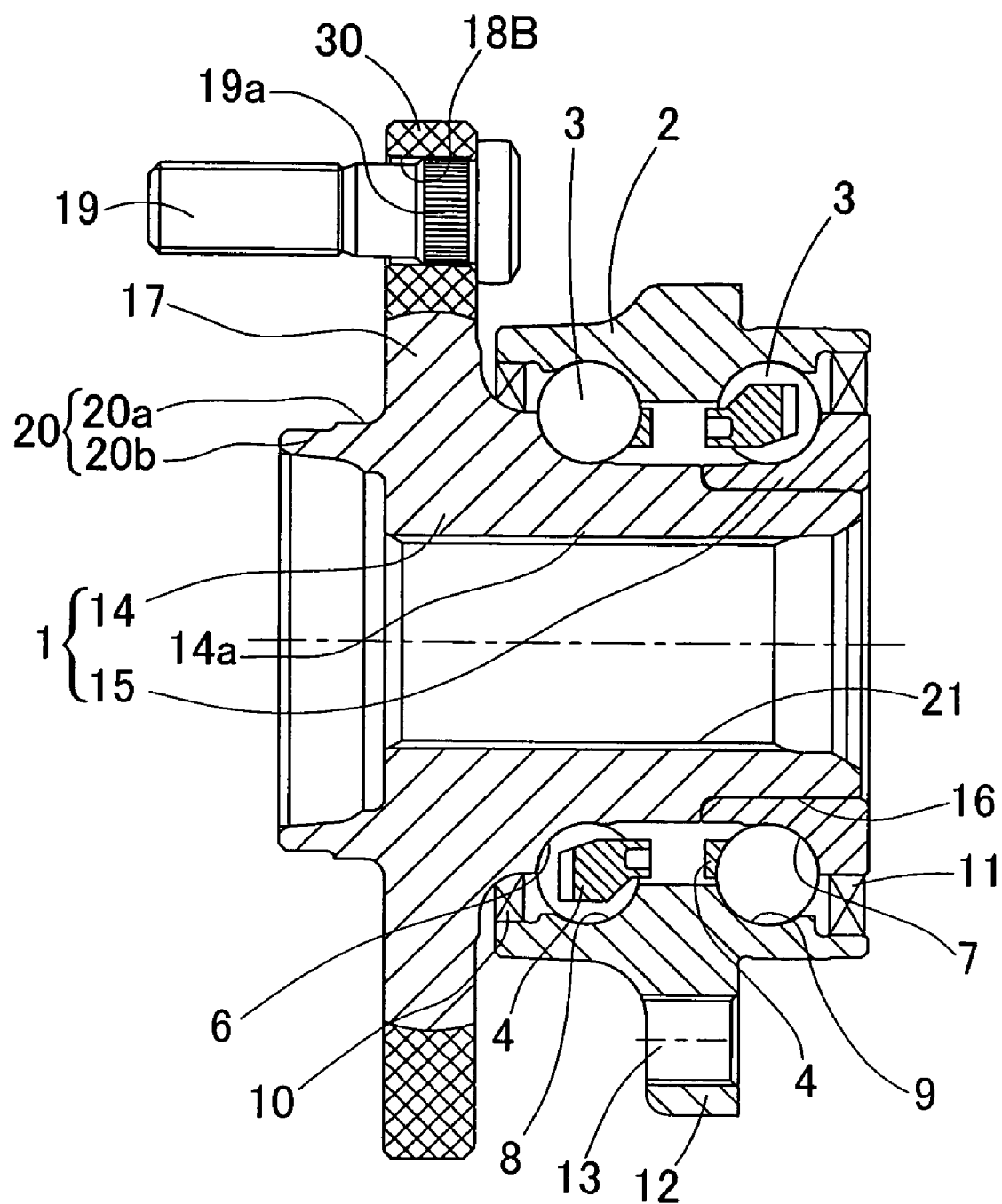
FIG. 64 is a longitudinal sectional view of the wheel support bearing assembly according to a forty-ninth preferred embodiment of the present invention.

The embodiment shown in FIG. 64 is similar to the wheel support bearing assembly shown in and described with reference to FIG. 61, but differs therefrom in that wheel support bearing assembly shown in FIG. 64 is designed to allow it to be used for supporting a vehicle drive wheel. In this embodiment, the wheel hub 14 has the throughhole 21 defined in the central portion thereof. Other structural features than those described above are substantially similar to those shown in and described with reference to FIG. 61.

Figure 65:
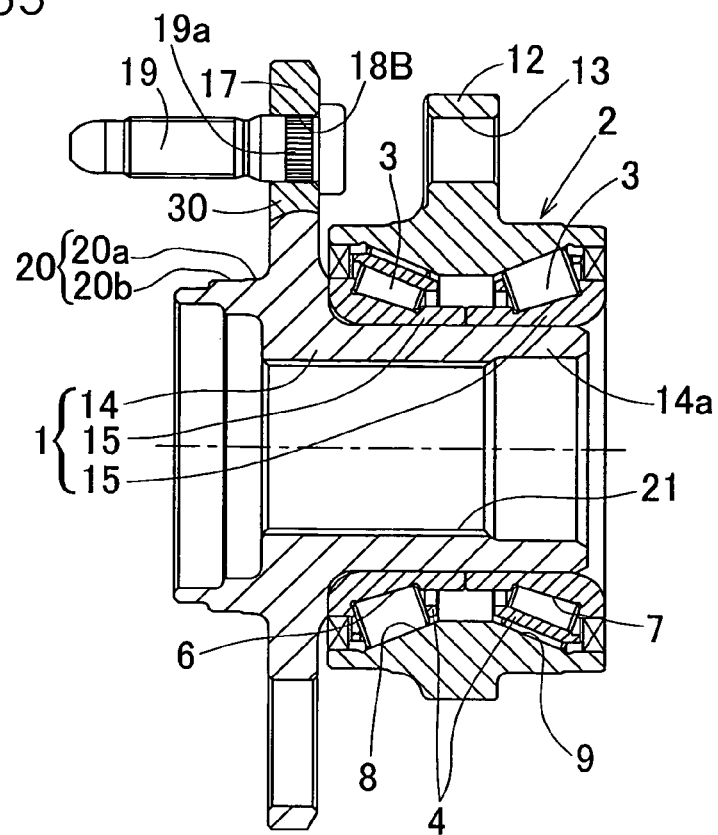
FIG. 65 is a longitudinal sectional view of the wheel support bearing assembly according to a fiftieth preferred embodiment of the present invention.

The wheel support bearing assembly shown in FIG. 65 is a tapered roller bearing type for use in supporting a vehicle drive wheel, in which the inner member 1 is made up of the wheel hub 14 and the plural rows of inner race segments 15 mounted on the outer periphery of the hub axle 14a of the wheel hub 14. The wheel hub 14 has the wheel mounting flange 17. The inner race segments 15 are provided one for each row. The outer member 2 is a member of one-piece construction including the vehicle body fitting flange 12. This wheel support bearing assembly is provided with a wheel hub 14 employed as a component part independent of a complete dual row bearing unit including the inner race segments 15, the outer member 2 and the rolling elements 3.

Figure 66:
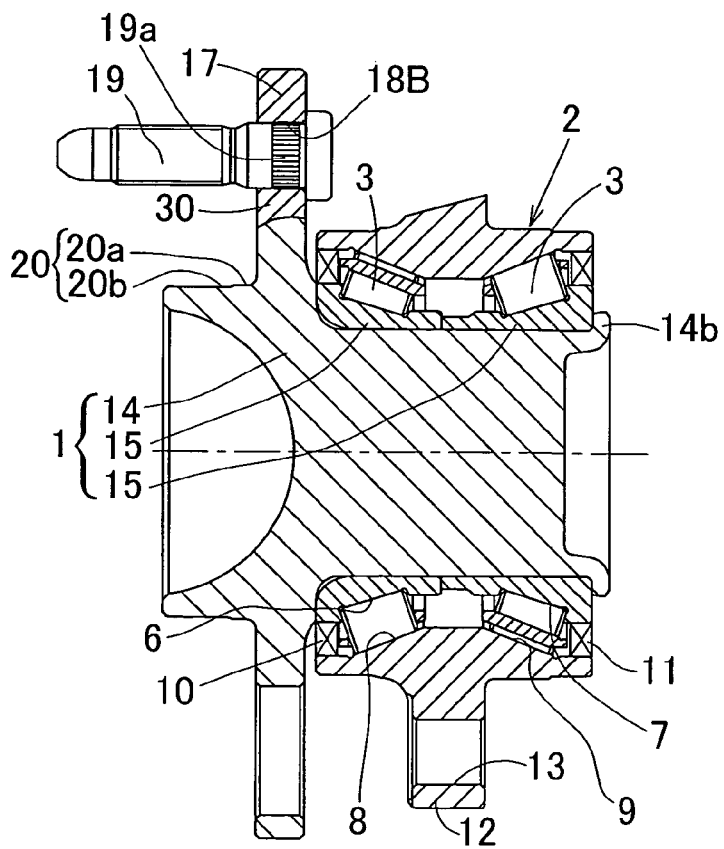
FIG. 66 is a longitudinal sectional view of the wheel support bearing assembly according to a fifty-first preferred embodiment of the present invention.

FIG. 66 illustrates an example, in which the wheel support bearing assembly shown in and described with reference to FIG. 65 is designed for use in supporting a vehicle driven wheel and the wheel hub 14 has its central portion provided with no throughhole such as identified by 21 in the previous embodiments. Also, the inner race segments 15 are fixed to the wheel hub 14 by means of the crimped portion 14b in the wheel hub 14. Other structural features thereof than those described above are substantially similar to those of the wheel support bearing assembly shown in and described with reference to FIG. 65.

Figure 67:
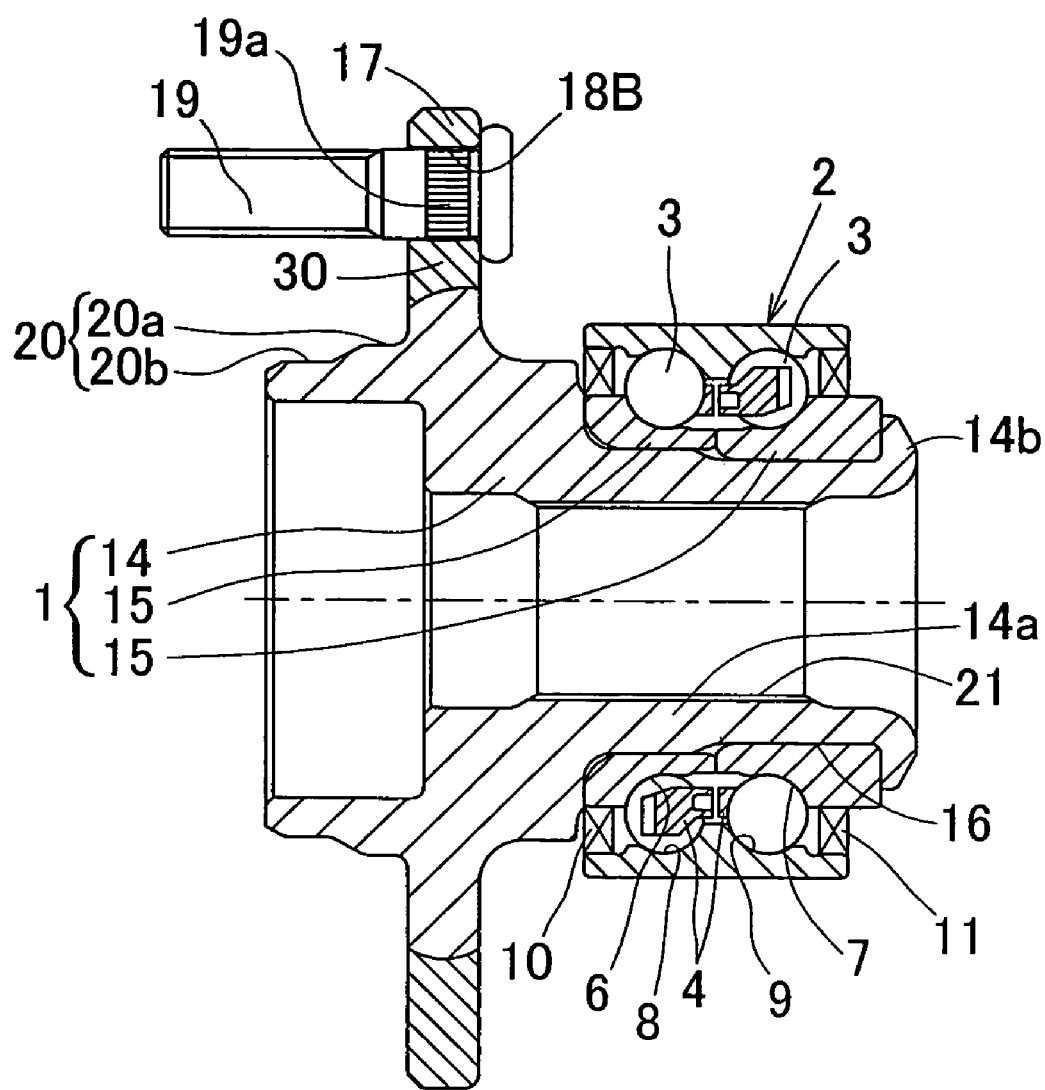
FIG. 67 is a longitudinal sectional view of the wheel support bearing assembly according to a fifty-second preferred embodiment of the present invention.

The wheel support bearing assembly shown in FIG. 67 is of an angular contact ball bearing type for the support of a vehicle drive wheel, in which the inner member 1 is made up of the hub axle 14 and the plural rows of the inner race segments 15 mounted on the outer periphery of the hub axle 14a of the wheel hub 14. The inner race segments 15 are employed one for each row and the inner race segment 15 on the inboard side may have a thickness and an axial dimension, which are greater than those of the inner race segment 15 on the outboard side. Also, the inner race segments 15 are axially fixed to the wheel hub 14 by means of that crimped portion 14b provided in the wheel hub 14. The outer member 2 is in the form of a member of one-piece construction having an outer diametric surface rendered to be a cylindrical surface over the entirety and no vehicle body fitting mounting flange such as identified by 12 in the example of FIG. 56 is employed.

Figure 68:
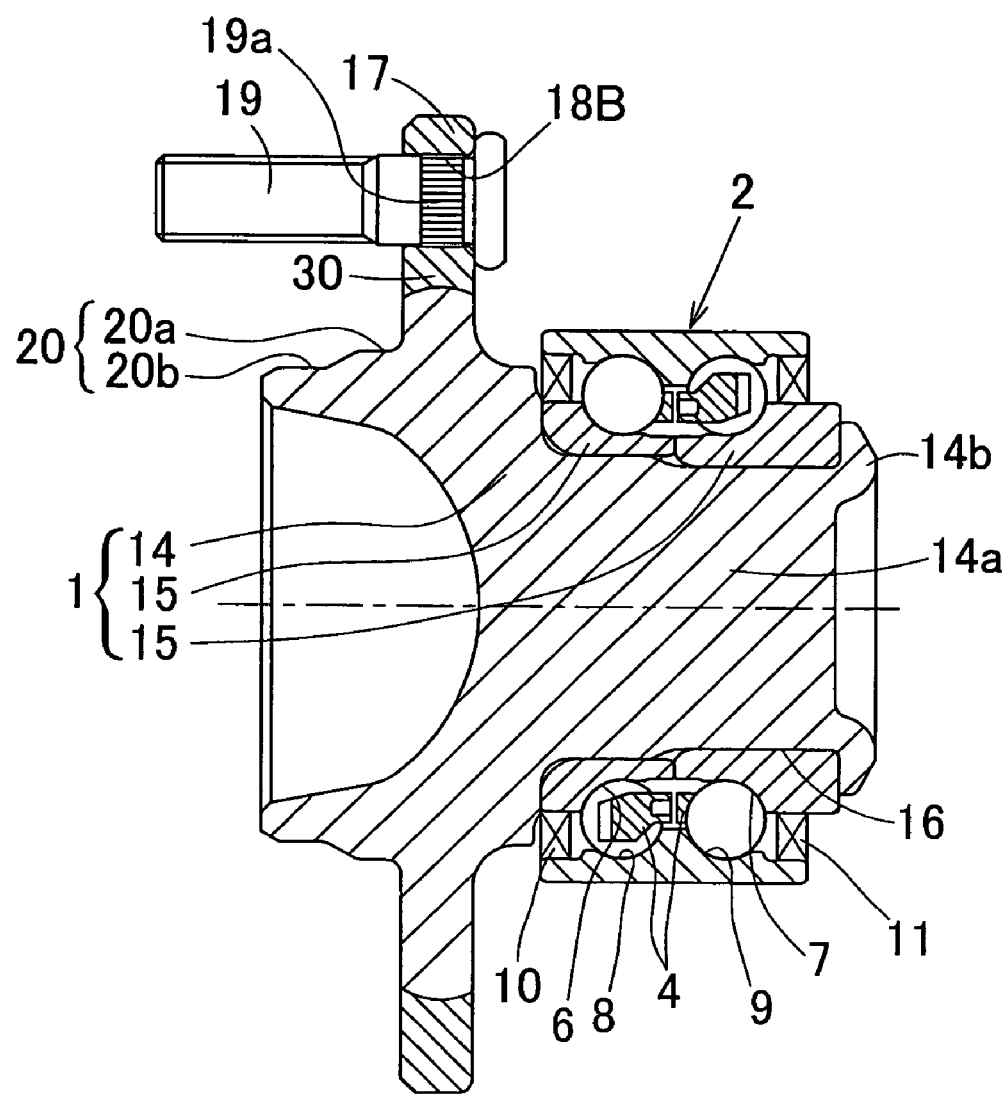
FIG. 68 is a longitudinal sectional view of the wheel support bearing assembly according to a fifty-third preferred embodiment of the present invention.

FIG. 68 illustrates an example, in which the wheel support bearing assembly shown in and described with reference to FIG. 67 is designed for use in supporting a vehicle driven wheel and the wheel hub 14 has its central portion provided with no throughhole such as identified by 21 in the previous embodiments. Other structural features thereof than those described above are substantially similar to those of the wheel support bearing assembly shown in and described with reference to FIG. 65.

Figure 69:
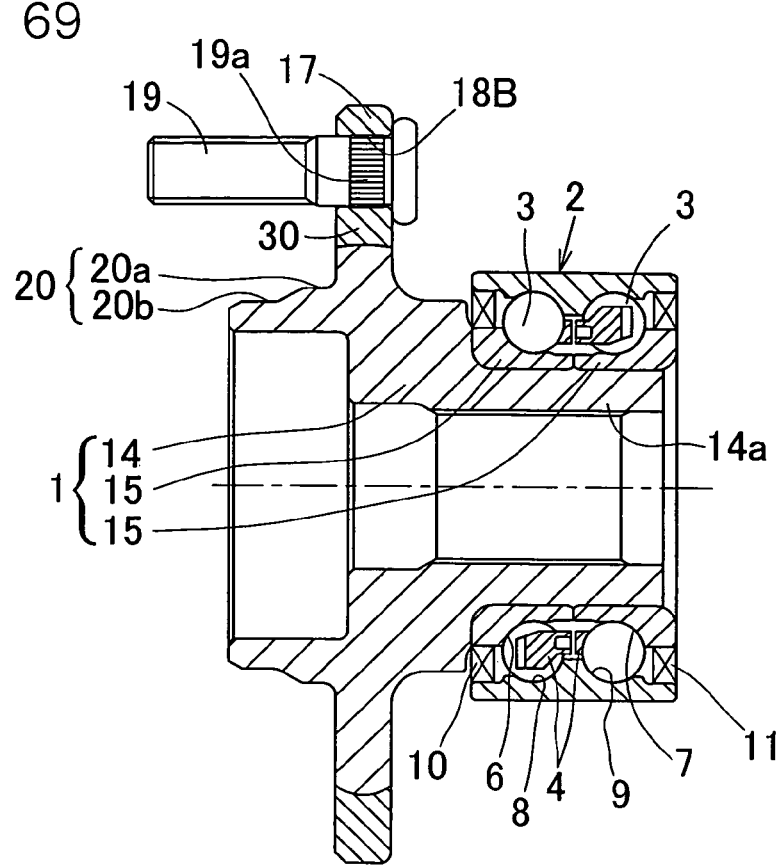
FIG. 69 is a longitudinal sectional view of the wheel support bearing assembly according to fifty-fourth preferred embodiment of the present invention.

The wheel support bearing assembly shown in FIG. 69 is similar to the wheel support bearing assembly shown in and described with reference to FIG. 67 and the inner member 1 is made up of the wheel hub 14 and the plural rows of inner race segments 15 mounted on the outer periphery of the hub axle 14a of the wheel hub 14. The outer member 2 is a member of one-piece construction, having no vehicle body fitting flange 12. In the instance as shown, the two inner race segments 15 has the same size and axial fixing of the inner race segments 15 to the wheel hub 14 is achieved, without relying on the crimping, by means of the constant velocity joint (not shown) coupled with the wheel hub 14.

Figure 70:
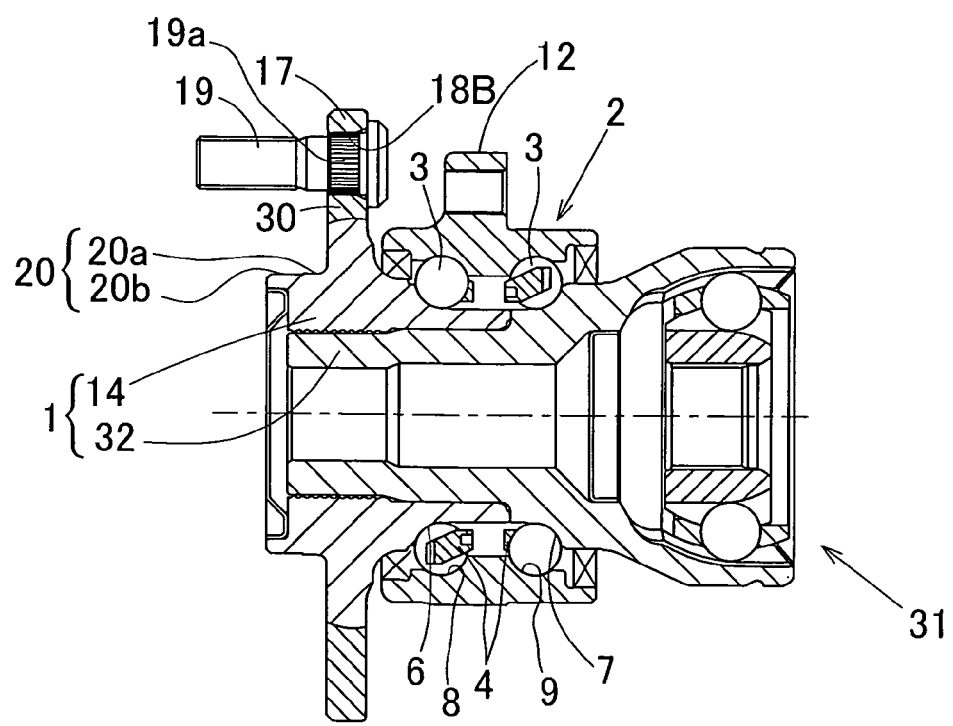
FIG. 70 is a longitudinal sectional view of the wheel support bearing assembly according to a fifty-fifth preferred embodiment of the present invention.

The wheel support bearing assembly shown in FIG. 70 is of a fourth generation type, in which the inner member 1 is made up of the wheel hub 14 and a joint outer ring 32, which is one of coupling members forming respective parts of a constant velocity joint 31, with rows of raceways 6 and 7 being formed respectively on the wheel hub 14 and the joint outer ring 32. The outer member 2 is of one-piece construction, having a vehicle body fitting flange 12.

Figure 71:
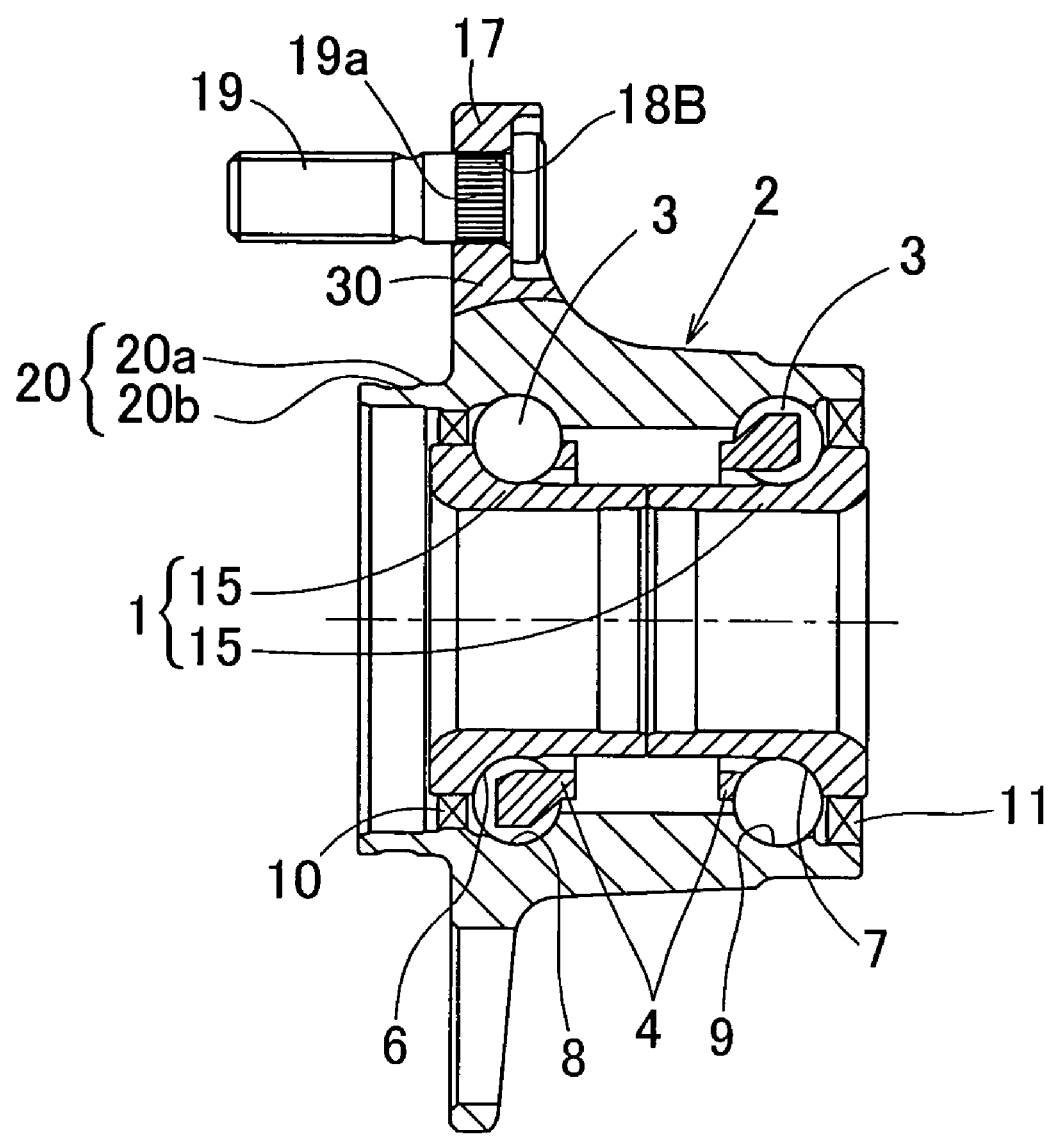
FIG. 71 is a longitudinal sectional view of the wheel support bearing assembly according to a fifty-sixth preferred embodiment of the present invention.

The wheel support bearing assembly shown in FIG. 71 is an outer member rotating model of a second generation type, in which the outer member 2 has the wheel mounting flange 17 and the inner member 1 is in the form of a plurality of rows of inner race segments 15.

Figure 72:
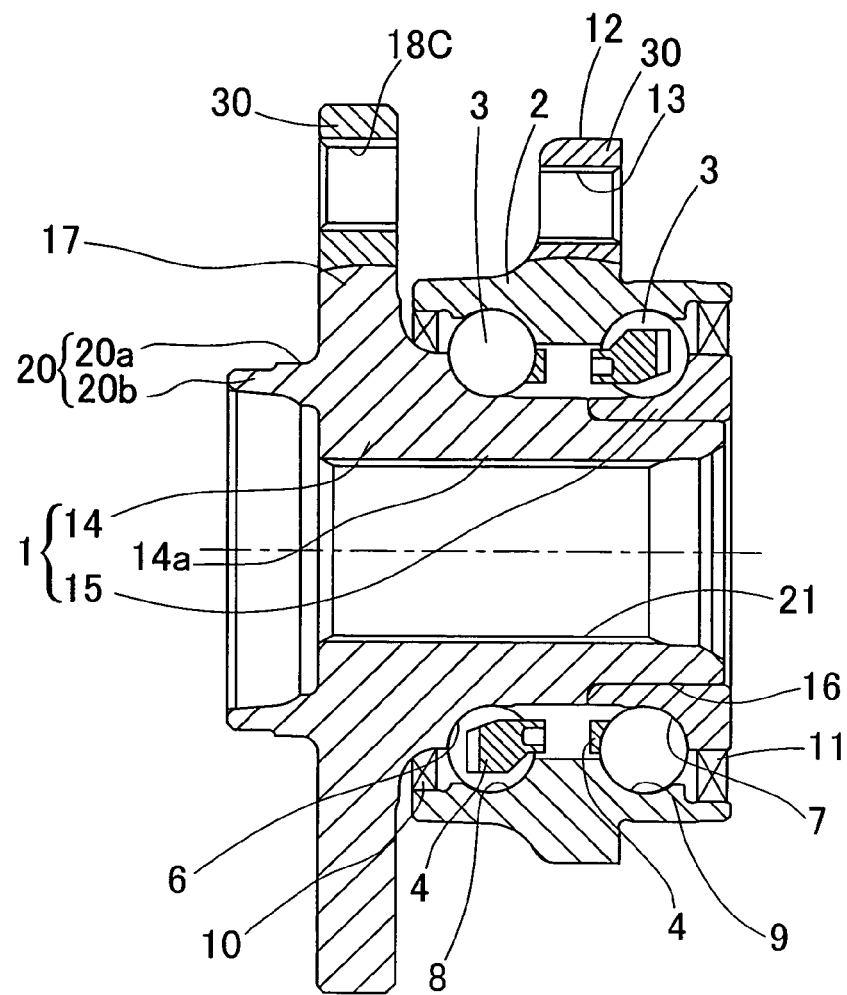
FIG. 72 is a longitudinal sectional view of the wheel support bearing assembly according to a fifty-seventh preferred embodiment of the present invention.

The fifty-seventh preferred embodiment of the present invention will be described with particular reference to FIGS. 72, 73A and 73B. FIG. 72 illustrates one example of the wheel support bearing assembly, which is applied to a third generation type for supporting a vehicle drive wheel.

The wheel hub 14 has a wheel mounting flange 17 defined in the outer periphery of the outboard end of the hub axle 14a so as to extend radially outwardly, and a plurality of wheel mounting holes 18C, each in the form of a screw hole and having an inner surface rendered to be a female thread, are formed in the wheel mounting flange 17 at a corresponding number of circumferential locations. Each of the wheel mounting holes 18C has a respective wheel bolt (not shown) threaded therein, and a vehicle wheel (not shown) overlapped on an outboard end face of the wheel mounting flange 17 is fixed thereto by means of the wheel bolts.

Figure 74:
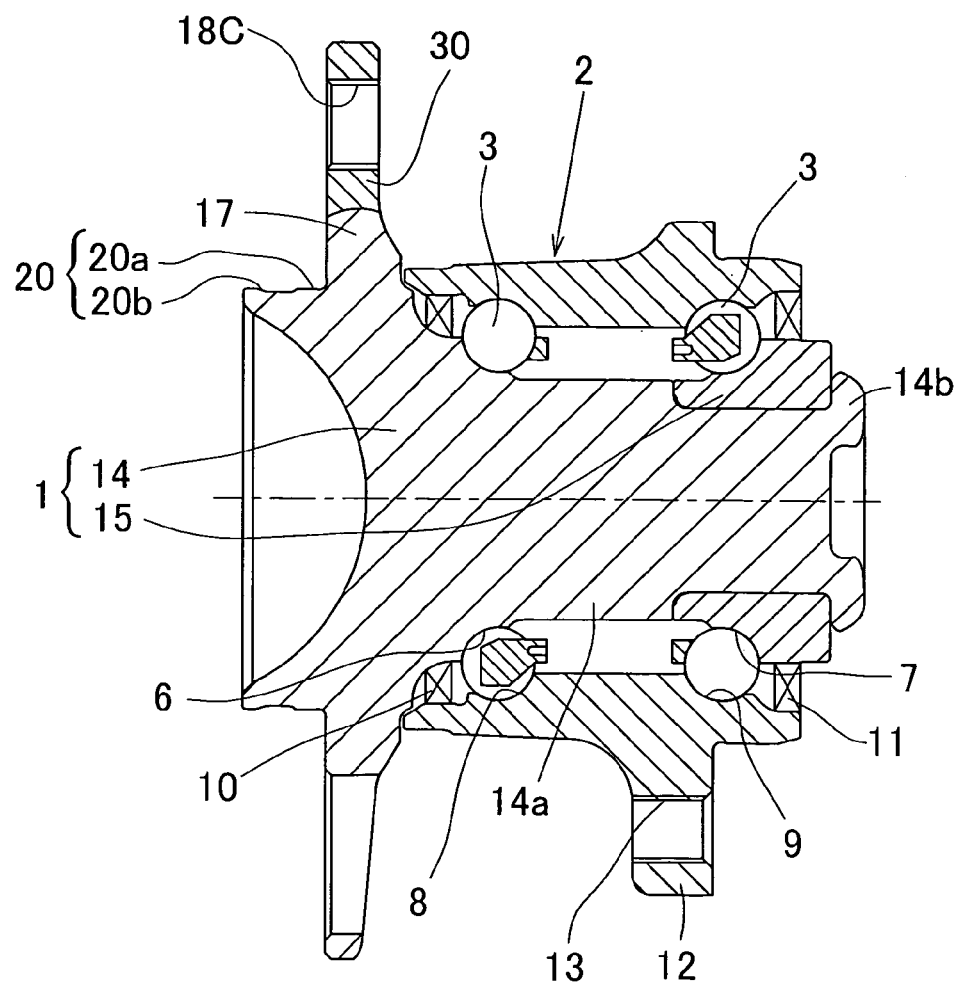
FIG. 74 is a longitudinal sectional view of the wheel support bearing assembly according to a fifty-eighth preferred embodiment of the present invention.

It is to be noted that in the wheel support bearing assembly for supporting the vehicle driven wheel, as shown in FIG. 74, the wheel hub 14 is rendered to be of a type having no throughhole such as identified by 21 in the example of FIG. 72. Also, in the wheel support bearing assembly for supporting the vehicle driven wheel as shown in FIG. 74, the inner race segments 15 are axially fixed to the wheel hub 14 by means of the crimped portion 14b that is formed by crimping the inboard end of the hub axle 14a of the wheel hub 14 in a direction radially outwardly.

In FIGS. 72, 73A, 73B and 74, the wheel hub 14 and inner race segments 15, both forming respective parts of the inner member 1, and the outer member 2 are hot forged products of steel material. Of them, the inner surface of each of the wheel mounting holes 18C each in the form of a screw hole in the wheel mounting flange 17 of the wheel hub 14, is rendered to be that portion 30 of the non-standard structure. Also, the inner surface of each of the wheel mounting holes 13 each in the form of a screw hole in the vehicle body fitting flange 12 of the outer member 2 is rendered to be that portion 30 of the non-standard structure. The matrix portion of the wheel hub 14 represents the standard structure. Those portions 30 of the non-standard structure is that locally provided in the hub 14 and the outer member 2, respectively, and a region ranging from the neighborhood on the inner diametric side of the circular row of the wheel mounting holes 18C or the vehicle body fitting holes 13 in the respective flange 17 or 12 to a tip thereof is rendered to be that portion 30 of the non-standard structure. That portion 30 of the non-standard structure may be limited to the neighbor of the wheel mounting holes 18C or the vehicle body fitting holes 13.

It is to be noted that although various cooling methods have been described with particular reference to FIG. 5, any of the cooling methods represented respectively by the curves (1) to (4) out of the cooling methods represented respectively by the curves (1) to (6) shown in FIG. 5 is preferably employed particularly where that portion 30 of the non-standard structure is provided locally such as, for example, the neighborhood of the wheel mounting holes 18C, each in the form of a screw hole, in the wheel mounting flange 17 and the neighborhood of the vehicle body fitting holes 13 in the vehicle body fitting flange 12. Where the entire surface of the component part is to be rendered to be that portion 30 of the non-standard structure, the cooling method represented respectively by the curves (1) and (6) may be employed.

According to the wheel support bearing assembly of the above described construction, the following effects can be obtained. That portion 30 of the non-standard structure including one of the fine ferrite-pearlite structure, the upper bainite structure, the lower bainite structure, the tempered martensite structure and the mixed structure comprised of two or more of those structures, is minute in structure as compared with a matrix portion represented by the standard structure and have a hardness about equal to or higher than that. Because of the minuteness of the structure and the increase of the hardness discussed above, the strength and the fatigue strength of the wheel mounting holes 18C and the vehicle body fitting holes 13, which are screw holes, can increase and, when a high stress occurs repeatedly during, for example, cornering of the automotive vehicle, occurrence of cracking in the wheel mounting holes 18C and the vehicle body fitting holes 13, which are screw holes provided in the wheel mounting flange 17 and the vehicle body fitting flange 12, respectively, can be suppressed. In other words, cracking→increase of a displacement of that portion where the stresses occur→increase of an amplitude of the automotive vehicle→reduction in durability of component parts of the wheel support bearing assembly, where the screw holes are provided→separation of the bolts can be suppressed. Also, as a result of the increased hardness brought about by the use of the non-standard structure, damages to the wheel mounting holes 18C and the vehicle body fitting holes 13 when heavily loaded, can be suppressed to allow it to withstand a further high load. In addition, frictional wear of the female threads in the wheel mounting holes 18C and the vehicle body fitting holes 13 can be reduced to avoid reduction and slackening of the axial force of the wheel bolts and the vehicle body fitting bolts.

Thus, it can be highly strengthened and can have an increased life time. As compared with the conventional wheel support bearing assembly having the standard structure, downsizing and reduction in weight can be accomplished. Accordingly, the input weight of product manufacturing of the wheel support bearing assembly can advantageously be reduced to thereby reduce the cost, making it possible to provide the wheel support bearing assembly at an inexpensive price.

Since that portion 30 of the non-standard structure can be obtained by effecting the cooling during the hot forging step or at the end of the hot forging step, addition of a simple process is sufficient and an undesirable reduction in productivity which would otherwise be brought about as a result of increase of the process steps can be suppressed. Also, since heat evolved in the hot forging is utilized, the amount of energies used in a process of refinement of the structure can be reduced.

Since that portion 30, which is rendered to be the non-standard structure, is formed at required locations such as, for example, the neighborhood of the wheel mounting holes 18C and/or the vehicle body fitting holes 13, any possible reduction in processability such as, for example, capability of being machined can be minimized.

It is to be noted that although in each of the foregoing embodiments, both of the wheel mounting holes 18C and the vehicle body fitting holes 13 have been shown and described as rendered to be screw holes and the inner surfaces of those screw holes have been shown and described as rendered to be that portion 30 of the non-standard structure, either one of the wheel mounting holes 18C and the vehicle body fitting holes 13 may be rendered to be in the form of screw holes and the inner surfaces of those screw holes may be rendered to be that portion 30 of the non-standard structure. By way of example, the wheel mounting holes 18C may be in the form of bolt press-fitting holes so that hub bolts having serrations can be press-fitted and, on the other hand, the vehicle body fitting holes 13 may be in the form of screw holes with the inner surfaces thereof rendered to be that portion 30 of the non-standard structure. Alternatively, the vehicle body fitting holes 13 may be in the form of bolt insertion holes having no male threads and the wheel mounting holes 18C may be in the form of screw holes with the inner surfaces thereof rendered to be that portion 30 of the non-standard structure.

FIGS. 74 to 81 illustrate the fifty-eighth to sixty-fifth preferred embodiments of the present invention. Even in those embodiments, the inner surfaces of the wheel mounting holes 18C and/or the vehicle body fitting holes 13, both in the form of screw holes, are rendered to be that portion 30 of the non-standard structure. Accordingly, as a result of the minuteness of the structure and the increase of the hardness, the strength and the fatigue strength can be increased and the increased life time can be expected. Also, as a result of the increase of the hardness, frictional wear of female screws used in the wheel mounting holes 18C and/or the vehicle body fitting holes 13 can be reduced to avoid reduction and slackening of the axial force of the wheel bolts and the vehicle body fitting bolts.

Figure 73A:
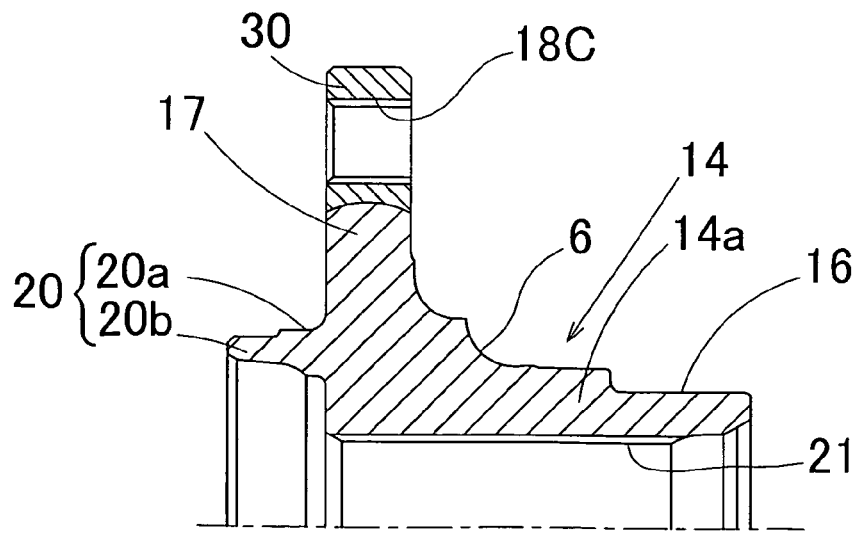
FIG. 73A is a fragmentary longitudinal sectional view showing the wheel hub employed in the wheel support bearing assembly according to a fifty-seventh preferred embodiment of the present invention.
Figure 73B:
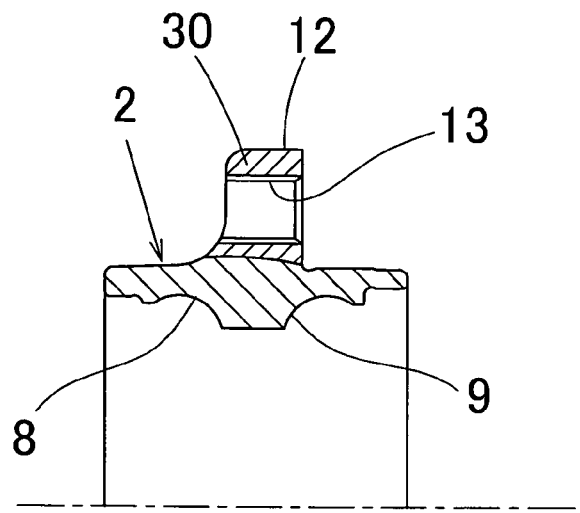
FIG. 73B is a fragmentary longitudinal sectional view showing the outer member employed in the wheel support bearing assembly according to a fifty-seventh preferred embodiment of the present invention.

It is to be noted that each of the foregoing embodiments are, unless otherwise specifically described, similar to the fifty-seventh embodiment shown in and described with particular reference to FIGS. 72, 73A and 73B and, therefore, parts, which are shown therein, but correspond to like parts shown in those figures, are designated by like reference and, therefore, the details are not reiterated. Also, even in each of these embodiments, in the case of the embodiment, in which both of the wheel mounting flange 17 and the vehicle body fitting flange 12 are employed (i.e., respective embodiments shown in FIGS. 74, 75, 76 and 80), one of the holes, that is, the wheel mounting holes 18C or the vehicle body fitting holes 13 may be in the form of a screw holes and the inner surfaces of such screw holes may be rendered to be that portion 30 of the non-standard structure.

FIG. 74 illustrates the wheel support bearing assembly shown in and described with particular reference to FIG. 72, which is modified to allow it to be used for supporting a vehicle driven wheel. In this embodiment, the wheel hub 14 has no central portion provided with no throughhole such as identified by 21. Other structural features thereof than those described above are substantially similar to the example of FIG. 72.

Figure 75:
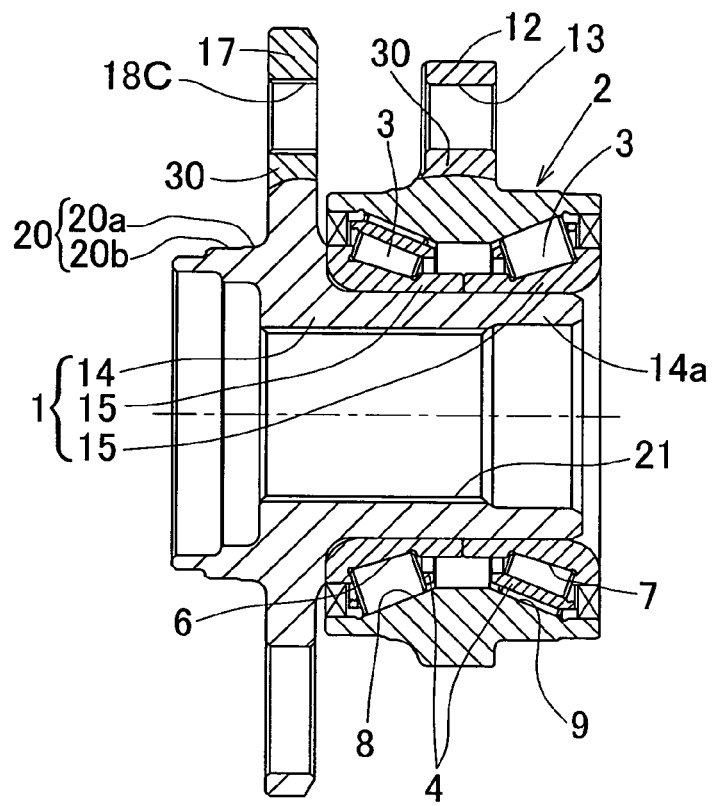
FIG. 75 is a longitudinal sectional view of the wheel support bearing assembly according to a fifty-ninth preferred embodiment of the present invention.

The wheel support bearing assembly shown in FIG. 75 is a tapered roller bearing type for use in supporting a vehicle drive wheel, in which the inner member 1 is made up of the wheel hub 14 and the plural rows of inner race segments 15 mounted on the outer periphery of the hub axle 14a of the wheel hub 14. The wheel hub 14 has the wheel mounting flange 17. The inner race segments 15 are provided one for each row. The outer member 2 is a member of one-piece construction including the vehicle body fitting flange 12. This wheel support bearing assembly is provided with a wheel hub 14 employed as a component part independent of a complete dual row bearing unit including the inner race segments 15, the outer member 2 and the rolling elements 3.

Figure 76:
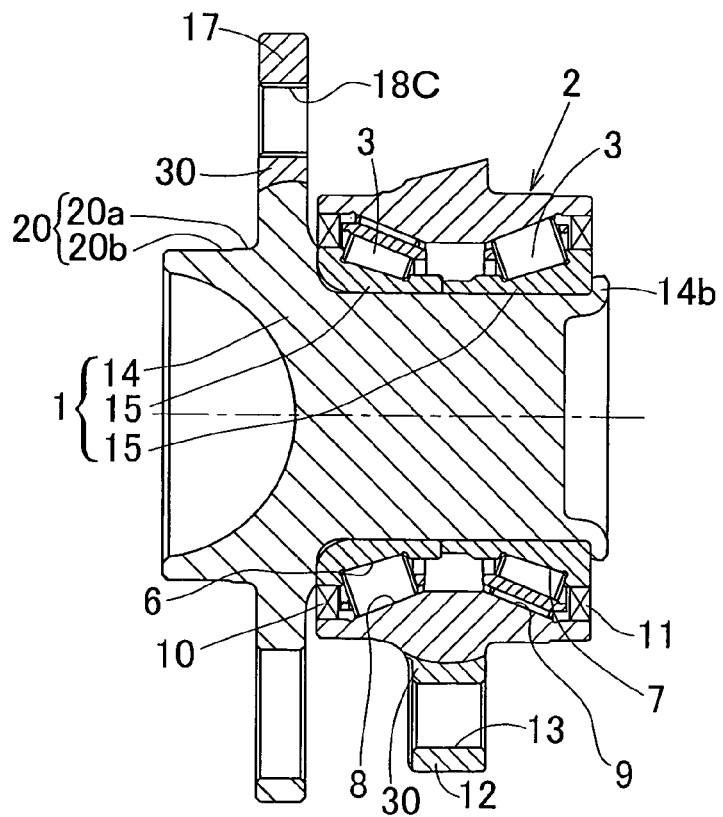
FIG. 76 is a longitudinal sectional view of the wheel support bearing assembly according to a sixtieth preferred embodiment of the present invention.

FIG. 76 illustrates the wheel support bearing assembly shown in and described with particular reference to FIG. 75, which is modified to allow it to be used for supporting a vehicle driven wheel. In this embodiment, the wheel hub 14 has no central portion formed with no throughhole such as identified by 21. Also, the inner race segments 15 are fixed to the wheel hub 14 by means of the crimped portion 14b in the wheel hub 14. Other structural features thereof than those described above are substantially similar to the example of FIG. 76.

Figure 77:
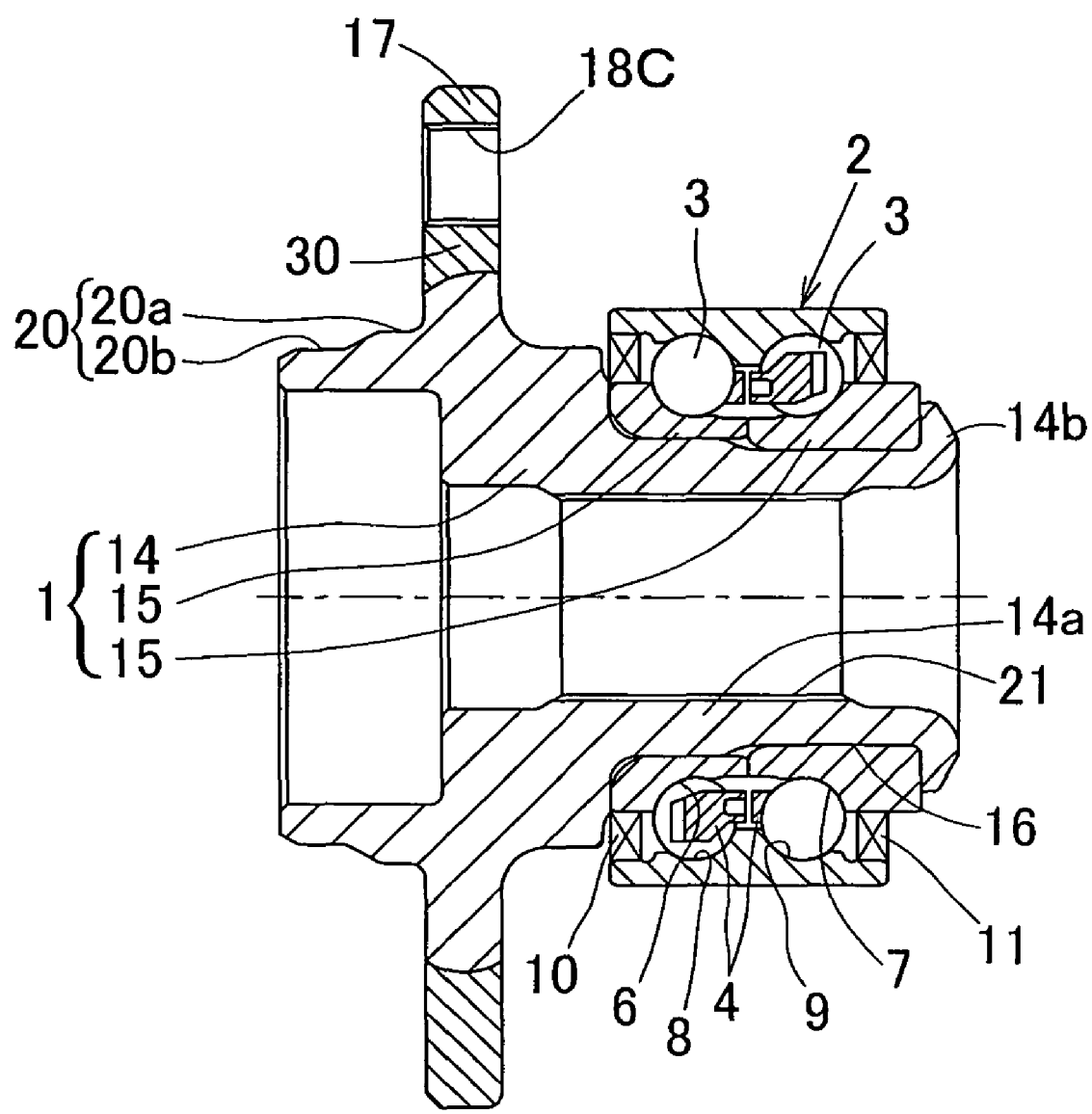
FIG. 77 is a longitudinal sectional view of the wheel support bearing assembly according to a sixty-first preferred embodiment of the present invention.

The wheel support bearing assembly shown in each of FIG. 77 is of an angular contact ball bearing type for use in supporting a vehicle drive wheel, in which the inner member 1 is made up of the wheel hub 14 and the plural rows of the inner race segments 15 mounted on an outer periphery of an hub axle 14a of the wheel hub 14. The inner race segments 15 are provided one for each row and the inner race segment 15 on the inboard side may have a thickness and an axial dimension, which are greater than those of the inner race segment 15 on the outboard side. Also, the inner race segments 15 are axially fixed to the wheel hub 14 by means of that crimped portion 14b provided in the wheel hub 14. The outer member 2 is in the form of a member of one-piece construction having an outer diametric surface rendered to be a cylindrical surface over the entirety and no vehicle body fitting flange such as employed in the example of FIG. 72 and shown by 12 is employed.

Figure 78:
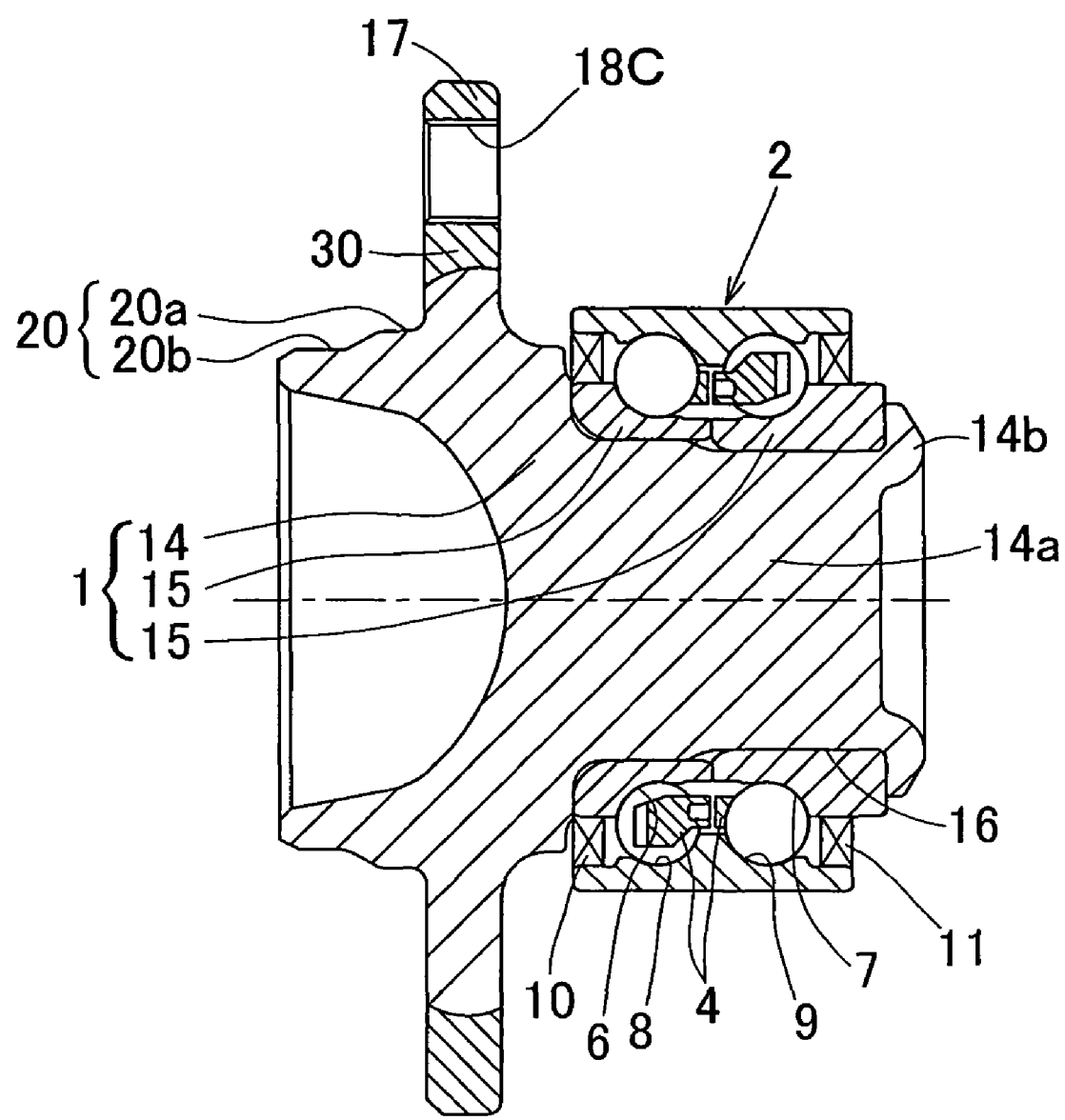
FIG. 78 is a longitudinal sectional view of the wheel support bearing assembly according to a sixty-second preferred embodiment of the present invention.

FIG. 78 illustrates the wheel support bearing assembly shown in and described with particular reference to FIG. 77, which is modified to allow it to be used for supporting a vehicle driven wheel. In this embodiment, the wheel hub 14 has no central portion provided with no throughhole such as identified by 21. Other structural features thereof than those described above are substantially similar to the example of FIG. 76.

Figure 79:
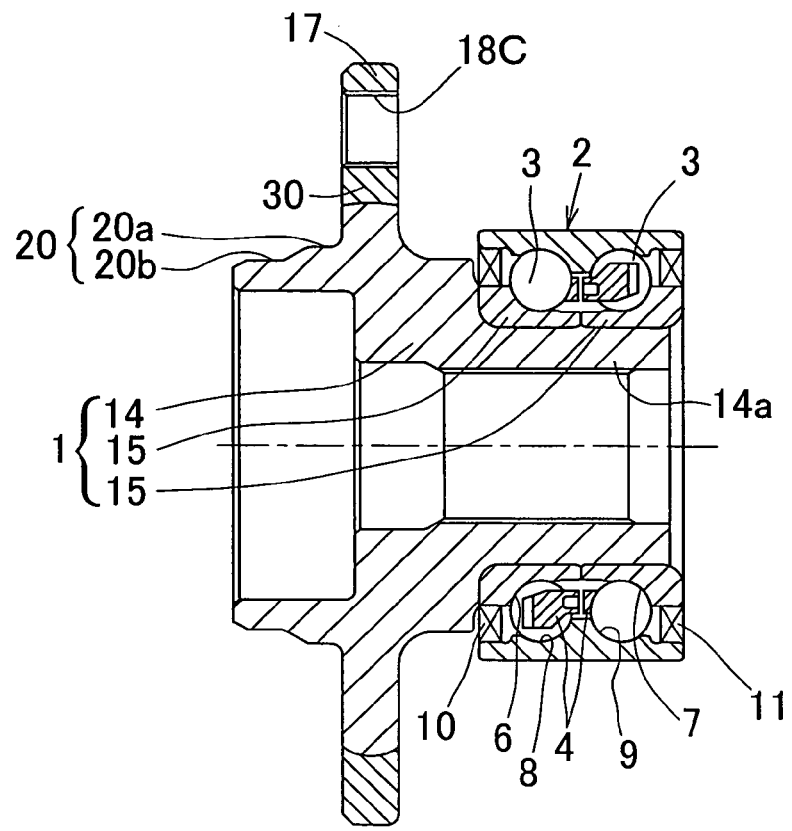
FIG. 79 is a longitudinal sectional view of the wheel support bearing assembly according to the sixty-third preferred embodiment of the present invention.

The wheel support bearing assembly shown in FIG. 79 is similar to the wheel support bearing assembly shown in and described with reference to FIG. 77 and the inner member 1 is made up of the wheel hub 14 and the plural rows of the inner race segments 15 mounted on the outer periphery of the hub axle 14a of the wheel hub 14. The outer member 2 is a member of one-piece construction, having no vehicle body fitting flange 12. In the instance as shown, the two inner race segments 15 has the same size and axial fixing of the inner race segments 15 to the wheel hub 14 is achieved, without relying on the crimping, by means of the constant velocity joint (not shown) coupled with the wheel hub 14.

Figure 80:
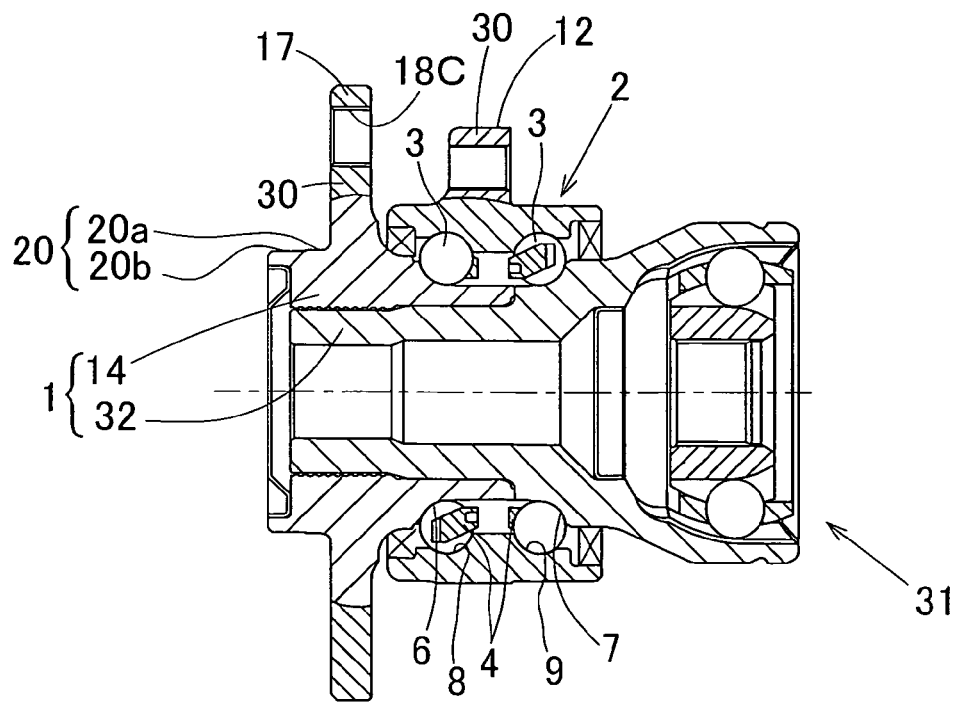
FIG. 80 is a longitudinal sectional view of the wheel support bearing assembly according to the sixty-fourth preferred embodiment of the present invention.

The wheel support bearing assembly shown in FIG. 80 is of a fourth generation type, in which the inner member 1 is made up of the wheel hub 14 and the joint outer ring 32, which is one of coupling members forming respective parts of a constant velocity joint 31, with rows of raceways 6 and 7 being formed respectively on the wheel hub 14 and the joint outer ring 32. The outer member 2 is of one-piece construction, having a vehicle body fitting flange 12.

Figure 81:
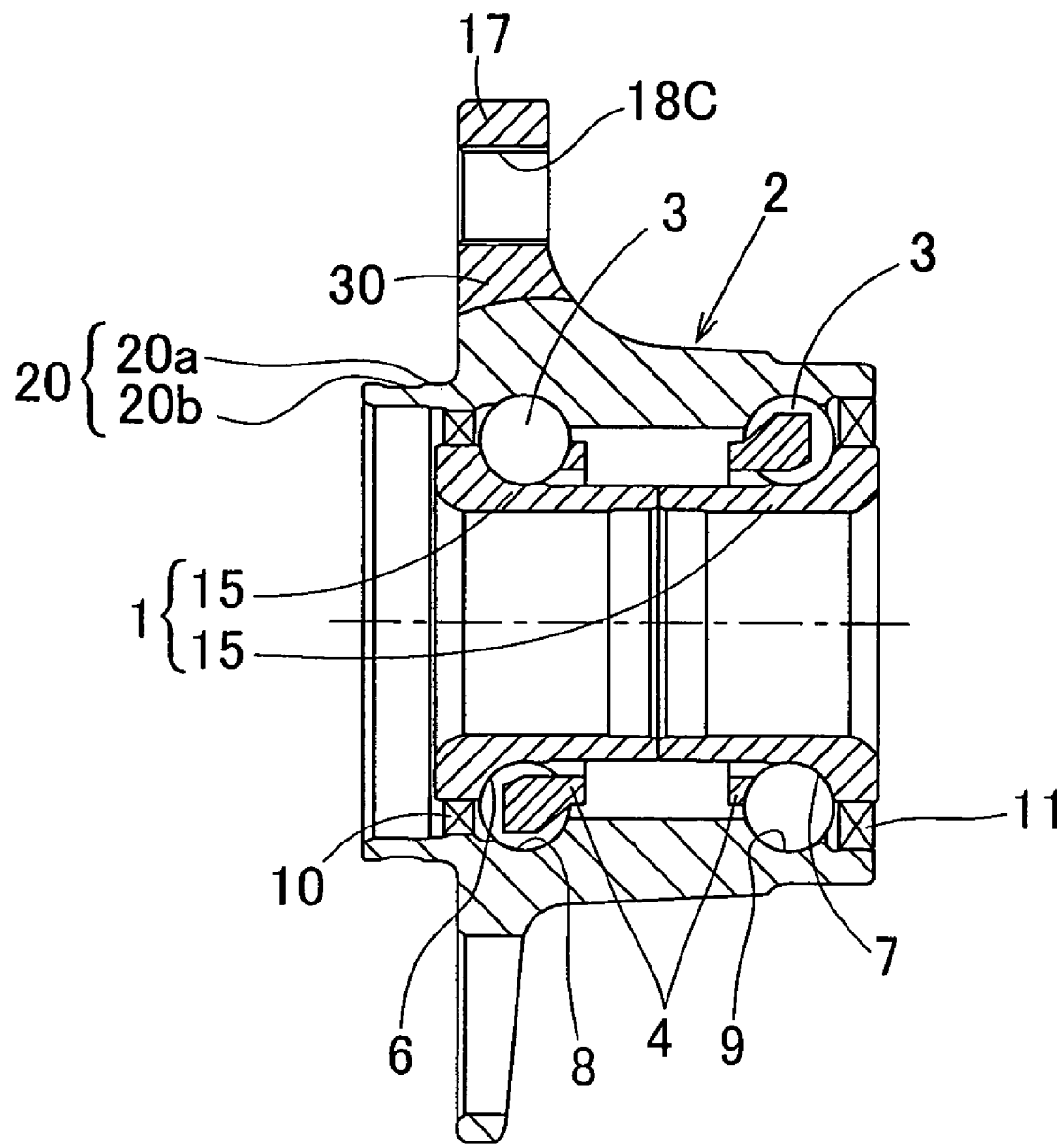
FIG. 81 is a longitudinal sectional view of the wheel support bearing assembly according to the sixty-fifty preferred embodiment of the present invention.
Figure 82:
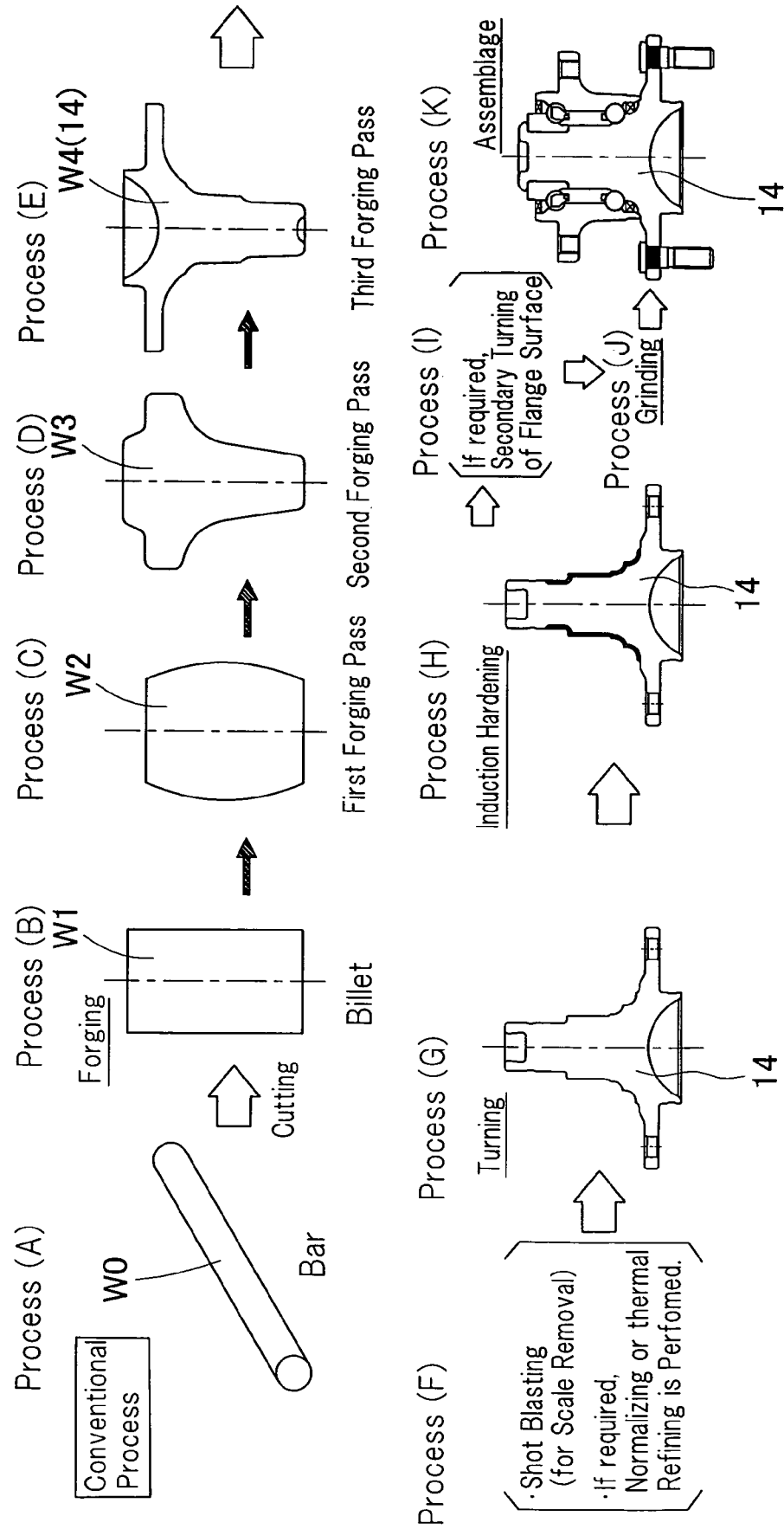
FIG. 82 is a flowchart showing the sequence of a forgoing step and the subsequent step used in the manufacture of a wheel hub employed in the conventional wheel support bearing assembly.

The wheel support bearing assembly shown in FIG. 81 is an outer member rotating model of a second generation type, in which the outer member has the wheel mounting flange 17 and the inner member 1 is in the form of the plural rows of the inner race segments 15.

The foregoing preferred embodiments of the present invention set forth hereinabove will be summarized as follows:

A wheel support bearing assembly forming a base configuration applicable to any one of the above described preferred embodiments of the present invention comprises an inner member and an outer member rotatable through a plurality of rows of rolling elements, wherein either or both of the inner member and the outer member includes a component part that is a hot forged product of steel material and has a matrix portion represented by a standard structure and also has an entire or partial surface thereof represented by a non-standard structure, said non-standard structure being chosen to be one of a fine ferrite-pearlite structure, an upper bainite structure, a lower bainite structure, a tempered martensite structure and a mixed structure comprised of two or more of those structures.

[First Embodiment Group]

In a wheel support bearing assembly in accordance with the first embodiment group which includes the base configuration, the non-standard structure is obtained by effecting a cooling during or immediately after a hot forging step, subsequently accompanied by a self-heat-recuperation or a heat-recuperation tempering.

A component part forming an entire structure of, or a portion of the inner member or the outer member may be provided with a wheel mounting flange or a vehicle body fitting flange, and the component part comprising the standard structure and the non-standard structure may be the component part provided with the wheel mounting flange or the vehicle body fitting flange.

During, for example, the cornering of the automotive vehicle, high stress occurs repeatedly in the wheel mounting flange or the vehicle body fitting flange. In consideration of the repeated high stresses occurring in the manner described above, the strength and the fatigue strength in the non-standard structural portion can increase as a result of minuteness of the structure and increase of the hardness as discussed above to withstand stresses of a high amplitude and increase the life time. Because of the foregoing, as compared with the wheel conventional support bearing assembly containing the standard structure, reduction in both size and weight can be accomplished and, accordingly, the input weight of product manufacturing of the wheel support bearing assembly can advantageously be reduced to thereby reduce the cost.

The non-standard structural portion may be formed at a root portion of the wheel mounting flange or the vehicle body fitting flange. The root portion is used to mean a portion including not only a side face of the flanges but also vicinity thereof.

During, for example, the cornering of the automotive vehicle, deflection of a large amplitude occurs repeatedly in the wheel mounting flange or the vehicle body fitting flange, accompanied by repeated high stresses occurring at that root portion of the flange. In consideration of the repeated high stresses occurring in the manner described above, where the surface area of that root portion of the flange is of the non-standard structure referred to above, the strength and the fatigue strength can increase as a result of minuteness of the structure and increase of the hardness as discussed above. For this reason, an undesirable occurrence of cracking at that root portion of the flanges can be suppressed to increase the life time. In other words, such a function as occurrence of a cracking→increase of a displacement of the flanges→increase of an amplitude of the automotive vehicle→damage to the wheel support bearing assembly can be suppressed to allow the life time to be increased.

The non-standard structural portion may be formed on an annular side surface of the wheel mounting surface or the vehicle body fitting flange remote from the opposite annular side surface thereof that is held in contact with a wheel or a vehicle body. In that opposite annular surfaces of the flanges remote from the opposite annular side surface thereof that is held in contact with a wheel or a vehicle body, the root portion thereof is not necessarily required to be the non-standard structural portion. Even in this case, the strength and the fatigue strength against the repeated high stresses can increase.

The non-standard structural portion may be formed on both of the an annular inboard and outboard side surfaces of the wheel mounting surface or the vehicle body fitting flange, or on the entire surface thereof. Although a brake disc is normally secured in overlapping relation to the annular outboard side surface of the wheel mounting flange, to which the vehicle wheel is mounted, an undesirable reduction in surface precision, which would result from a frictional wear of a flange surface that is brought about by a fretting between it and the brake disc, can be suppressed as a result of minuteness of the structure and increase of the hardness in the flanges. Because of it, an undesirable degradation of the feeling of use of the brake, for example, judder and kick back of the brake, can be suppressed.

Also, where both of the an annular inboard and outboard side surfaces of the wheel mounting surface or the vehicle body fitting flange, or on the entire surface thereof are rendered to be that portion of the non-standard structure, the fretting wear, which will take place in respective mating surfaces of the knuckle and the flange can be suppressed as a result of minuteness of the structure and increase of the hardness in the non-standard structure.

The wheel support bearing assembly included in the first embodiment group can be applied to any type of bearing assemblies which is provided with the wheel mounting flange. By way of example, it can be applied to a wheel support bearing assembly in which the inner member is made up of the hub axle and the plural rows of the inner race segments mounted on the outer periphery of the hub axle of the wheel hub and the component part provided with the wheel mounting flange is the wheel hub. The wheel hub included in the foregoing example may be employed as a component part independent of a complete dual row bearing unit.

In the wheel support bearing assembly included in the first embodiment group, the outer member is adapted to be fitted to an automotive vehicle body and the component part comprising the standard structure and the non-standard structure includes the outer member used to be fitted to the automotive vehicle body, which has an outer diametric surface made up of the non-standard structure. In this construction, since the outer diametric surface of the component part used to be fitted to the automotive vehicle body is formed with the non-standard structure, the fretting wear, which will take place in respective mating surfaces of the outer diametric surface and the knuckle in a vehicle suspension system, can be suppressed as a result of minuteness of the structure and increase of the hardness in the non-standard structure.

[Second Embodiment Group]

In a wheel support bearing assembly in accordance with the second embodiment group which includes the base configuration, an outer peripheral surface of the hub axle of the wheel hub has a portion rendered to be the non-standard structure.

Also, where the inner member has the raceways respectively formed on the wheel hub and the component part mounted on or coupled with the hub axle of the wheel hub, and where a sealing member 10 sealing an annular space delimited between the inner member and the outer member is secured to an outboard end of the outer member to thereby slidingly contact a seal contact surface lying on a outer periphery between the wheel mounting flange and the outboard raceway of the wheel hub, the wheel hub may have the non-standard structural portion on the seal contact surface.

Although, during the cornering of the automotive vehicle, high stresses occur repeatedly at the seal contact surface in the vicinity of the root portion of the wheel mounting flange, where the seal contact surface 44 is of the non-standard structure, an undesirable occurrence of cracking in the vicinity of the root portion of the wheel mounting flange can be suppressed to increase the life time. Also, considering that the hardness of the seal contact surface is increased as a result of that seal contact surface having been rendered to be of the non-standard structure, frictional wear resulting from sliding contact with the sealing member can be reduced.

Further, where the inner member is made up of the wheel hub and the inner race segment mounted on an inner race segment mounting surface that is radially inwardly stepped and formed on an outer periphery of a hub axle of the wheel hub, the wheel hub may have the non-standard structural portion formed on the inner race segment mounting surface and in the vicinity of an inner race segment abutment portion. Although, during the cornering of the automotive vehicle, repeated high stresses occur at an inner race segment mounting corner R portion of the wheel mounting flange, where the inner race segment mounting surface and the vicinity of the inner race segment abutment portion are of the non-standard structure, an undesirable occurrence of cracking in the vicinity thereof can be suppressed to increase the life time Also, the inner race segment mounting surface and the vicinity of the inner race segment abutment portion of the wheel hub are susceptible to fretting wear when finely vibrated relative to the inner race segment in a direction circumferentially of the inner race segment. However, the provision of the portion of the non-standard structure is effective to suppress the fretting wear as a result of the structural minuteness and the increased hardness. Because of it, an undesirable reduction in durability, which would result in when rusting, frictionally worn particles and/or bite occur, can be avoided.

[Third Embodiment Group]

In a wheel support bearing assembly in accordance with the third embodiment group which includes the base configuration, the inner member includes a wheel hub having a wheel mounting flange, and an inner race segment mounted on an outer periphery of a hub axle of the wheel hub; wherein the wheel hub has an outboard end face formed with a pilot portion protruding outwardly from a root portion of the wheel mounting flange for guiding a wheel and an automotive brake component; wherein a portion of the outboard end face of the wheel hub lying radially inwardly from the pilot portion is axially depressed to define a recess; and wherein the component part comprising the standard structure and the non-standard structure is the wheel hub and an surface of the end face within the recess has a portion of the non-standard structure.

According to the wheel support bearing assembly of the foregoing construction, the following effects can be obtained. Even though the weight of the wheel hub can be reduced by forming the recess at the end face of the wheel hub, it is difficult to make the recess deeper without the strength of the wheel hub being reduced since the recess at the end face of the wheel hub is defined in an inner periphery portion of the wheel mounting flange and thus the root portion of the wheel mounting flange of the hub axle lies in a periphery of the recess. However, if the surface area inside the recess at the end face of the wheel hub is rendered to be that portion of the non-standard structure, the strength and the fatigue strength against the repeated high stresses occurring during the cornering of the automotive vehicle can increase and, accordingly, an undesirable occurrence of cracking in the recess can be suppressed to increase the life time. Because of the foregoing, while an attempt is made to reduce the weight with the recess increased in size as large as possible, it is possible to increase the strength and the fatigue strength of the recess outer peripheral portion of the hub axle, which are enough to withstand against the high stress and repeated stress.

The recess may have a shape depressed in a direction axially of the wheel hub with an axial depth thereof increasing radially inwardly to define a deepest area that is axially deeply depressed to, or further from an inboard side surface of the wheel mounting flange. Even when the recess is formed so deeply as described above, the strength and the fatigue strength can be secured by forming the non-standard structural portion on the surface area inside the recess.

The non-standard structural portion in the recess at the end face of the wheel hub may be formed either on the approximately entire surface inside the recess or in a bottom portion of the recess. The bottom portion is defined as, for example, a portion lying on the bottom side from the intermediate point of the depth of the recess.

The non-standard structural portion is preferably formed on the approximately entire surface inside the recess in terms of increasing the strength and fatigue strength. However, when the surface inside the recess is required to be strengthened only in the bottom portion, the strength and the fatigue strength against the high stress and the repeated stresses can increase by forming the non-standard structural portion only in the bottom portion.

[Fourth Embodiment Group]

In a wheel support bearing assembly in accordance with the first embodiment group which includes the base configuration, the wheel mounting flange includes bolt holes for passage of respective hub bolts and a seating surface of each of the bolt holes in a side face of the wheel mounting flange and a vicinity of the seating face have a portion of the non-standard structure.

The wheel mounting flange may have a counterbore forming the seating face in a periphery of the bolt hole formed in the side face of the wheel mounting flange. Also, the seating face of the bolt hole in the side face of the wheel mounting flange may be in the form of a turned face.

According to the wheel support bearing assembly of the above described construction, the following effects can be obtained. Where the bolt hole has the counterbore formed in a periphery thereof, or the seating face in the form of the turned face and a peripheral area thereof cooperatively define a corner portion, such as a stepped portion, during, for example, the cornering of the automotive vehicle, repeated high stresses occur at a corner portion of the counterbore and a portion in the vicinity of the seating faces in the form of the turned face. However, since the seating faces of the bolt holes and their peripheral portions, which are rendered to be that portion 30 of the non-standard structure, can have an increased strength and an increased fatigue strength, an undesirable occurrence of cracking in the seating faces of the respective bolt holes their peripheries can be suppressed to allow the life time to be increased. Also, since the seating faces has a hardness increased as a result of the use of the non-standard structure, frictional wear can be reduced and lowering of an axial force of each hub bolt resulting from the frictional wear of the corresponding seating face can be suppressed. Moreover, since only portions in the vicinity of the surface area during a casting process have the non-standard structural portions, the hardness increases merely in the vicinity of the surface area, with no fitting characteristics of the serrations of the hub bolt and no bolt slipping torque being affected.

[Fifth Embodiment Group]

The wheel support bearing assembly may include the outer member formed with an outer periphery mounted with a supporting member provided with a to-be-detected member or a detector for detection of a rotation, in which the component part comprising the standard structure and the non-standard structure is the outer member adapted to be mounted with the supporting member and the outer member have the non-standard structural portion on the outer periphery thereof on which the supporting member is mounted.

The wheel support bearing assembly may be either an outer ring rotating model or an inner ring rotating model. By way of example, in the case of the outer ring rotating model, the outer member may include the wheel mounting flange provided on the outboard side thereof and the supporting member may be in the form of a pulsar ring.

On the other hand, in the case of the inner ring rotating model, the inner member is a rotating member and the member to be mounted with the supporting member may be the outer member while the supporting member may be in the form of a sensor cap which is to be mounted on the outer periphery of the end portion of the outer member.

According to the wheel support bearing assembly of the foregoing construction, the fatigue strength of that portion of the non-standard structure can increase and, even where a high stress during, for example, the cornering of the automotive vehicle occurs repeatedly enough to deform, it is possible to suppress frictional wear of a member, engaged with the pulsar ring or the sensor cap, as a result of creepage. In other words, such a sequential occurrence as generation of frictional wear→decrease of the interference→further generation of creepage→displacement of the pulsar ring→an abnormality detection of the detector unit 42 can be suppressed.

[Sixth Embodiment Group]

In a wheel support bearing assembly in accordance with the sixth embodiment group which includes the base configuration, the inner member comprises a wheel hub having a wheel mounting flange, and an inner race segment mounted on an outer periphery of a hub axle of the wheel hub; wherein a central portion of the wheel hub has a throughhole defined therein for insertion thereinto of a stem portion of a coupling member of a constant velocity joint; wherein an open end edge of the throughhole at an outboard end face of the wheel hub has a seating surface, with which a washer or a nut threadedly mounted on a male threaded portion at a tip of the stem portion; and wherein the component part comprising the standard structure and the non-standard structure is the wheel hub and the seating surface of the wheel hub has a portion of the non-standard structure.

The seating surface may be a bottom surface of the counterbore formed in an end face on the outboard side of the wheel hub. In that case, the non-standard structural portion is preferably formed in a periphery of a corner between the bottom and peripheral surfaces of the counterbore.

According to the wheel support bearing assembly of the foregoing construction, the following effects can be obtained. Since the periphery of the seating surface which is held in contact with the coupling nut at the end face of the wheel hub for connecting the constant velocity joint lies in a periphery of the root portion of the wheel mounting flange, a high stress repeatedly occur during, for example, the cornering of the automotive vehicle. Particularly where the seating surface is a bottom surface of the counterbore, such high stress repeatedly occurs in a corner between the bottom and peripheral surface of the counterbore. However, when the seating surface and that portion encompassing the periphery of the corner of the counterbore are rendered to be that portion of the non-standard structure, generation of cracking from a peripheral edge of the seating surface can be suppressed to allow the life time to be increased.

Also, since the hardness of the seating surface is increased in the presence of the non-standard structure, the fretting wear which would occur as a result of contact between it and the nut can be suppressed and, hence, an undesirable axial fastening force of the nut, which would result from such frictional wear, can be suppressed.

[Seventh Embodiment Group]

In a wheel support bearing assembly in accordance with the seventh embodiment group which includes the base configuration, the inner member comprises a wheel hub having a wheel mounting flange, and an inner race segment mounted on an outer periphery of a hub axle of the wheel hub; wherein an end face of the inner race segment on an outboard side abuts an inner race segment abutment face which extends from an end portion of a hub axle outer peripheral surface of the wheel hub adjacent the wheel mounting flange in a direction diametrically outwardly; and wherein the component part comprising the standard structure and the non-standard structure is the wheel hub and a region of the outer peripheral surface of the hub axle ranging from at least a neighborhood of the inner race segment abutment face to such inner race segment abutment face has a portion of the non-standard structure.

According to the wheel support bearing assembly of the foregoing construction, the following effects can be obtained. Against the repeated high stresses during, for example, the cornering of the automotive vehicle, where the corner portion between the inner race abutment face of the wheel hub and the outer peripheral surface thereof is formed as the non-standard structure, the strength and the fatigue strength can be increased as a result of the minuteness of the structure and the increase of the hardness and, accordingly, generation of cracking can be suppressed to allow the life time to be increased.

Further, since the non-standard structure brings about an increase of the hardness as compared with the standard structure, frictional wear of the inner race abutment face of the wheel hub can be reduced, thereby suppressing creepage which would otherwise result from the frictional wear. For this reason, frictional wear of the inner race abutment face resulting from creepage→reduction in the axial force→further generation of the creepage→frictional wear of the axle→generation of cracking from an end where edge-shaped frictional wear take place→reduction in durability can be avoided.

In the wheel support bearing assembly, an axial range, which is rendered to be that portion of the non-standard structure may extend to a location where the inboard inner race segment on the outer peripheral surface of the hub axle is mounted. By forming the non-standard structural portion over a large range in the hub axle, the strength and the fatigue strength of the hub axle can further increase.

In the case of the wheel support bearing assembly included in the seventh embodiment group in which the inner race segment is axially fixed to the wheel hub by urging a stepped face of the inner race segment by means of a crimped portion formed by diametrically outwardly crimping the inboard end of the hub axle of the wheel hub, an outer peripheral surface in the vicinity of the inboard end of the hub axle is preferably formed as the standard structural portion as is the case with the matrix portion.

If the non-standard structural portion is formed in the vicinity of the inboard end of the hub axle, the crimped portion becomes unworkable. However, since the crimped portion remains having the standard structure, any possible reduction in crimping workability can be avoided.

[Eighth Embodiment Group]

In a wheel support bearing assembly in accordance with the eighth embodiment group which includes the base configuration, wherein the inner member comprises a wheel hub, having a wheel mounting flange, and an inner race segment mounted on an outer periphery of a hub axle of the wheel hub; wherein a central portion of the wheel hub is formed with a throughhole defined therein for insertion thereinto of a stem portion of a coupling member of a constant velocity joint; wherein an inner diametric surface defining the throughhole has serrations or splines engageable with serrations or splines provided in the stem portion; and wherein the component part comprising the standard structure and the non-standard structure is the wheel hub and a portion of the inner diametric surface of the wheel hub defining the throughhole, where the serrations or splines are formed, has a portion of the non-standard structure.

According to the wheel support bearing assembly of the foregoing construction, the following effects can be obtained. Since that portion of the inner diametric surface of the wheel hub, where the serrations are formed, represents a serrated shape, it may occur that dale portions are susceptible to a high stress during, for example, the cornering of the automotive vehicle, by the effect of a moment load acting on the wheel hub and, also, by the effect of repeated minute deformation and displacement, some of the serrations between the wheel hub and the constant velocity joint undergo friction, accompanied by frictional wear.

However, against the repeated high stresses occurring in the manner described above, if the inner diametric surface of the wheel hub, where the serrations are formed, is rendered to be that portion of the non-standard structure, the structure and the fatigue strength can increase as a result of the minuteness of the structure and the increase of the hardness thereby suppressing generation of cracking from tooth dale of the serration. In other words, such a function as occurrence of a cracking→increase of a displacement of the site where the stress is generated→elongation of cracks→damage to the wheel hub can be suppressed to allow the life time to be increased.

Also, because of the increase of the hardness due to the non-standard structure, frictional wear of the serrations or the splines can be avoided. For this reason, it is possible to suppress frictional wear of the teeth which would otherwise result in incapability of the driving force being transmitted.

[Ninth Embodiment Group]

In a wheel support bearing assembly in accordance with the ninth embodiment group which includes the base configuration, wherein either one of the flanges is formed with a bolt press-fitting hole defined therein and wherein the component part comprising the standard structure and the non-standard structure is a component including a flange having the bolt press-fitting hole defined therein and wherein an inner surface defining the bolt press-fitting hole in this component has a portion of the non-standard structure.

Where the inner member is made up of the wheel hub having the wheel mounting flange and the inner race segment mounted on the outer periphery of the wheel hub and the wheel mounting flange has the bolt press-fitting hole defined therein, an inner surface of the bolt press-fitting hole of the wheel hub may be formed with the non-standard structural portion.

Also, where the outer member includes the vehicle body fitting flange and the vehicle body fitting flange of the outer member has the bolt press-fitting hole defined therein, an inner surface of the bolt press-fitting hole of the outer member may be formed with the non-standard structural portion.

According to the wheel support bearing assembly of the above described construction, the following effects can be obtained. If the inner surface of each of the bolt press-fitting holes is formed as that portion of the non-standard structure, the fitting characteristics of the serrations formed in a neck portion of each hub bolt can be increased. For this reason, the possibility can be suppressed, in which the hub bolt press-fitted into the respective bolt press-fitting holes may rotate together with the nut when the latter is turned.

[Tenth Embodiment Group]

In a wheel support bearing assembly in accordance with the tenth embodiment group which includes the base configuration, either one of the flanges is formed with a screw hole defined therein, the screw hole having an inner surface formed with female threads, and wherein the component part comprising the standard structure and the non-standard structure is a component including a flange having the bolt press-fitting holes defined therein and wherein an inner surface defining the bolt press-fitting holes in this component has a portion of the non-standard structure.

In the wheel support bearing assembly included in the tenth embodiment group, where the inner member is made up of the wheel hub having the wheel mounting flange and the inner race segment mounted on the outer periphery of the wheel hub and the wheel mounting flange has the screw hole defined therein, an inner surface of the screw hole of the wheel hub may be formed with the non-standard structural portion.

Also, where the outer member includes the vehicle body fitting flange and the vehicle body fitting flange of the outer member has the screw hole defined therein, an inner surface of the screw hole of the outer member may be formed with the non-standard structural portion.

According to the wheel support bearing assembly of the above described construction, the following effects can be obtained. Because of the minuteness of the structure and the increase of the hardness in the non-standard structural portion, the strength and the fatigue strength of the screw holes can increase and, when a high stress occurs repeatedly during, for example, cornering of the automotive vehicle, occurrence of cracking in the screw holes formed in the wheel mounting flange and the vehicle body fitting flange, respectively, can be suppressed. In other words, cracking→increase of a displacement of that portion where the stresses occur→increase of an amplitude of the automotive vehicle→reduction in durability of component parts of the wheel support bearing assembly, where the screw holes are formed→separation of the bolts can be suppressed. Also, as a result of the increased hardness brought about by the use of the non-standard structure, damages to the screw holes when heavily loaded, can be suppressed to allow it to withstand a further high load. In addition, frictional wear of the female threads in the screw holes can be reduced to avoid reduction and slackening of the axial force of the wheel bolts and the vehicle body fitting bolts.

Thus, it can be highly strengthened and can have an increased life time. As compared with the conventional wheel support bearing assembly having the standard structure, downsizing and reduction in weight can be accomplished. Accordingly, the input weight of product manufacturing of the wheel support bearing assembly can advantageously be reduced to thereby reduce the cost, making it possible to provide the wheel support bearing assembly at an inexpensive price.

In the wheel support bearing assembly, respective degrees of hardness for the non-standard structural portion and the standard structural portion may be arbitrarily set. For example, the degree of hardness for the non-standard structural portion may be chosen from a range of 20-40 HRC, and the degree of hardness for the matrix portion may be chosen from a range of 13-25 HRC.

The range of the degree of hardness preferably has a lower limit thereof chosen to be 20 HRC or higher, which corresponds to approximately the intermediate value of the range of the degree of hardness for the matrix portion, in consideration of increasing the fatigue strength brought about by the increased hardness, and more preferably, 25 HRC or higher. On the other hand, an upper limit of the range of the degree of hardness for the non-standard structural portion is preferably set to 40 HRC or lower in order to secure capability of being machined.

By way of example, when carbon steel, such as S53C, is used for the raw material of the standard structural portion, the degree of hardness for the standard structural portion is set within the range of 13-25 HRC. It is preferable to limit the maximum value to 25 HRC or lower in consideration of a cold processing such as crimping and a portion into which the hub bolt is press-fitted.

What is claimed is:

1. A wheel support bearing assembly comprising:
an inner member and an outer member rotatable through a plurality of rows of rolling elements,
wherein either or both of the inner member and the outer member includes a component part that is a hot forged product of steel material and has a matrix portion represented by a standard structure and also has an entire or partial surface thereof represented by a non-standard structure, said non-standard structure being chosen to be one of an upper bainite structure, a lower bainite structure, a tempered martensite structure and a mixed structure comprised of two or more of those structures,
wherein the non-standard structure is obtained by effecting a cooling during or immediately after a hot forging step, subsequently accompanied by a self-heat-recuperation or a heat-recuperation tempering.

2. The wheel support bearing assembly as claimed in claim 1, wherein the component part comprising the standard structure and the non-standard structure includes a wheel mounting flange or a vehicle body fitting flange and a surface of the wheel mounting flange and/or the vehicle body fitting flange has the non-standard structure.

3. The wheel support bearing assembly as claimed in claim 2, wherein the wheel mounting flange includes bolt holes for passage of respective hub bolts and a seating face of each of the bolt holes in a side face of the wheel mounting flange and a vicinity of the seating face have a portion of the non-standard structure.

4. The wheel support bearing assembly as claimed in claim 2, wherein either one of the flanges is formed with a bolt press-fitting hole defined therein and wherein the component part comprising the standard structure and the non-standard structure is a component including a flange having the bolt press-fitting hole defined therein, and
wherein an inner surface defining the bolt press-fitting hole in this component has a portion of the non-standard structure.

5. The wheel support bearing assembly as claimed in claim 2, wherein either one of the flanges is formed with a screw hole defined therein, the screw hole having an inner surface formed with female threads, and
wherein the component part comprising the standard structure and the non-standard structure is a component including a flange having the bolt press-fitting holes defined therein and wherein an inner surface defining the bolt press-fitting holes in this component has a portion of the non-standard structure.

6. The wheel support bearing assembly as claimed in claim 1, wherein the outer member is adapted to be fitted to an automotive vehicle body and the component part comprising the standard structure and the non-standard structure is the outer member which has an outer diametric surface made up of the non-standard structure.

7. The wheel support bearing assembly as claimed in claim 1, wherein the inner member includes a wheel hub having a wheel mounting flange, and an inner race segment mounted on an outer periphery of a hub axle of the wheel hub, and
wherein the component part comprising the standard structure and the non-standard structure is the wheel hub and an outer peripheral surface of the hub axle of the wheel hub has a portion rendered to be the non-standard structure.

8. The wheel support bearing assembly as claimed in claim 1, wherein the inner member includes a wheel hub having a wheel mounting flange, and an inner race segment mounted on an outer periphery of a hub axle of the wheel hub,
wherein the wheel hub has an outboard end face formed with a pilot portion protruding outwardly from a root portion of the wheel mounting flange for guiding a wheel and an automotive brake component,
wherein a portion of the outboard end face of the wheel hub lying radially inwardly from the pilot portion is axially depressed to define a recess, and
wherein the component part comprising the standard structure and the non-standard structure is the wheel hub and a surface of the end face within the recess has a portion of the non-standard structure.

9. The wheel support bearing assembly as claimed in claim 1, further comprising a support component mounted around a peripheral surface of the outer member and the support component being provided with a to-be-detected member or a detector for detection of rotations,
wherein the component part comprising the standard structure and the non-standard structure is the outer member to engage the support component, and
wherein a surface of the outer member, on which the support component is engaged, has a portion of the non-standard structure.

10. The wheel support bearing assembly as claimed in claim 1, wherein the inner member comprises a wheel hub having a wheel mounting flange, and an inner race segment mounted on an outer periphery of a hub axle of the wheel hub,
wherein a central portion of the wheel hub has a throughhole defined therein for insertion thereinto of a stem portion of a coupling member of a constant velocity joint,
wherein an open end edge of the throughhole at an outboard end face of the wheel hub has a seating face, with which a washer or a nut threadedly mounted on a male threaded portion at a tip of the stem portion, and wherein the component part comprising the standard structure and the non-standard structure is the wheel hub and the seating face of the wheel hub has a portion of the non-standard structure.

11. The wheel support bearing assembly as claimed in claim 1, wherein the inner member comprises a wheel hub having a wheel mounting flange, and an inner race segment mounted on an outer periphery of a hub axle of the wheel hub, wherein an end face of the inner race segment on an outboard side abuts an inner race segment abutment face which extends from an end portion of a hub axle outer peripheral surface of the wheel hub adjacent the wheel mounting flange in a direction diametrically outwardly, and wherein the component part comprising the standard structure and the non-standard structure is the wheel hub and a region of the outer peripheral surface of the hub axle ranging from at least a neighborhood of the inner race segment abutment face to such inner race segment abutment face has a portion of the non-standard structure.

12. The wheel support bearing assembly as claimed in claim 1, wherein the inner member comprises a wheel hub, having a wheel mounting flange, and an inner race segment mounted on an outer periphery of a hub axle of the wheel hub, wherein a central portion of the wheel hub is formed with a throughhole defined therein for insertion thereinto of a stem portion of a coupling member of a constant velocity joint, wherein an inner diametric surface defining the throughhole has serrations or splines engageable with serrations or splines provided in the stem portion, and wherein the component part comprising the standard structure and the non-standard structure is the wheel hub and a portion of the inner diametric surface of the wheel hub defining the throughhole, where the serrations or splines are formed, has a portion of the non-standard structure.

13. A method of manufacturing a wheel support bearing assembly, including an inner member and an outer member rotatable through a plurality of rows of rolling elements, comprising:

hot forging a steel material to form a component part of either or both of the inner member and the outer member, the component part having a matrix portion represented by a standard structure; and effecting a cooling during or immediately after the hot forging step, subsequently accompanied by a self-heat-recuperation or a heat-recuperation tempering to form an entire or partial surface thereof represented by a non-standard structure, the non-standard structure being chosen to be one of a fine ferrite-pearlite structure, an upper bainite structure, a lower bainite structure, a tempered martensite structure and a mixed structure comprised of two or more of those structures.

* * * * *